US012676949B2

(12) United States Patent
Aoki et al.

(10) Patent No.: US 12,676,949 B2
(45) Date of Patent: Jul. 7, 2026

(54) DATA PROCESSING APPARATUS, DATA PROCESSING METHOD, AND PROGRAM

(71) Applicant: FUJIFILM Corporation, Tokyo (JP)

(72) Inventors: Takashi Aoki, Saitama (JP); Fuminori Irie, Saitama (JP); Kazunori Tamura, Saitama (JP); Masahiko Miyata, Saitama (JP); Yasunori Murakami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 353 days.

(21) Appl. No.: 18/184,681

(22) Filed: Mar. 16, 2023

(65) Prior Publication Data
US 2023/0224445 A1 Jul. 13, 2023

Related U.S. Application Data

(63) Continuation of application No. PCT/JP2021/028836, filed on Aug. 3, 2021.

(30) Foreign Application Priority Data

Sep. 29, 2020 (JP) ................................ 2020-163978

(51) Int. Cl.
*H04N 13/117* (2018.01)
*G06V 10/74* (2022.01)
*H04N 13/383* (2018.01)

(52) U.S. Cl.
CPC ......... *H04N 13/117* (2018.05); *G06V 10/761* (2022.01); *H04N 13/383* (2018.05)

(58) Field of Classification Search
CPC .. H04N 13/117; H04N 13/383; H04N 13/282; H04N 21/258; H04N 23/60; G06V 10/761; G06T 15/20; G06T 19/00
See application file for complete search history.

(56) References Cited

U.S. PATENT DOCUMENTS

| | | | |
|---|---|---|---|
| 11,784,415 B2 | 10/2023 | Mora Plaza et al. | |
| 2009/0066696 A1* | 3/2009 | Williams | ............... H04N 5/272 345/427 |
| 2017/0365102 A1* | 12/2017 | Huston | .................. A63F 13/65 |
| 2018/0061071 A1 | 3/2018 | Okutani | |

(Continued)

FOREIGN PATENT DOCUMENTS

| | | |
|---|---|---|
| JP | 2015187797 | 10/2015 |
| JP | 2018036956 | 3/2018 |

(Continued)

OTHER PUBLICATIONS

"International Search Report (Form PCT/ISA/210) of PCT/JP2021/028836," mailed on Nov. 2, 2021, with English translation thereof, pp. 1-5.

(Continued)

*Primary Examiner* — Daniel F Hajnik
(74) *Attorney, Agent, or Firm* — JCIPRNET

(57) ABSTRACT

A data processing apparatus transmits a virtual viewpoint image generated on the basis of a captured image to a device. The data processing apparatus acquires first data regarding a reproduction history and/or registration data of the virtual viewpoint image, and performs control for transmitting second data regarding the virtual viewpoint image to the device on the basis of the acquired first data.

47 Claims, 57 Drawing Sheets

(56)  References Cited

U.S. PATENT DOCUMENTS

| | | | | |
|---|---|---|---|---|
| 2018/0146218 | A1 | 5/2018 | Shimura | |
| 2019/0124316 | A1* | 4/2019 | Yoshimura | H04N 13/361 |
| 2019/0174109 | A1* | 6/2019 | Yoshikawa | H04N 13/243 |
| 2019/0253743 | A1 | 8/2019 | Tanaka et al. | |
| 2019/0287302 | A1* | 9/2019 | Bhuruth | G06F 3/04847 |
| 2019/0335154 | A1* | 10/2019 | Tanaka | H04N 1/32101 |
| 2020/0014901 | A1 | 1/2020 | Umemura | |
| 2020/0021761 | A1* | 1/2020 | Tanaka | H04N 13/117 |
| 2020/0082603 | A1* | 3/2020 | Arai | H04N 23/90 |
| 2021/0005023 | A1* | 1/2021 | Yoshimura | G06F 3/013 |
| 2021/0014425 | A1* | 1/2021 | Matsubayashi | H04N 5/2224 |
| 2021/0029342 | A1* | 1/2021 | Ito | H04N 23/60 |
| 2021/0390721 | A1 | 12/2021 | Okutani | |

FOREIGN PATENT DOCUMENTS

| | | | | | |
|---|---|---|---|---|---|
| JP | 2019025784 | A | * | 2/2019 | H04N 21/2343 |
| JP | 2020009021 | | | 1/2020 | |
| JP | 2020136821 | | | 8/2020 | |
| JP | 2022553508 | | | 12/2022 | |
| WO | 2016178340 | | | 11/2016 | |
| WO | 2018079166 | | | 5/2018 | |

OTHER PUBLICATIONS

"Written Opinion of the International Searching Authority (Form PCT/ISA/237) of PCT/JP2021/028836," mailed on Nov. 2, 2021, with English translation thereof, pp. 1-10.
"Office Action of Japan Counterpart Application", issued on Feb. 27, 2024, with English translation thereof, pp. 1-6.
"Office Action of Japan Counterpart Application", issued on Jul. 29, 2025, with English translation thereof, p. 1-p. 5.

* cited by examiner

| | | VIDEO INFORMATION | | | | VIEWPOINT RELATED INFORMATION | | |
|---|---|---|---|---|---|---|---|---|
| VIDEO ID | AUTHOR | GAME ELAPSED TIME | VIDEO LENGTH | THUMBNAIL IMAGE | | VIEWPOINT POSITION | VISUAL LINE DIRECTION | ANGLE OF VIEW |
| 001 | A | 00:22:01 TO 00:24:52 | 00:02:51 | | | (X1,Y1) | ↓ | 30° |
| 002 | B | 00:17:55 TO 00:21:00 | 00:03:05 | | | (X2,Y2) | ↗ | 35° |
| 003 | C | 00:23:05 TO 00:23:30 | 00:00:25 | | | (X3,Y3) | ↙ | 26° |

FIG. 6

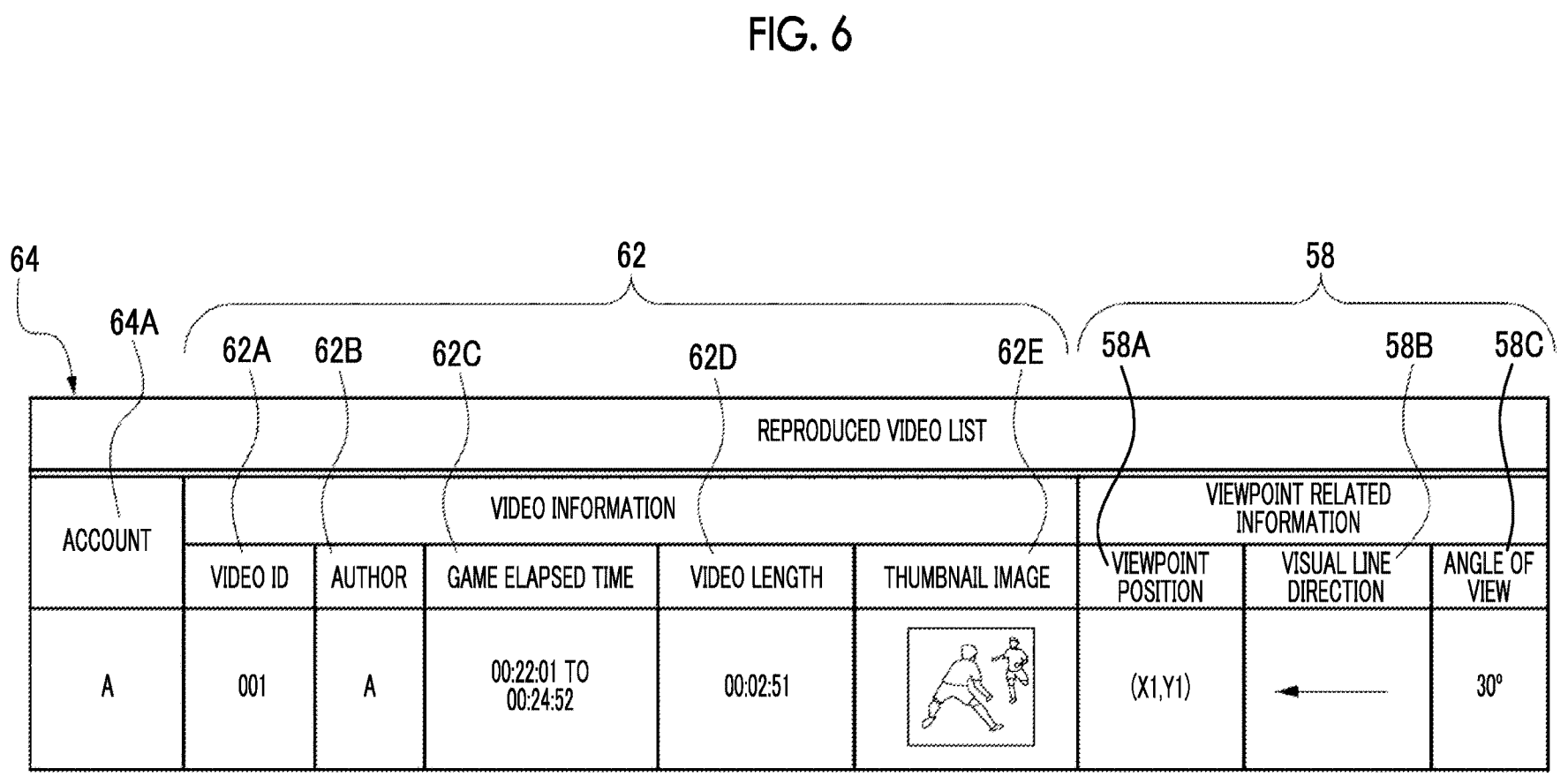

| ACCOUNT | VIDEO INFORMATION | | | | | VIEWPOINT RELATED INFORMATION | | |
| | VIDEO ID | AUTHOR | GAME ELAPSED TIME | VIDEO LENGTH | THUMBNAIL IMAGE | VIEWPOINT POSITION | VISUAL LINE DIRECTION | ANGLE OF VIEW |
| A | 001 | A | 00:22:01 TO 00:24:52 | 00:02:51 | | (X1,Y1) | ↓ | 30° |

REPRODUCED VIDEO LIST 58  58A  58B  58C 62  62A  62B  62C  62D  62E 64  64A

FIG. 9

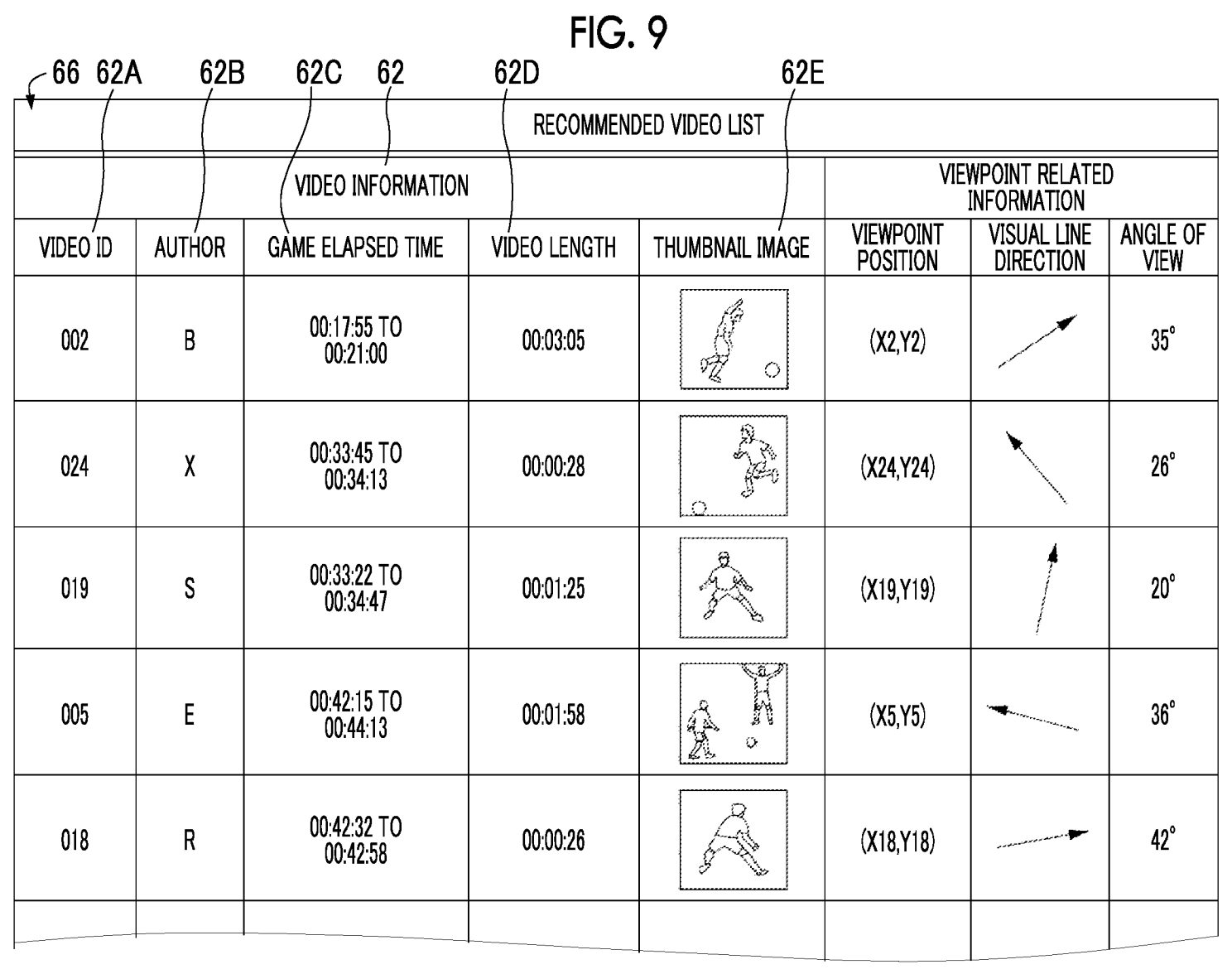

| VIDEO ID | AUTHOR | VIDEO INFORMATION 62 | | THUMBNAIL IMAGE | VIEWPOINT RELATED INFORMATION | | |
| | | GAME ELAPSED TIME | VIDEO LENGTH | | VIEWPOINT POSITION | VISUAL LINE DIRECTION | ANGLE OF VIEW |
|---|---|---|---|---|---|---|---|
| 002 | B | 00:17:55 TO 00:21:00 | 00:03:05 | | (X2,Y2) | | 35° |
| 024 | X | 00:33:45 TO 00:34:13 | 00:00:28 | | (X24,Y24) | | 26° |
| 019 | S | 00:33:22 TO 00:34:47 | 00:01:25 | | (X19,Y19) | | 20° |
| 005 | E | 00:42:15 TO 00:44:13 | 00:01:58 | | (X5,Y5) | | 36° |
| 018 | R | 00:42:32 TO 00:42:58 | 00:00:26 | | (X18,Y18) | | 42° |

RECOMMENDED VIDEO LIST 66 62A 62B 62C 62 62D 62E

FIG. 17

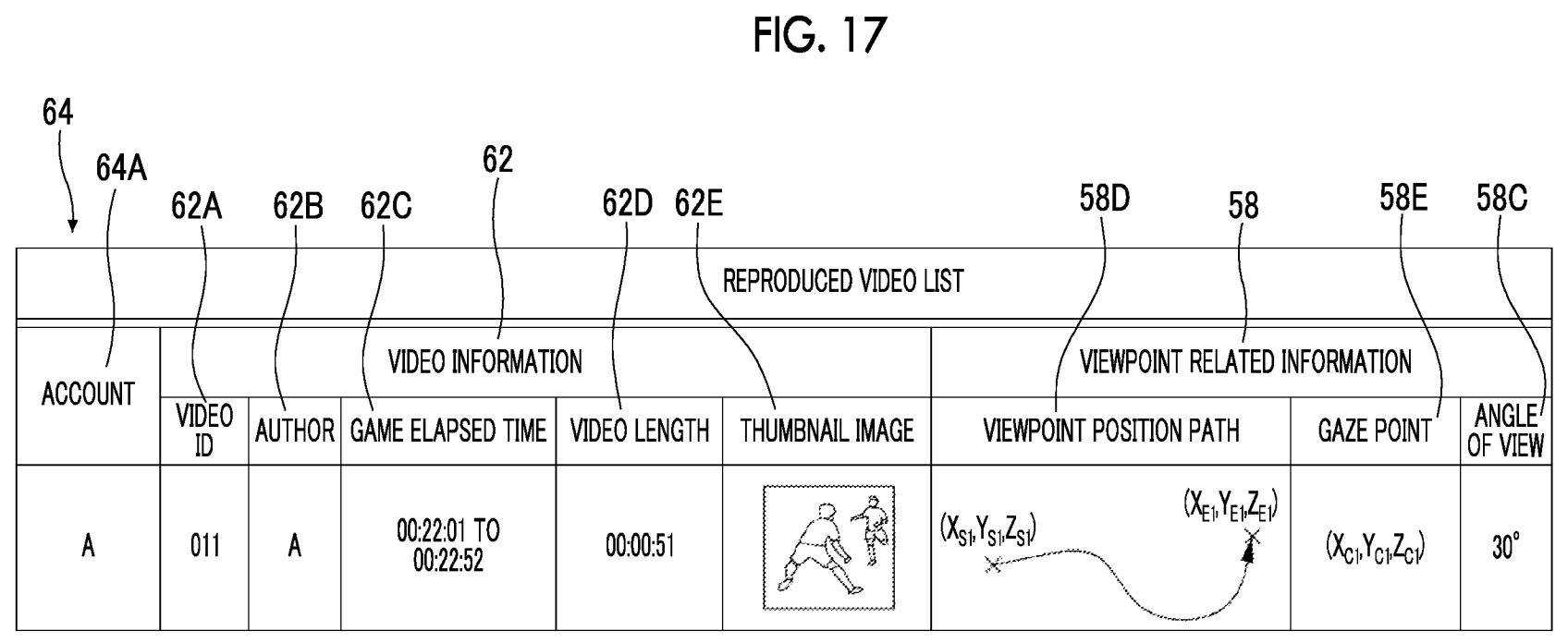

REPRODUCED VIDEO LIST

| ACCOUNT | VIDEO INFORMATION | | | | | VIEWPOINT RELATED INFORMATION | | |
|---|---|---|---|---|---|---|---|---|
| | VIDEO ID | AUTHOR | GAME ELAPSED TIME | VIDEO LENGTH | THUMBNAIL IMAGE | VIEWPOINT POSITION PATH | GAZE POINT | ANGLE OF VIEW |
| A | 011 | A | 00:22:01 TO 00:22:52 | 00:00:51 | | $(X_{S_i}, Y_{S_i}, Z_{S_i})$ ... $(X_{E_i}, Y_{E_i}, Z_{E_i})$ | $(X_{C_i}, Y_{C_i}, Z_{C_i})$ | 30° |

Figure 29:
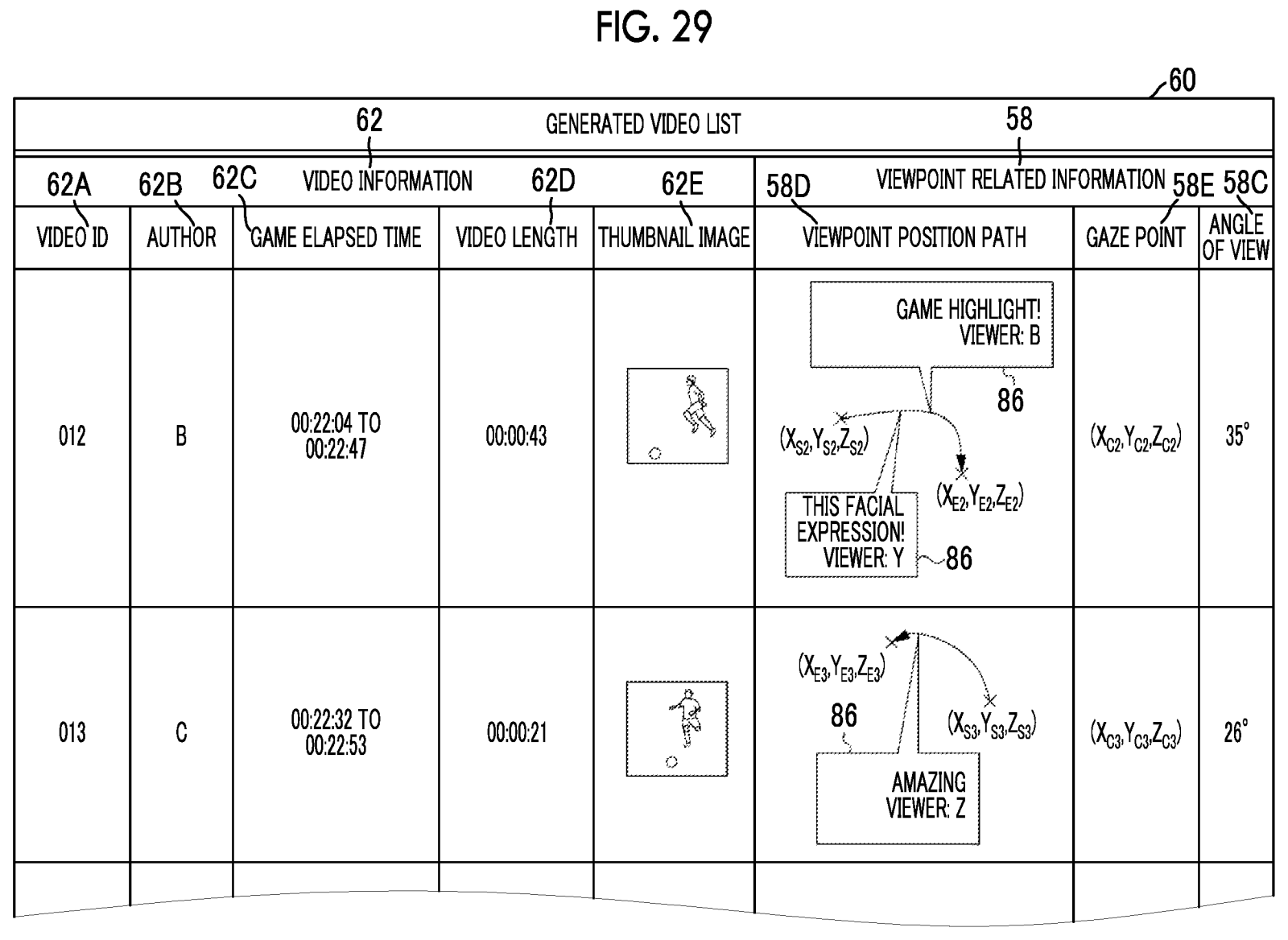

GENERATED VIDEO LIST — 60

| 62A VIDEO ID | 62B AUTHOR | 62C GAME ELAPSED TIME | 62D VIDEO LENGTH | 62E THUMBNAIL IMAGE | 58D VIEWPOINT POSITION PATH | GAZE POINT | 58C ANGLE OF VIEW |
|---|---|---|---|---|---|---|---|
| | | VIDEO INFORMATION 62 | | | VIEWPOINT RELATED INFORMATION 58 58E | | |
| 012 | B | 00:22:04 TO 00:22:47 | 00:00:43 | | GAME HIGHLIGHT! VIEWER: B — 86, $(X_{S2}, Y_{S2}, Z_{S2})$, $(X_{E2}, Y_{E2}, Z_{E2})$ | $(X_{C2}, Y_{C2}, Z_{C2})$ | 35° |
| 013 | C | 00:22:32 TO 00:22:53 | 00:00:21 | | THIS FACIAL EXPRESSION! VIEWER: Y — 86; AMAZING VIEWER: Z — 86, $(X_{S3}, Y_{S3}, Z_{S3})$, $(X_{E3}, Y_{E3}, Z_{E3})$ | $(X_{C3}, Y_{C3}, Z_{C3})$ | 26° |

FIG. 32

REPRODUCED VIDEO LIST 64

| ACCOUNT 64A | VIDEO ID 62A | AUTHOR 62B | GAME ELAPSED TIME 62C | VIDEO LENGTH 62D | THUMBNAIL IMAGE 62E | VIEWPOINT POSITION PATH 58D | GAZE POINT | ANGLE OF VIEW 58C | EVALUATION 90 |
|---|---|---|---|---|---|---|---|---|---|
| A | 011 | A | 00:22:01 TO 00:22:52 | 00:00:51 | | $(X_{S1}, Y_{S1}, Z_{S1})$ ... $(X_{E1}, Y_{E1}, Z_{E1})$ | $(X_{G1}, Y_{G1}, Z_{G1})$ | 30° | ☆ |
| | 012 | B | 00:22:04 TO 00:22:47 | 00:00:43 | | $(X_{S2}, Y_{S2}, Z_{S2})$ ... $(X_{E2}, Y_{E2}, Z_{E2})$ | $(X_{G2}, Y_{G2}, Z_{G2})$ | 35° | ☆☆ |
| | 015 | E | 00:22:17 TO 00:22:55 | 00:01:28 | | $(X_{E4}, Y_{E4}, Z_{E4})$ ... $(X_{S4}, Y_{S4}, Z_{S4})$ | $(X_{G4}, Y_{G4}, Z_{G4})$ | 27° | ☆☆☆ |

VIDEO INFORMATION 62   VIEWPOINT RELATED INFORMATION 58   58E

EVALUATION FOR VIRTUAL VIEWPOINT VIDEO OF AUTHOR E IS HIGH

WEIGHT VIRTUAL VIEWPOINT VIDEO OF AUTHOR E IN GENERATED VIDEO LIST

FIG. 34

REPRODUCED VIDEO LIST 64

| ACCOUNT 64A | VIDEO INFORMATION 62 | | | | | VIEWPOINT RELATED INFORMATION 58 | | | EVALUATION 90 |
| | VIDEO ID 62A | AUTHOR 62B | GAME ELAPSED TIME 62C | VIDEO LENGTH 62D | THUMBNAIL IMAGE 62E | VIEWPOINT POSITION PATH 58D | GAZE POINT 58E | ANGLE OF VIEW 58C | |
|---|---|---|---|---|---|---|---|---|---|
| A | 011 | A | 00:22:01 TO 00:22:52 | 00:00:51 | | $(X_{S1}, Y_{S1}, Z_{S1})$ $(X_{E1}, Y_{E1}, Z_{E1})$ | $(X_{E1}, Y_{E1}, Z_{E1})$ | 30° | ☆ |
| | 012 | B | 00:22:04 TO 00:22:47 | 00:00:43 | | $(X_{S2}, Y_{S2}, Z_{S2})$ $(X_{E2}, Y_{E2}, Z_{E2})$ | $(X_{C2}, Y_{C2}, Z_{C2})$ | 35° | ☆☆ |
| | 015 | E | 00:22:17 TO 00:22:55 | 00:01:28 | | $(X_{E4}, Y_{E4}, Z_{E4})$ $(X_{S4}, Y_{S4}, Z_{S4})$ | $(X_{C4}, Y_{C4}, Z_{C4})$ | 27° | ☆☆☆ |

RATIO OF VIEWPOINT POSITION PATH TO VIDEO LENGTH IS SMALL IN VIRTUAL VIEWPOINT VIDEO HAVING HIGH EVALUATION

PERFORM WEIGHTING ACCORDING TO RATIO OF VIEWPOINT POSITION PATH TO VIDEO LENGTH

FIG. 37

GENERATED VIDEO LIST — 60

| VIDEO ID | AUTHOR | GAME ELAPSED TIME | VIDEO LENGTH | THUMBNAIL IMAGE | VIEWPOINT POSITION PATH | GAZE POINT | ANGLE OF VIEW | DATA CAPACITY |
|---|---|---|---|---|---|---|---|---|
| 62A | 62B | 62C | 62D | 62E | 58D | | 58C | 96 |
| 011 | A | 00:22:01 TO 00:22:52 | 00:00:51 | | $(X_{S1}, Y_{S1}, Z_{S1})$ ... $(X_{E1}, Y_{E1}, Z_{E1})$ | $(X_{C1}, Y_{C1}, Z_{C1})$ | 30° | 336MB |
| 012 | B | 00:22:04 TO 00:22:47 | 00:00:43 | | $(X_{S2}, Y_{S2}, Z_{S2})$ ... $(X_{E2}, Y_{E2}, Z_{E2})$ | $(X_{C2}, Y_{C2}, Z_{C2})$ | 35° | 420MB |
| 013 | C | 00:22:32 TO 00:22:53 | 00:00:21 | | $(X_{S3}, Y_{S3}, Z_{S3})$ ... $(X_{E3}, Y_{E3}, Z_{E3})$ | $(X_{C3}, Y_{C3}, Z_{C3})$ | 26° | 572MB |

62 — VIDEO INFORMATION
58 — VIEWPOINT RELATED INFORMATION
58E

PERFORM REARRANGEMENT ON BASIS OF DATA CAPACITY

STORE AS RECOMMENDED VIDEO LIST

GENERATED VIDEO LIST 60

| 62A VIDEO ID | 62B AUTHOR | VIDEO INFORMATION 62 | | 62E THUMBNAIL IMAGE | VIEWPOINT RELATED INFORMATION 58 | | 58C ANGLE OF VIEW | 98 SOUND DATA |
|---|---|---|---|---|---|---|---|---|
| | | 62C GAME ELAPSED TIME | 62D VIDEO LENGTH | | 58D VIEWPOINT POSITION PATH | 58E GAZE POINT | | |
| 011 | A | 00:22:01 TO 00:22:52 | 00:00:51 | | $(X_{S1}, Y_{S1}\text{-}Z_{S1})$ ... $(X_{E1}, Y_{E1}\text{-}Z_{E1})$ | $(X_{C1}, Y_{C1}\text{-}Z_{C1})$ | 30° | ○ |
| 012 | B | 00:22:04 TO 00:22:47 | 00:00:43 | | $(X_{S2}, Y_{S2}\text{-}Z_{S2})$ ... $(X_{E2}, Y_{E2}\text{-}Z_{E2})$ | $(X_{C2}, Y_{C2}\text{-}Z_{C2})$ | 35° | ○ |
| 013 | C | 00:22:32 TO 00:22:53 | 00:00:21 | | $(X_{S3}, Y_{S3}\text{-}Z_{S3})$ ... $(X_{E3}, Y_{E3}\text{-}Z_{E3})$ | $(X_{C3}, Y_{C3}\text{-}Z_{C3})$ | 26° | - |

PERFORM REARRANGEMENT ON BASIS OF PRESENCE OR ABSENCE OF SOUND DATA ⇨ STORE AS RECOMMENDED VIDEO LIST

FIG. 44

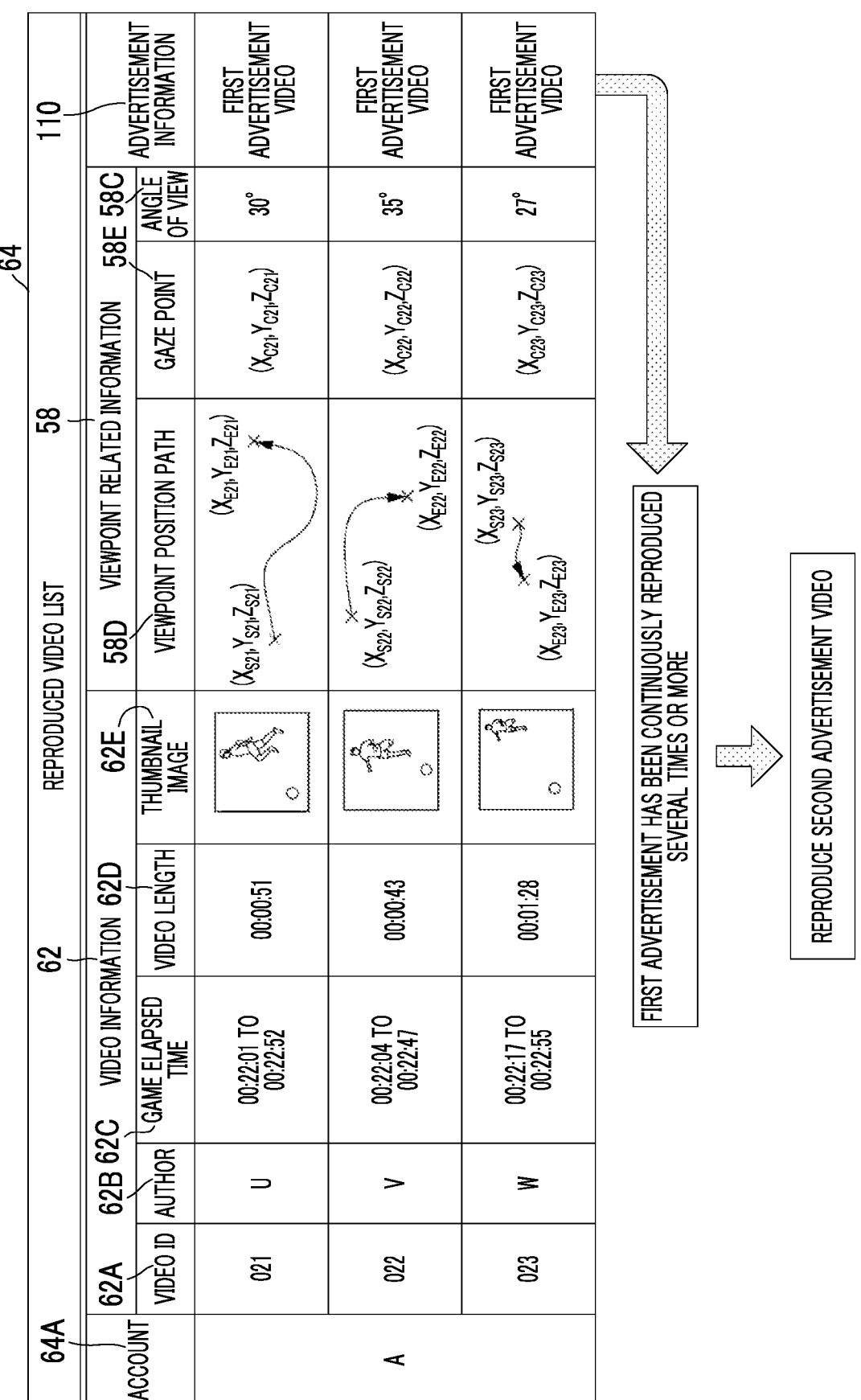

| ACCOUNT | VIDEO ID | AUTHOR | GAME ELAPSED TIME | VIDEO LENGTH | THUMBNAIL IMAGE | VIEWPOINT POSITION PATH | GAZE POINT | ANGLE OF VIEW | ADVERTISEMENT INFORMATION |
|---|---|---|---|---|---|---|---|---|---|
| A | 021 | U | 00:22:01 TO 00:22:52 | 00:00:51 | | $(X_{S21}, Y_{S21}, Z_{S21})$ $(X_{E21}, Y_{E21}, Z_{E21})$ | $(X_{C21}, Y_{C21}, Z_{C21})$ | 30° | FIRST ADVERTISEMENT VIDEO |
| | 022 | V | 00:22:04 TO 00:22:47 | 00:00:43 | | $(X_{S22}, Y_{S22}, Z_{S22})$ $(X_{E22}, Y_{E22}, Z_{E22})$ | $(X_{C22}, Y_{C22}, Z_{C22})$ | 35° | FIRST ADVERTISEMENT VIDEO |
| | 023 | W | 00:22:17 TO 00:22:55 | 00:01:28 | | $(X_{S23}, Y_{S23}, Z_{S23})$ $(X_{E23}, Y_{E23}, Z_{E23})$ | $(X_{C23}, Y_{C23}, Z_{C23})$ | 27° | FIRST ADVERTISEMENT VIDEO |

FIRST ADVERTISEMENT HAS BEEN CONTINUOUSLY REPRODUCED SEVERAL TIMES OR MORE

REPRODUCE SECOND ADVERTISEMENT VIDEO

FIG. 53

REPRODUCED VIDEO LIST 62

| ACCOUNT 64A | VIDEO INFORMATION 62C | | | | VIEWPOINT RELATED INFORMATION 58 | | |
|---|---|---|---|---|---|---|---|
| | VIDEO ID 62A | AUTHOR 62B | GAME ELAPSED TIME | VIDEO LENGTH 62D | THUMBNAIL IMAGE 62E | VIEWPOINT POSITION PATH 58D | GAZE POINT | ANGLE OF VIEW 58C |
| A | 011 | A | 00:22:01 TO 00:22:52 | 00:00:51 | | $(X_{S1}, Y_{S1}, Z_{S1})$ ... $(X_{E1}, Y_{E1}, Z_{E1})$ | $(X_{C1}, Y_{C1}, Z_{C1})$ 58E | 30° |
| | 012 | B | 00:22:04 TO 00:22:47 | 00:00:43 | | $(X_{S2}, Y_{S2}, Z_{S2})$ ... $(X_{E2}, Y_{E2}, Z_{E2})$ | $(X_{C2}, Y_{C2}, Z_{C2})$ | 35° |

64

VIRTUAL VIEWPOINT VIDEO OF WHICH REPRODUCTION IS STOPPED IN MIDDLE

FIG. 54

GENERATED VIDEO LIST 58 — 60 — 140

| VIDEO ID (62A) | VIDEO LENGTH (62D) | THUMBNAIL IMAGE (62E) | VIEWPOINT POSITION PATH (58D) | GAZE POINT | ANGLE OF VIEW (58E 58C) | VIEWER DATA (140A) | | NUMBER OF TIMES OF VIEWING (140B) |
|---|---|---|---|---|---|---|---|---|
| 101 | 00:05:51 | | $(X_{S1}, Y_{S1}, Z_{S1})$ — $(X_{E1}, Y_{E1}, Z_{E1})$ | $(X_{C1}, Y_{C1}, Z_{C1})$ | 30° | VIEWER A | VIEWED | THREE |
| | | | | | | VIEWER B | VIEWED | |
| | | | | | | VIEWER C | VIEWED | |
| 102 | 00:07:43 | | $(X_{S2}, Y_{S2}, Z_{S2})$ — $(X_{E2}, Y_{E2}, Z_{E2})$ | $(X_{C2}, Y_{C2}, Z_{C2})$ | 30° | VIEWER A | VIEWED | THREE |
| | | | | | | VIEWER B | VIEWED | |
| | | | | | | VIEWER C | VIEWED | |
| 103 | 00:10:21 | | $(X_{E3}, Y_{E3}, Z_{E3})$ — $(X_{S3}, Y_{S3}, Z_{S3})$ | $(X_{C3}, Y_{C3}, Z_{C3})$ | 30° | VIEWER A | VIEWED | TWO |
| | | | | | | VIEWER B | VIEWED | |
| | | | | | | VIEWER C | | |
| 104 | 00:06:41 | | $(X_{E4}, Y_{E4}, Z_{E4})$ — $(X_{S4}, Y_{S4}, Z_{S4})$ | $(X_{C3}, Y_{C3}, Z_{C3})$ | 30° | VIEWER A | VIEWED | TWO |
| | | | | | | VIEWER B | | |
| | | | | | | VIEWER C | VIEWED | |
| 105 | 00:08:21 | | $(X_{E5}, Y_{E5}, Z_{E5})$ — $(X_{S5}, Y_{S5}, Z_{S5})$ | $(X_{C3}, Y_{C3}, Z_{C3})$ | 30° | VIEWER A | VIEWED | ONE |
| | | | | | | VIEWER B | | |
| | | | | | | VIEWER C | | |

STORAGE MEDIUM　200

OPERATION PROGRAM　24

INSTALL

DATA PROCESSING APPARATUS　10

COMPUTER

CPU　14A

NVM　14B

RAM　14C

14

DATA PROCESSING APPARATUS, DATA PROCESSING METHOD, AND PROGRAM

CROSS-REFERENCE TO RELATED APPLICATIONS

This application is a continuation application of International Application No. PCT/JP2021/028836, filed Aug. 3, 2021, the disclosure of which is incorporated herein by reference in its entirety. Further, this application claims priority under 35 USC 119 from Japanese Patent Application No. 2020-163978 filed Sep. 29, 2020, the disclosure of which is incorporated by reference herein.

BACKGROUND

1. Technical Field

The technology of the present disclosure relates to a data processing apparatus, a data processing method, and a program.

2. Related Art

JP2020-009021A discloses a data processing apparatus including a setting unit and a generation unit. The setting unit sets a first virtual viewpoint position related to generation of a virtual viewpoint image on the basis of multi-viewpoint images obtained from a plurality of cameras. The generation unit generates viewpoint position information indicating a second virtual viewpoint position of which at least one of a position or a direction is different from that of the first virtual viewpoint position set by the setting unit and that corresponds to a time common to the first virtual viewpoint position on the basis of the first virtual viewpoint position set by the setting unit.

JP2018-036956A discloses a display control apparatus including a reception unit and a display control unit. The reception unit receives a virtual viewpoint position according to an operation of a user. The display control unit performs control such that a first virtual viewpoint image generated from a captured image on the basis of a virtual viewpoint position, and a second virtual viewpoint image having a wider virtual imaging range than the first virtual viewpoint image are displayed on a display screen.

JP2015-187797A discloses an image data generation apparatus that acquires viewpoint image data captured from one or more viewpoint positions, and generates free viewpoint image data in which an image from any viewpoint position can be reproduced by using the acquired viewpoint image data. The image data generation apparatus includes an object disposition data generation unit, a free viewpoint position metadata generation unit, a coding unit, and a multiplexing unit. The object disposition data generation unit generates object coordinate data indicating a disposition position of an object in background model data created as image data by modeling the background. The free viewpoint position metadata generation unit recommended viewpoint position disposition data including viewpoint position coordinate data indicating a position that is a base point of a viewpoint position, and one or more pieces of rotation base point data indicating an initial position in a direction of the viewpoint position and indicating a rotation center in a case where a free viewpoint position is displayed by rotating the viewpoint position, and generates free viewpoint position metadata from the object coordinate data and the recommended viewpoint position disposition data. The coding unit encodes the viewpoint image data and region image data for identifying a region of each object in the viewpoint image data. The multiplexing unit multiplexes the free viewpoint position metadata, the viewpoint image data, the region image data, and the background model data to generate the free viewpoint image data.

SUMMARY

One embodiment according to the technology of the present disclosure provides a data processing apparatus, a data processing method, and a program enabling a viewer to easily select a virtual viewpoint image intended by the viewer compared with a case where only first data related to a reproduction history and/or registration data of a virtual viewpoint image is used in a device.

According to a first aspect of the technology of the present disclosure, there is provided a data processing apparatus including a processor, and a memory built in or connected to the processor, in which the data processing apparatus transmits a virtual viewpoint image generated on the basis of a captured image to a device, and the processor is configured to acquire first data regarding a reproduction history and/or registration data of the virtual viewpoint image, and perform control for transmitting second data regarding the virtual viewpoint image to the device on the basis of the acquired first data.

According to a second aspect of the technology of the present disclosure, in the data processing apparatus of the first aspect, the processor is configured to perform control for transmitting the second data regarding a second virtual viewpoint image that is the virtual viewpoint image different from a first virtual viewpoint image that is the virtual viewpoint image related to the first data.

According to a third aspect of the technology of the present disclosure, in the data processing apparatus of the second aspect, the first data includes viewpoint related information related to a viewpoint of the virtual viewpoint image.

According to a fourth aspect of the technology of the present disclosure, in the data processing apparatus of the third aspect, the viewpoint related information includes at least one of a viewpoint position, a visual line direction, an angle of view, a gaze point, a viewpoint position path indicating a displacement of the viewpoint position over time, or a gaze point path indicating a displacement of the gaze point over time.

According to a fifth aspect of the technology of the present disclosure, in the data processing apparatus of the fourth aspect, the first data includes first time information regarding an imaging time of the captured image used for generating the virtual viewpoint image.

According to a sixth aspect of the technology of the present disclosure, in the data processing apparatus of the fifth aspect, the second data includes at least one of a reduced image of the virtual viewpoint image or the viewpoint related information.

According to a seventh aspect of the technology of the present disclosure, in the data processing apparatus of the sixth aspect, the second data is data in which at least one of the reduced image or the viewpoint related information is displayed on the device in descending order of a similarity regarding the viewpoint related information with the viewpoint related information included in the first data and in ascending order of a similarity regarding the first time information with the first time information included in the first data.

According to an eighth aspect of the technology of the present disclosure, in the data processing apparatus of the sixth aspect, the second data is data in which at least one of the reduced image or the viewpoint related information is displayed on the device in ascending order of a similarity regarding the viewpoint related information with the viewpoint related information included in the first data and in descending order of a similarity regarding the first time information with the first time information included in the first data.

According to a ninth aspect of the technology of the present disclosure, in the data processing apparatus of the seventh aspect or the eighth aspect, the processor is configured to acquire the similarity regarding the viewpoint related information on the basis of a difference in the viewpoint position path or the gaze point path between positions of the viewpoint related information included in the first data and the viewpoint related information included in the second data.

According to a tenth aspect of the technology of the present disclosure, in the data processing apparatus of the seventh aspect or the eighth aspect, the processor is configured to acquire the similarity regarding the viewpoint related information on the basis of a difference in a tag attached to the viewpoint position path or the gaze point path.

According to an eleventh aspect of the technology of the present disclosure, in the data processing apparatus of any one of the sixth aspect to the tenth aspect, the second data is data in which at least one of the reduced image or the viewpoint related information is displayed on the device in an order determined on the basis of a similarity between an attribute of a viewer who has viewed the first virtual viewpoint image by using the device and an attribute of an author of the second virtual viewpoint image.

According to a twelfth aspect of the technology of the present disclosure, in the data processing apparatus of any one of the sixth aspect to the eleventh aspect, the second data is data in which at least one of the reduced image or the viewpoint related information is displayed on the device in an order determined on the basis of a difference between the reproduction history of the virtual viewpoint image by a viewer who has viewed the first virtual viewpoint image by using the device and the reproduction history of the virtual viewpoint image by another viewer.

According to a thirteenth aspect of the technology of the present disclosure, in the data processing apparatus of any one of the sixth aspect to the twelfth aspect, the second data is data in which at least one of the reduced image or the viewpoint related information is displayed on the device in an order determined on the basis of a reproduction tendency extracted from the reproduction history of the virtual viewpoint image by a viewer who has viewed the first virtual viewpoint image by using the device.

According to a fourteenth aspect of the technology of the present disclosure, in the data processing apparatus according to any one of the sixth aspect to the thirteenth aspect, the second data is data in which at least one of the reduced image or the viewpoint related information is displayed on the device in an order determined on the basis of a comment added to each of a plurality of the second virtual viewpoint images.

According to a fifteenth aspect of the technology of the present disclosure, in the data processing apparatus of the fourteenth aspect, the comment is a comment added to a viewpoint position path indicating a displacement of a viewpoint position included in the second data over time or a gaze point path indicating a displacement of a gaze point included in the second data over time, and the second data is data in which an image in which the comment is added to a form of the viewpoint position path or a form of the gaze point path is displayed on the device.

According to a sixteenth aspect of the technology of the present disclosure, in the data processing apparatus according to any one of the sixth aspect to the fifteenth aspect, the second data is data in which at least one of the reduced image or the viewpoint related information is displayed on the device in an order determined on the basis of a first evaluation given to each of a plurality of the second virtual viewpoint images.

According to a seventeenth aspect of the technology of the present disclosure, in the data processing apparatus according to any one of the sixth aspect to the sixteenth aspect, the second data is data in which at least one of the reduced image or the viewpoint related information is displayed on the device in an order determined according to a preference of a viewer estimated on the basis of a second evaluation for the first virtual viewpoint image.

According to an eighteenth aspect of the technology of the present disclosure, in the data processing apparatus according to any one of the sixth aspect to the seventeenth aspect, in a case where a new virtual viewpoint image is added, the second data is data in which at least one of the reduced image or the viewpoint related information regarding the added virtual viewpoint image is displayed on the device on the basis of the first data.

According to a nineteenth aspect of the technology of the present disclosure, in the data processing apparatus of any one of the sixth aspect to the eighteenth aspect, the virtual viewpoint image is a video, and the second data is data in which at least one of the reduced image or the viewpoint related information is displayed on the device in an order determined on the basis of a length of a viewpoint position path indicating a displacement of a viewpoint position included in the first data over time or a length of a gaze point path indicating a displacement of a gaze point included in the first data over time with respect to a time from start to end of reproduction of the first virtual viewpoint image.

According to a twentieth aspect of the technology of the present disclosure, in the data processing apparatus of the sixth aspect to the nineteenth aspect, the virtual viewpoint image is a video, and the second data is data in which at least one of the reduced image or the viewpoint related information is displayed on the device in an order determined on the basis of a ratio between second time information regarding an imaging time of the captured image used for generating the second virtual viewpoint image and a time from start to end of reproduction of the second virtual viewpoint image.

According to a twenty-first aspect of the technology of the present disclosure, in the data processing apparatus of any one of the sixth aspect to the twentieth aspect, the second data is data in which at least one of the reduced image or the viewpoint related information is displayed on the device in an order determined on the basis of a data capacity of each of a plurality of the second virtual viewpoint images.

According to a twenty-second aspect of the technology of the present disclosure, in the data processing apparatus of any one of the sixth aspect to the twenty-first aspect, the second data is data in which at least one of the reduced image or the viewpoint related information is displayed on the device in an order determined on the basis of a parameter related to image quality of each of a plurality of the second virtual viewpoint images.

According to a twenty-third aspect of the technology of the present disclosure, in the data processing apparatus of any one of the sixth aspect to the twenty-second aspect, the second data is data in which at least one of the reduced image or the viewpoint related information is displayed on the device in an order determined on the basis of sound data added to the second virtual viewpoint image.

According to a twenty-fourth aspect of the technology of the present disclosure, in the data processing apparatus of any one of the sixth aspect to the twenty-third aspect, the second data is data in which a plurality of the second virtual viewpoint images, which are sequentially reproduced on the device on a condition in which the processor receives a reproduction instruction for giving an instruction for reproduction of the second virtual viewpoint images, are reproduced on the device.

According to a twenty-fifth aspect of the technology of the present disclosure, in the data processing apparatus according to the twenty-fourth aspect, the second data is data in which, each time reproduction of each of the plurality of second virtual viewpoint images is ended, a first image different from the first virtual viewpoint image and the second virtual viewpoint image is reproduced on the device.

According to a twenty-sixth aspect of the technology of the present disclosure, in the data processing apparatus of any one of the second aspect to the twenty-fifth aspect, the second data is data in which a second image that is a condition for reproducing the second virtual viewpoint image is reproduced on the device.

According to a twenty-seventh aspect of the technology of the present disclosure, in the data processing apparatus according to the twenty-sixth aspect, the second data is data in which a third image that is a condition for reproducing the second virtual viewpoint image is reproduced on the device on the basis of image information regarding details of the second image transmitted to the device.

According to a twenty-eighth aspect of the technology of the present disclosure, in the data processing apparatus of any one of the second aspect to the twenty-seventh aspect, the second data is data in which a composite image in which a second virtual viewpoint image selected in accordance with a given instruction among a plurality of the second virtual viewpoint images is combined with a viewpoint position path indicating a displacement of a viewpoint position over time or a gaze point path indicating a displacement of a gaze point over time related to another second virtual viewpoint image is reproduced on the device.

According to a twenty-ninth aspect of the technology of the present disclosure, in the data processing apparatus of the twenty-eighth aspect, in a case where a path change instruction for the viewpoint position path or the gaze point path is received, the second data is data in which reproduction of the composite image is stopped and the second virtual viewpoint image corresponding to the viewpoint position path or the gaze point path included in the path change instruction is reproduced on the device.

According to a thirtieth aspect of the technology of the present disclosure, in the data processing apparatus of any one of the second aspect to the twenty-ninth aspect, in a case where a change instruction for viewpoint related information related to a viewpoint of the second virtual viewpoint image that is being reproduced on the device is received, the second data is data in which a virtual viewpoint image generated on the basis of new viewpoint related information derived on the basis of the change instruction is reproduced on the device.

According to a thirty-first aspect of the technology of the present disclosure, in the data processing apparatus of any one of the second aspect to the thirtieth aspect, in a case where a replay image generation instruction for the second virtual viewpoint image that is being reproduced on the device is received, the second data is data in which a virtual viewpoint image generated on the basis of new viewpoint related information generated on the basis of viewpoint related information related to a viewpoint of the second virtual viewpoint image is reproduced on the device.

In a thirty-second aspect of the technology of the present disclosure, in the data processing apparatus of any one of the second aspect to the thirty-first aspect, in a case where viewing refusal subject information regarding a subject of which viewing is refused is received, the second data is data in which a virtual viewpoint image generated on the basis of viewpoint related information generated on the basis of the viewing refusal subject information is reproduced on the device.

According to a thirty-third aspect of the technology of the present disclosure, in the data processing apparatus of any one of the second aspect to the thirty-second aspect, the second virtual viewpoint image is a video including images of a plurality of frames, and, in a case where a digest image display instruction for a reduced image of the second virtual viewpoint image is received, the reduced image being included in the second data, the second data is data in which a digest image generated by extracting the images of the plurality of frames in which viewpoint positions differ at a predetermined interval from the second virtual viewpoint image is reproduced on the device.

According to a thirty-fourth aspect of the technology of the present disclosure, in the data processing apparatus of any one of the second aspect to the thirty-third aspect, the processor is configured to perform control for transmitting, to the device, a path image in which a form of a viewpoint position path indicating a displacement of a viewpoint position of the first virtual viewpoint image over time, or a form of a gaze point path indicating a displacement of a gaze point of the first virtual viewpoint image over time is displayed in association with the second data, and the path image is an image in which the form of the viewpoint position path or the form of the gaze point path is shown in a manner distinguishable from the second data.

According to a thirty-fifth aspect of the technology of the present disclosure, in the data processing apparatus of any one of the second aspect to the thirty-fourth aspect, the second data includes a reduced image of the second virtual viewpoint image and a form of a viewpoint position path indicating a displacement of a viewpoint position of the second virtual viewpoint image over time, or a form of a gaze point path indicating a displacement of a gaze point of the second virtual viewpoint image over time, and the second data includes first position information for specifying a position of the reduced image on the viewpoint position path or the gaze point path.

According to a thirty-sixth aspect of the technology of the present disclosure, in the data processing apparatus of any one of the second aspect to the thirty-fifth aspect, the second data regarding the second virtual viewpoint image includes second position information that is disposed in a time series in a horizontal direction and is disposed in a vertical direction according to a similarity of viewpoint related information of the second virtual viewpoint image for viewpoint related information of the first virtual viewpoint image.

According to a thirty-seventh aspect of the technology of the present disclosure, in the data processing apparatus of any one of the second aspect to the thirty-sixth aspect, the registration data includes attribute data indicating an attribute of a viewer who has viewed the first virtual viewpoint image and preference data indicating a preference of the viewer.

According to a thirty-eighth aspect of the technology of the present disclosure, in the data processing apparatus of the thirty-seventh aspect, the second data is data excluding data regarding a virtual viewpoint image that is a viewing restriction target from the virtual viewpoint image on the basis of the attribute data.

In a thirty-ninth aspect of the technology of the present disclosure, in the data processing apparatus of any one of the second aspect to the thirty-eighth aspect, in a case where a time setting instruction for third time information regarding an imaging time of the captured image used for generating the virtual viewpoint image is received, the second data is data regarding a second virtual viewpoint image in which the third time information is within a range indicated by the time setting instruction among a plurality of the second virtual viewpoint images.

According to a fortieth aspect of the technology of the present disclosure, in the data processing apparatus of the thirty-ninth aspect, in a case where the time setting instruction is received, the second data includes the number of time-limited virtual viewpoint images in which the third time information is within the range indicated by the time setting instruction among the virtual viewpoint images, and the number of images included in the second virtual viewpoint image among the time-limited virtual viewpoint images.

According to a forty-first aspect of the technology of the present disclosure, in the data processing apparatus according to any one of the first aspect to the forty aspect, the processor is configured to acquire the reproduction history of the virtual viewpoint image to an account associated with a viewer of the virtual viewpoint image, and output the reproduction history in association with viewpoint related information related to a viewpoint of the virtual viewpoint image.

According to a forty-second aspect of the technology of the present disclosure, in the data processing apparatus of any one of the first aspect to the forty-first aspect, the processor is configured to aggregate the number of times each virtual viewpoint image has been reproduced, and output an aggregation result in association with viewpoint related information related to a viewpoint of the virtual viewpoint image.

According to a forty-third aspect of the technology of the present disclosure, in the data processing apparatus of any one of the first aspect to the forty-second aspect, the processor is configured to perform control for transmitting, to the device, a path image in which a form of a viewpoint position path indicating a displacement of a viewpoint position of the virtual viewpoint image over time, or a form of a gaze point path indicating a displacement of a gaze point of the virtual viewpoint image over time is displayed in association with the second data, and the path image is an image in which, of the viewpoint position path or the gaze point path, a portion in which the virtual viewpoint image has been reproduced and a portion in which the virtual viewpoint image has not been reproduced are shown in a distinguishable manner.

According to a forty-fourth aspect of the technology of the present disclosure, in the data processing apparatus of any one of the first aspect to the forty-third aspect, the first virtual viewpoint image includes a virtual viewpoint image in which at least a part of the virtual viewpoint images has been reproduced on the device.

According to a forty-fifth aspect of the technology of the present disclosure, there is provided a data processing apparatus including a processor; and a memory built in or connected to the processor, in which the data processing apparatus transmits a plurality of virtual viewpoint images generated on the basis of a captured image to a device, and the processor is configured to acquire first data regarding a first virtual viewpoint image that is a virtual viewpoint image at least a part of which has been transmitted to the device among the plurality of virtual viewpoint images, and perform control for transmitting, to the device, second data regarding a second virtual viewpoint image that has not been transmitted to the device among the plurality of virtual viewpoint images on the basis of the acquired first data.

According to a forty-sixth aspect of the technology of the present disclosure, there is provided a data processing method of transmitting a virtual viewpoint image generated on the basis of a captured image to a device, the data processing method including acquiring first data regarding a reproduction history and/or registration data of the virtual viewpoint image, and performing control for transmitting second data regarding the virtual viewpoint image to the device on the basis of the acquired first data.

According to a forty-seventh aspect of the technology of the present disclosure, there is provided a program for causing a computer to execute data processing of transmitting a virtual viewpoint image generated on the basis of a captured image to a device, in which the data processing includes acquiring first data regarding a reproduction history and/or registration data of the virtual viewpoint image, and performing control for transmitting second data regarding the virtual viewpoint image to the device on the basis of the acquired first data.

BRIEF DESCRIPTION OF THE DRAWINGS

Exemplary embodiments of the technology of the disclosure will be described in detail based on the following figures, wherein:

FIG. 6 is a conceptual diagram showing an example of a reproduced video list according to the first embodiment;

FIG. 9 is a conceptual diagram showing an example of a recommended video list according to the first embodiment;

FIG. 17 is a conceptual diagram showing an example of a reproduced video list according to the second embodiment;

FIG. 20 is a conceptual diagram showing an example of a function of a main constituent of the video reproduction unit according to the second embodiment;

FIG. 29 is a conceptual diagram showing an example of an aspect in which recommendation data is generated on the basis of a comment attached to a viewpoint position path;

FIG. 32 is a conceptual diagram showing an example of an aspect in which recommendation data is generated on the basis of evaluation given to a virtual viewpoint video that has already been viewed by a user who uses a user device that is a transmission source of a video reproduction instruction, generates recommendation data;

FIG. 34 is a conceptual diagram showing an example of an aspect in which recommendation data is generated on the basis of a ratio of a viewpoint position path to a video length;

FIG. 37 is a conceptual diagram showing an example of an aspect in which recommendation data is generated on the basis of a data capacity of a virtual viewpoint video;

FIG. 38 is a conceptual diagram showing an example of an aspect in which recommendation data is generated on the basis of a resolution of a virtual viewpoint video;

FIG. 39 is a conceptual diagram showing an example of an aspect in which recommendation data is generated on the basis of the presence or absence of sound data added to a virtual viewpoint video;

FIG. 44 is a conceptual diagram showing an example of an aspect in which an advertisement video is changed on the basis of advertisement information;

FIG. 53 is a conceptual diagram showing an example of an aspect in which a virtual viewpoint video of which reproduction is gazed in the middle is added to a reproduced video list;

FIG. 54 is a conceptual diagram showing an example of a generated video list including viewing data;

FIG. 57 is a conceptual diagram showing an example of an aspect in which an operation program stored in a storage medium is installed in a computer of a data processing apparatus.

DETAILED DESCRIPTION

An example of an embodiment of a data processing apparatus, a data processing method, and a program according to the technology of the present disclosure will be described with reference to the accompanying drawings.

First, the technical terms used in the following description will be described.

CPU stands for "Central Processing Unit". RAM stands for "Random Access Memory". SSD stands for "Solid State Drive". HDD stands for "Hard Disk Drive". EEPROM stands for "Electrically Erasable and Programmable Read Only Memory". I/F stands for "Interface". IC stands for "Integrated Circuit". ASIC stands for "Application Specific Integrated Circuit". PLD stands for "Programmable Logic Device". FPGA stands for "Field-Programmable Gate Array". GUI stands for "Graphical User Interface". SoC stands for "System-on-a-chip". GPU stands for "Graphics Processing Unit". LAN stands for "Local Area Network". WAN stands for "Wide Area Network". 3D stands for "3 Dimensions". USB stands for "Universal Serial Bus". ID stands for "Identification". NVM stands for "Non-volatile Memory". In the following description, for convenience of description, a CPU is exemplified as an example of a "processor" according to the technology of the present disclosure, but the "processor" according to the technology of the present disclosure may be a combination of a plurality of processing devices such as a CPU and a GPU. In a case where a combination of a CPU and a GPU is applied as an example of the "processor" according to the technology of the present disclosure, the GPU operates under the control of the CPU and executes image processing.

In the following description, the term "match" refers to, in addition to perfect match, a meaning including an error generally allowed in the technical field to which the technology of the present disclosure belongs (a meaning including an error to the extent that the error does not contradict the concept of the technology of the present disclosure).

First Embodiment

Figure 1:
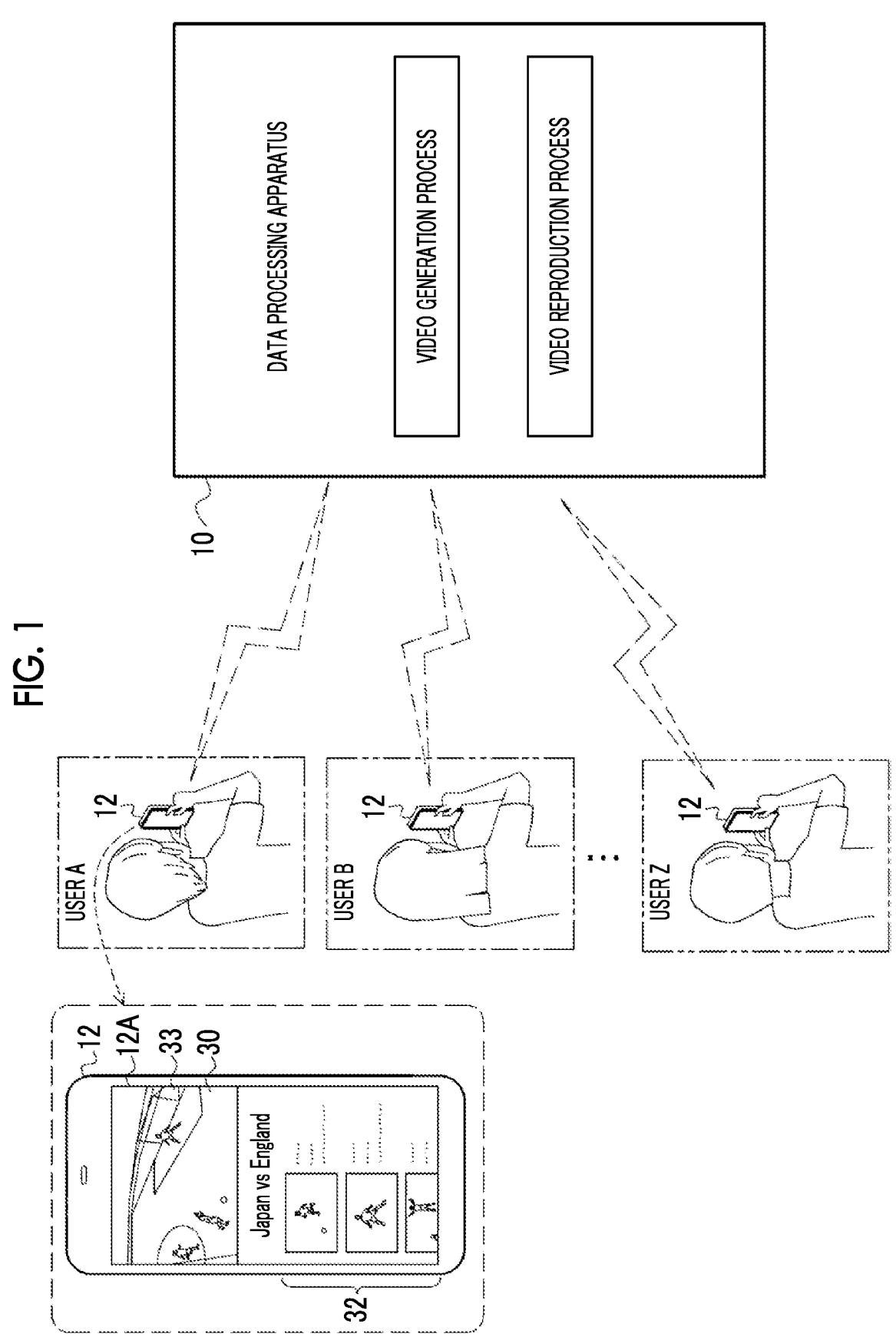
FIG. 1 is a conceptual diagram showing an example of a relationship between a data processing apparatus and a user device.

As shown in FIG. 1 as an example, a data processing apparatus 10 communicates with a plurality of user devices

12 via a communication network such as a LAN or a WAN. The data processing apparatus 10 performs a video generation process and a video reproduction process in response to a request from each user device 12. In the example shown in FIG. 1, a smart device is shown as the user device 12, but the user device 12 is not limited to this, and may be, for example, a personal computer, a tablet terminal, or a television with an Internet communication function. The data processing apparatus 10 is an example of a "data processing apparatus" according to the technology of the present disclosure. The user device 12 is an example of a "device" according to the technology of the present disclosure.

The video generation process is a process in which a virtual viewpoint video 30 is generated in response to a video generation request 50 (refer to FIG. 3) from each user device 12, and data of the generated virtual viewpoint video 30 is transmitted to the user device 12 that is a request source. Hereinafter, unless otherwise specified, data is transmitted to and received inside the data processing apparatus 10, inside the user device 12, and between the data processing apparatus 10 and the user device 12. The virtual viewpoint video 30 is stored in a database 22 (refer to FIG. 2) in the data processing apparatus 10 in addition to being transmitted to the user device 12 that is a request source. The virtual viewpoint video 30 is a video in a case where an imaging region is observed from a virtual viewpoint, and is a virtual video generated by a 3D polygon. The virtual viewpoint video 30 is an example of a "virtual viewpoint image" according to the technology of the present disclosure.

The video reproduction process is a process in which, among the plurality of virtual viewpoint videos 30 stored in the database 22, data regarding the virtual viewpoint video 30 that has not been transmitted to the user device 12 from which the video reproduction request 52 (refer to FIG. 3) has been received (hereinafter, also referred to as an "untransmitted virtual viewpoint video 30"), and the generated data is transmitted to the user device 12 that is a request source. In the first embodiment, as an example of "data regarding the untransmitted virtual viewpoint video 30", a form example of generating recommendation data 32 that facilitates selection of the virtual viewpoint video 30 by a user will be described. The untransmitted virtual viewpoint video 30 is an example of a "second virtual viewpoint image" according to the technology of the present disclosure. The recommendation data 32 is an example of "second data" according to the technology of the present disclosure.

The user device 12 reproduces the virtual viewpoint video 30 received from the data processing apparatus 10 on a video reproduction screen 33 provided on a touch panel display 12A. The user device 12 displays the recommendation data 32 below the video reproduction screen 33 of the touch panel display 12A. The data processing apparatus 10 is a device corresponding to a server, and the user device 12 is a device corresponding to a client terminal for the data processing apparatus 10.

The plurality of user devices 12 are respectively used by a plurality of users A, B, . . . , and Z. The users A, B, . . . , and Z each view the virtual viewpoint video 30 received from the data processing apparatus 10 by using the user device 12. The users A, B, . . . , and Z are examples of "viewers" according to the technology of the present disclosure. Hereinafter, in a case where it is not necessary to distinguish between the users A, B, . . . , and Z, the users will be collectively referred to as "users" without the reference signs.

Figure 2:
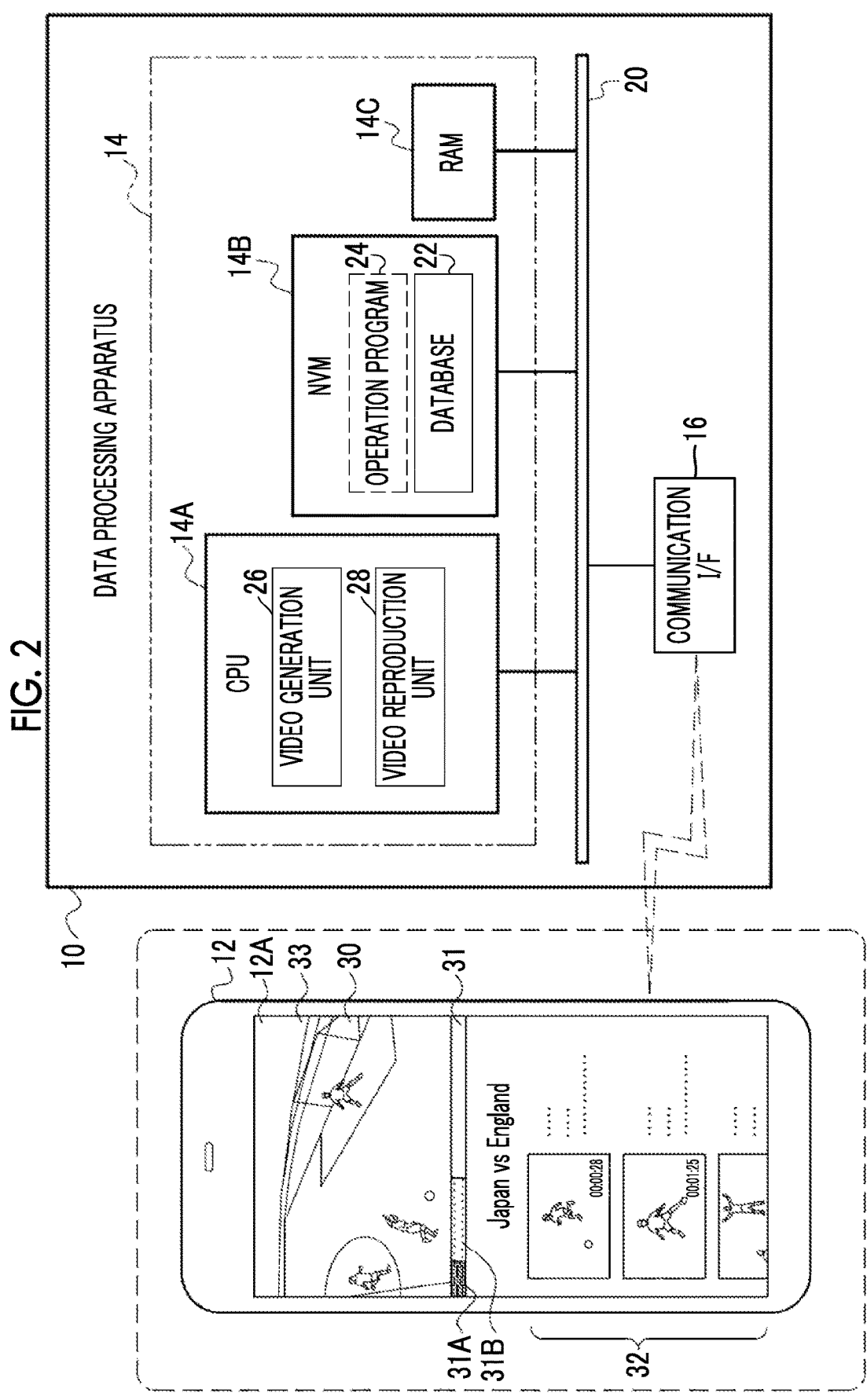
FIG. 2 is a block diagram showing an example of an electrical hardware configuration of the data processing apparatus and an example of a relationship with the user device.

As shown in FIG. 2 as an example, the data processing apparatus 10 includes a computer 14 and a communication I/F 16. The computer 14 includes a CPU 14A, an NVM 14B, and a RAM 14C, and the CPU 14A, the NVM 14B, and the RAM 14C are connected to each other via a bus 20. In the example shown in FIG. 2, one bus is shown as the bus 20 for convenience of illustration, but a plurality of buses may be used. The bus 20 may include a serial bus or a parallel bus configured with a data bus, an address bus, a control bus, and the like.

The CPU 14A controls the entire data processing apparatus 10. The NVM 14B is a non-volatile memory. Here, an EEPROM, an SSD, and an HDD are employed as an example of the NVM 14B. However, the technology of the present disclosure is not limited to this, and the NVM 14B may be an HDD, an SSD, an EEPROM, or the like, or may be a combination of a plurality of non-volatile memories. The NVM 14B includes a database 22 that stores the virtual viewpoint video 30 or the like generated by the data processing apparatus 10. The NVM 14B is an example of a "memory" according to the technology of the present disclosure.

Various types of data are temporarily stored in the RAM 14C. The RAM 14C is used as a work memory by the CPU 24A.

An operation program 24 is stored in the NVM 14B. The CPU 14A reads out the operation program 24 from the NVM 14B and executes the readout operation program 24 on the RAM 14C. The CPU 14A executes the video generation process by operating as a video generation unit 26 according to the operation program 24 executed on the RAM 14C, and executes the video reproduction process by operating as a video reproduction unit 28. The operation program 24 is an example of a "program" according to the technology of the present disclosure. The computer 14 is an example of a "computer" according to the technology of the present disclosure. The CPU 14A is an example of a "processor" according to the technology of the present disclosure.

The video generation unit 26 generates the virtual viewpoint video 30 on the basis of a captured video 34 (refer to FIG. 4) obtained by imaging an imaging region from a plurality of directions by using a plurality of imaging devices (not shown) in response to a request from each user device 12. The video generation unit 26 may acquire the virtual viewpoint video 30 generated by an external server or the like instead of generating the virtual viewpoint video 30 in the video generation unit 26. In the example shown in FIG. 2, the plurality of imaging devices are installed in a soccer field and image a region in the soccer field as an imaging region. The virtual viewpoint video 30 is a video in a case where the soccer field is observed from any viewpoint in the soccer field. The video generation unit 26 stores the generated virtual viewpoint video 30 in the database 22. The database 22 stores a plurality of virtual viewpoint videos 30 generated by the video generation unit 26 in response to requests from the plurality of user devices 12.

The video reproduction unit 28 generates recommendation data 32 regarding the untransmitted virtual viewpoint video 30 among the plurality of virtual viewpoint videos 30 stored in the database 22 in response to a request from each user device 12. The video reproduction unit 28 stores the generated recommendation data 32 in the database 22.

The communication I/F 16 is communicatively connected to the user device 12 via a communication network. The communication I/F 16 is realized by, for example, a device having an FPGA. The communication I/F 16 is connected to the bus 20. The communication I/F 16 is a wireless communication system and controls the exchange of various types of data between the CPU 14A and the user device 12. The communication I/F 16 may also be configured with a fixed circuit instead of the FPGA. The communication I/F 16 may be a circuit configured with an ASIC, an FPGA, and/or a PLD.

The CPU 14A reads out the virtual viewpoint video 30 and the recommendation data 32 from the database 22, and transmits the readout virtual viewpoint video 30 and recommendation data 32 to the user device 12 via the communication I/F 16. The user device 12 receives the virtual viewpoint video 30 and the recommendation data 32, reproduces the received virtual viewpoint video 30 on the video reproduction screen 33 of the touch panel display 12A, and displays the received recommendation data 32 on the touch panel display 12A. In the example shown in FIG. 2, the recommendation data 32 is displayed below the video reproduction screen 33. In the technology of the present disclosure, "reproduction" is a process of displaying an image on the video reproduction screen 33 of the touch panel display 12A of the user device 12. An image to be reproduced on the touch panel display 12A is not limited to the virtual viewpoint video 30, and may be another video or a still image.

A seek bar 31 showing a transmission status and a reproduction location of the virtual viewpoint video 30 is displayed below the video display screen 33. A lateral length of the seek bar 31 corresponds to a length of the virtual viewpoint video 30 that is being reproduced. In the seek bar 31, a reproduction location display portion 31A shown in dark color indicates a reproduction location of the virtual viewpoint video 30 that is being reproduced on the video display screen 33. In the seek bar 31, a transmission status display portion 31B shown in a lighter color than that of the reproduction location display portion 31A includes a data transmission status from the data processing apparatus 10 related to the virtual viewpoint video 30 that is being reproduced on the video display screen 33 to the user device 12.

Figure 3:
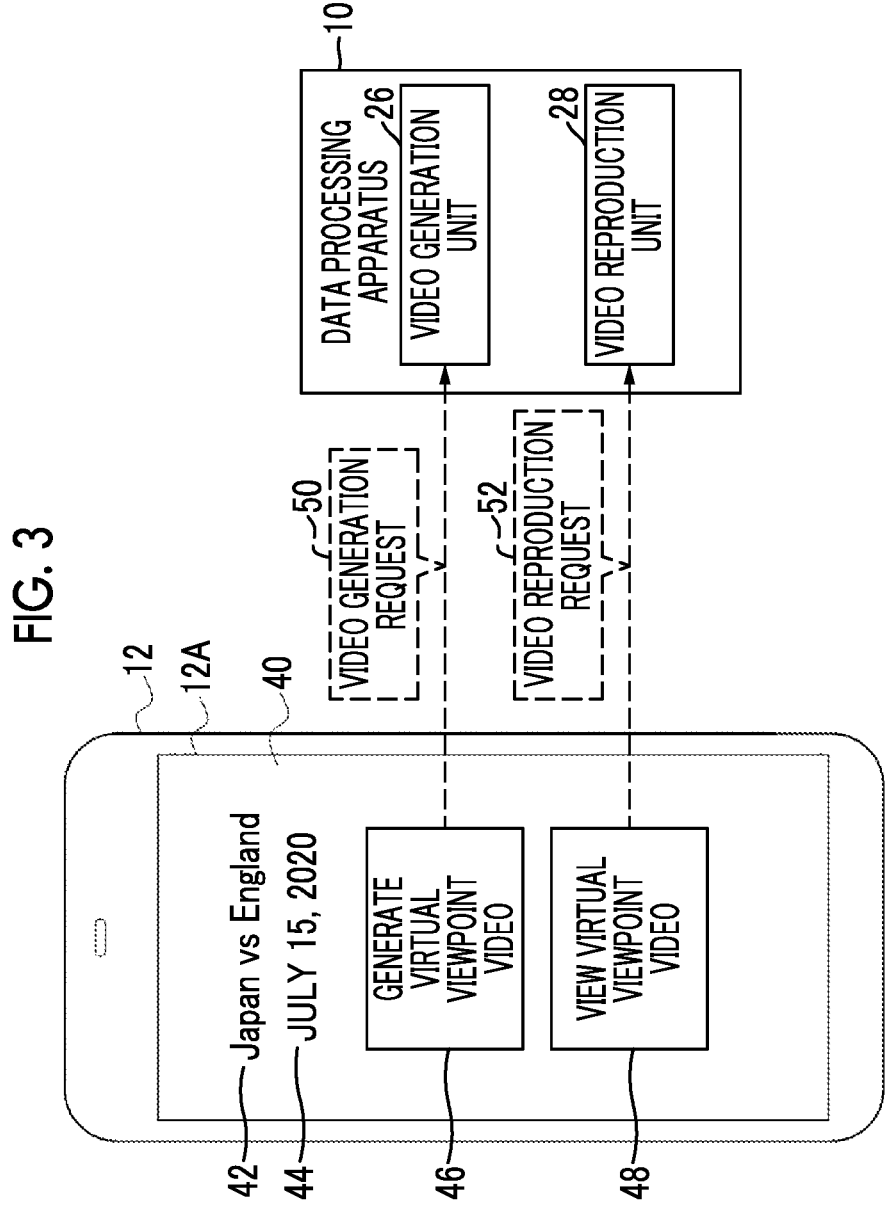
FIG. 3 is a conceptual diagram showing an example of a menu screen displayed on the data processing apparatus.

As shown in FIG. 3 as an example, through a user operation on the user device 12, the user device 12 accesses the data processing apparatus 10 with an account associated with each user, and in a case where communication between the user device 12 and the data processing apparatus 10 is established, the data processing apparatus 10 transmits a menu screen 40 to the user device 12. The user device 12 displays the menu screen 40 received from the data processing apparatus 10 on the touch panel display 12A. The account associated with each user is an example of an "account" according to the technology of the present disclosure.

On the menu screen 40, a title 42 of an event in which the virtual viewpoint video 30 can be generated and viewed, and the date 44 on which the event is performed are displayed. A generation button 46 and a viewing button 48 are displayed on the menu screen 40.

In a case where the user device 12 receives a GUI operation of the user on the generation button 46, the user device 12 transmits a video generation request 50 for requesting generation of the virtual viewpoint video 30 to the video generation unit 26. The video generation unit 26 starts the video generation process in a case where the video generation request 50 is received from the user device 12. In a case where the user device 12 receives a GUI operation of the user on the viewing button 48, the user device 12 transmits a video reproduction request 52 for requesting reproduction of a video to the video reproduction unit 28. In a case where the video reproduction request 52 is received from the user device 12, the video reproduction unit 28 starts the video reproduction process.

Figure 4:
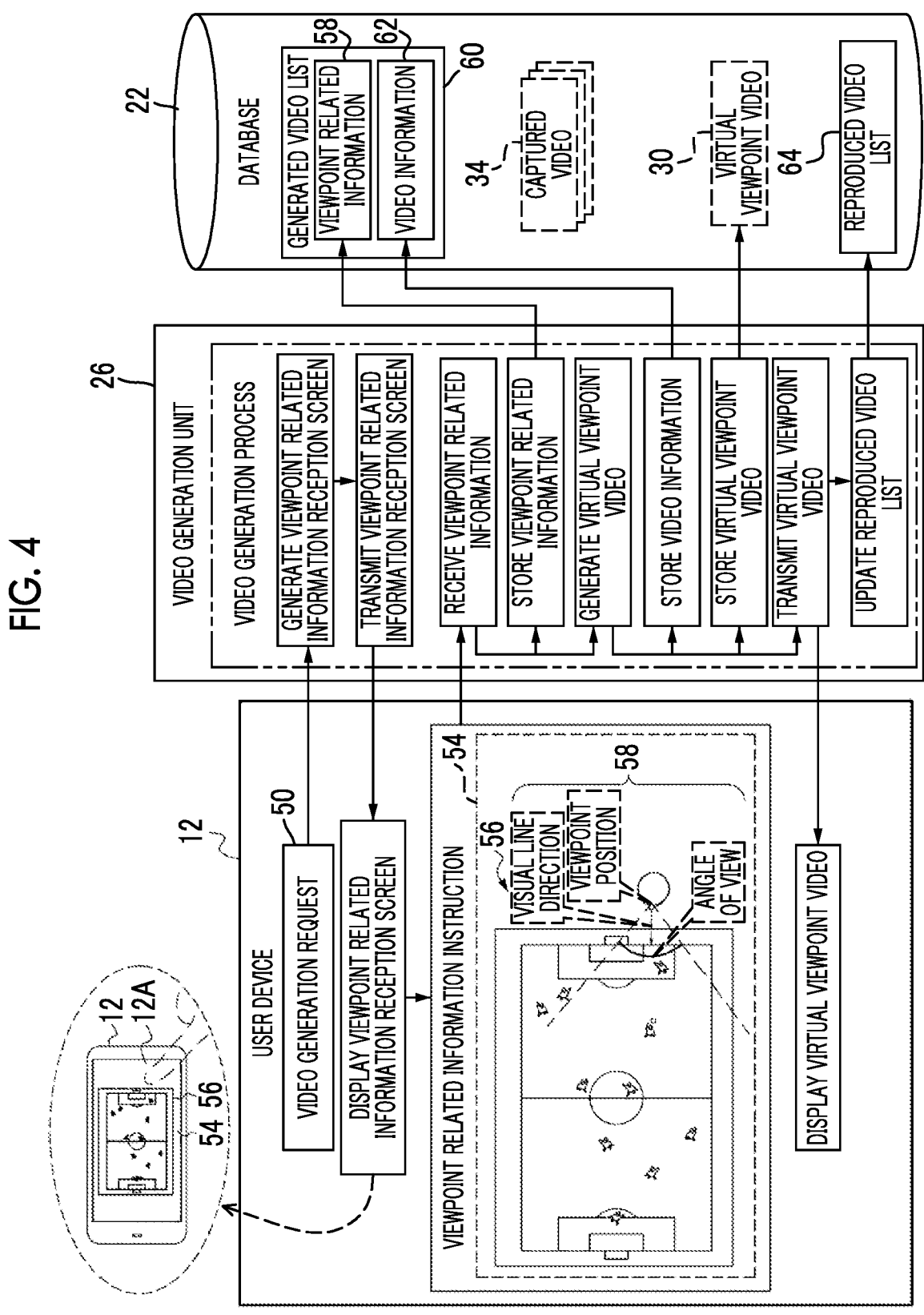
FIG. 4 is a block diagram showing an example of a function of a main constituent of a video generation unit according to a first embodiment.

An example of the video generation process performed by the video generation unit 26 will be specifically described below with reference to FIG. 4. In a case where the video generation request 50 is received from the user device 12, the video generation unit 26 generates a viewpoint related information reception screen 54. The video generation unit 26 transmits the generated viewpoint related information reception screen 54 to the user device 12 that is an output source of the video generation request 50. The user device 12 receives the viewpoint related information reception screen 54 and displays the received viewpoint related information reception screen 54 on the touch panel display 12A.

The viewpoint related information reception screen 54 is a screen used for receiving viewpoint related information 58 related to a viewpoint of the virtual viewpoint video 30. In the first embodiment, the viewpoint related information 58 is data including a viewpoint position, a visual line direction, and an angle of view with respect to a virtual viewpoint. The viewpoint related information 58 is an example of "viewpoint related information" according to the technology of the present disclosure.

A bird's-eye view image 56 of the soccer field is displayed on the viewpoint related information reception screen 54. The bird's-eye view image 56 may be an image obtained by actually capturing an image of the soccer field from directly above or diagonally above, or may be an image pseudo-generated on the basis of an aspect ratio of the soccer field. The bird's-eye view image 56 is an image having a similarity relationship with the soccer field, and the similarity ratio is, for example, several hundreds:1.

The touch panel display 12A receives an operation from the user on the viewpoint related information reception screen 54. The user designates a virtual viewpoint position, a visual line direction, and an angle of view on the viewpoint related information reception screen 54. The user device 12 derives coordinates of a viewpoint position 58A (refer to FIG. 5) with respect to the soccer field on the basis of coordinates of the viewpoint position designated with respect to the bird's-eye view image 56. The user device 12 derives a visual line direction 58B (refer to FIG. 5) in the soccer field on the basis of the designation of the visual line direction with respect to the bird's-eye view image 56. The user device 12 derives an angle of view 58C (refer to FIG. 5) in the soccer field on the basis of the designation of the angle of view with respect to the bird's-eye view image 56. The user device 12 transmits the derived viewpoint position 58A, visual line direction 58B, and angle of view 58C to the video generation unit 26 as the viewpoint related information 58.

The video generation unit 26 receives the viewpoint related information 58 and records the received viewpoint related information 58 in a generated video list 60 of the database 22. The video generation unit 26 generates the virtual viewpoint video 30 by using the captured video 34 on the basis of the received viewpoint related information 58. Specifically, the video generation unit 26 generates the virtual viewpoint video 30 in which the imaging region is observed from the viewpoint position 58A in the visual line direction 58B at an angle of view 58C. The viewpoint 58A is an example of a "viewpoint position" according to the technology of the present disclosure. The visual line direction 58B is an example of a "visual line direction" according to the technology of the present disclosure. The angle of view 58C is an example of an "angle of view" according to the technology of the present disclosure.

The video generation unit 26 records video information 62 regarding the generated virtual viewpoint video 30 in the generated video list 60 of the database 22 in association with the viewpoint related information 58 used to generate the virtual viewpoint video 30. The video generation unit 26 stores the generated virtual viewpoint video 30 in the database 22.

The video generation unit 26 transmits the generated virtual viewpoint video 30 to the user device 12 that is an output source of the video generation request 50. The user device 12 receives the virtual viewpoint video 30 and displays the received virtual viewpoint video 30 on the touch panel display 12A. The video generation unit 26 adds the viewpoint related information 58 and the video information 62 regarding the transmitted virtual viewpoint video 30 to a reproduced video list 64 corresponding to the account of the user who uses the user device 12 to which the virtual viewpoint video 30 has been transmitted among a plurality of reproduced video lists 64 stored in the database 22. Hereinafter, the viewpoint related information 58 and the video information 62 will also be collectively referred to as "information".

Figure 5:
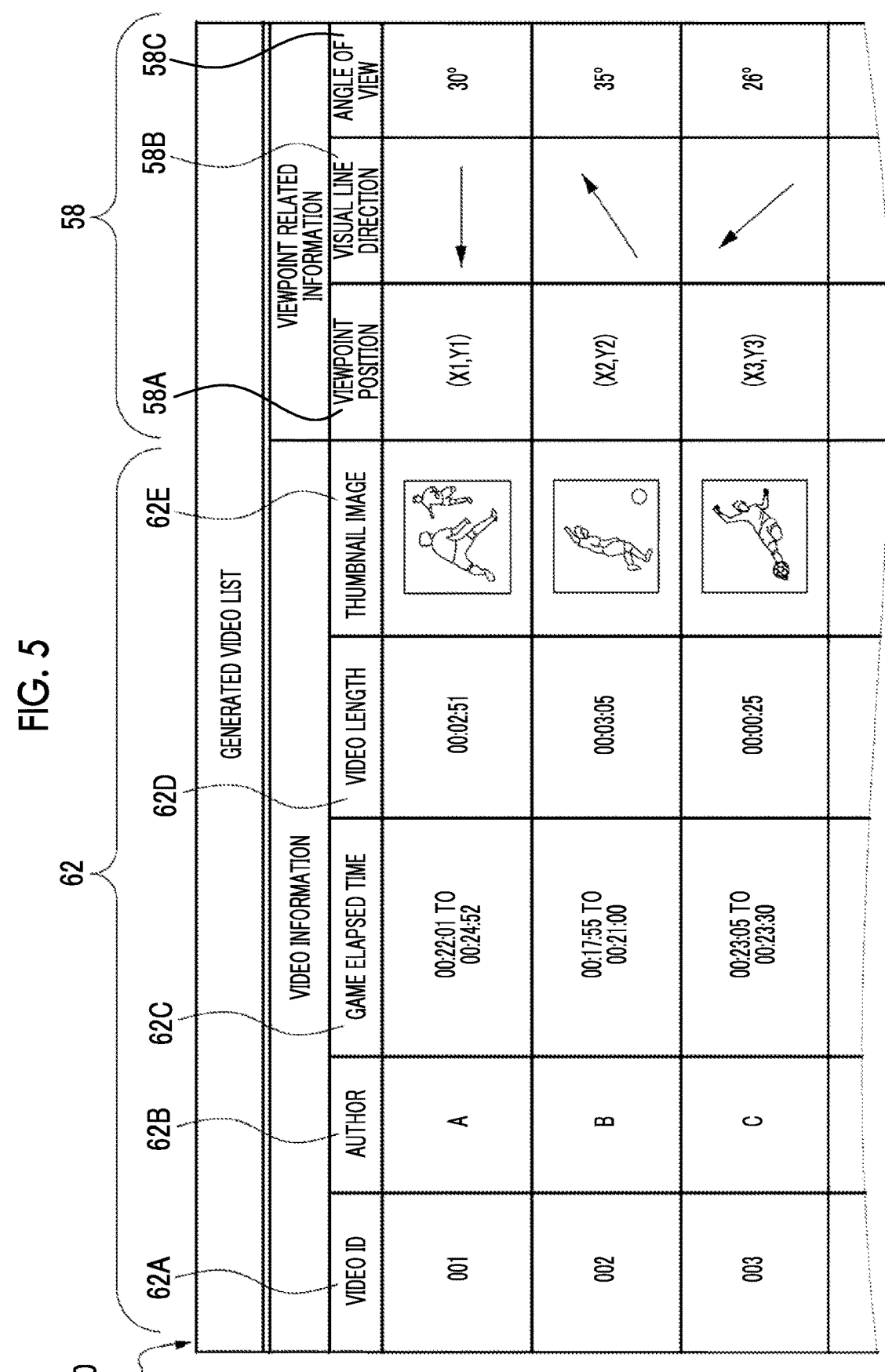
FIG. 5 is a conceptual diagram showing an example of a generated video list according to the first embodiment.

As shown in FIG. 5 as an example, the viewpoint related information 58 and the video information 62 regarding the plurality of virtual viewpoint videos 30 generated by the video generation unit 26 are recorded in a list form in the generated video list 60. The viewpoint related information 58 includes the viewpoint position 58A, the visual line direction 58B, and the angle of view 58C of the virtual viewpoint video 30. The video information 62 includes a video ID 62A assigned to each virtual viewpoint video 30, an author 62B of the virtual viewpoint video 30, a soccer game elapsed time 62C corresponding to the virtual viewpoint video 30, a video length 62D, and a thumbnail image 62E of the virtual viewpoint video 30.

The game elapsed time 62C is a time calculated on the basis of an imaging time of the captured video 34 used to generate the virtual viewpoint video 30. Specifically, in the captured video 34 used to generate the virtual viewpoint video 30, a value obtained by subtracting a game start time from an imaging time of a captured image of a first frame is a start time of the game elapsed time 62C, and a value obtained by subtracting the game start time from an imaging time of a captured image of a last frame is an end time of the game elapsed time 62C. The game elapsed time 62C is an example of "first time information" according to the technology of the present disclosure.

As shown in FIG. 6 as an example, the reproduced video list 64 is a list generated for each user's account. For example, FIG. 6 shows the reproduced video list 64 of the user A, in which the account name "A" of the user A is recorded in a field of an account 64A. In the reproduced video list 64 shown in FIG. 6, data regarding the virtual viewpoint video 30 that has been reproduced by the user device 12 that is accessing the data processing apparatus 10 with the account of the user A, that is, the virtual viewpoint video 30 that the user A has viewed is recorded in a list form.

The reproduced video list 64 shows a reproduction history of the virtual viewpoint video 30 related to the user device 12 accessing the data processing apparatus 10 with the account of the user A. Since the "reproduction" is a process of displaying an image on the video reproduction screen 33 of the touch panel display 12A of the user device 12, the "reproduction history of the virtual viewpoint video 30 related to the user device 12" is synonymous with a "history of displaying the virtual viewpoint video 30 on the video reproduction screen 33 of the touch panel display 12A". The reproduction history recorded in the reproduced video list 64 is an example of a "reproduction history" according to the technology of the present disclosure. The content recorded in the reproduced video list 64 is an example of "first data" according to the technology of the present disclosure.

Figure 7:
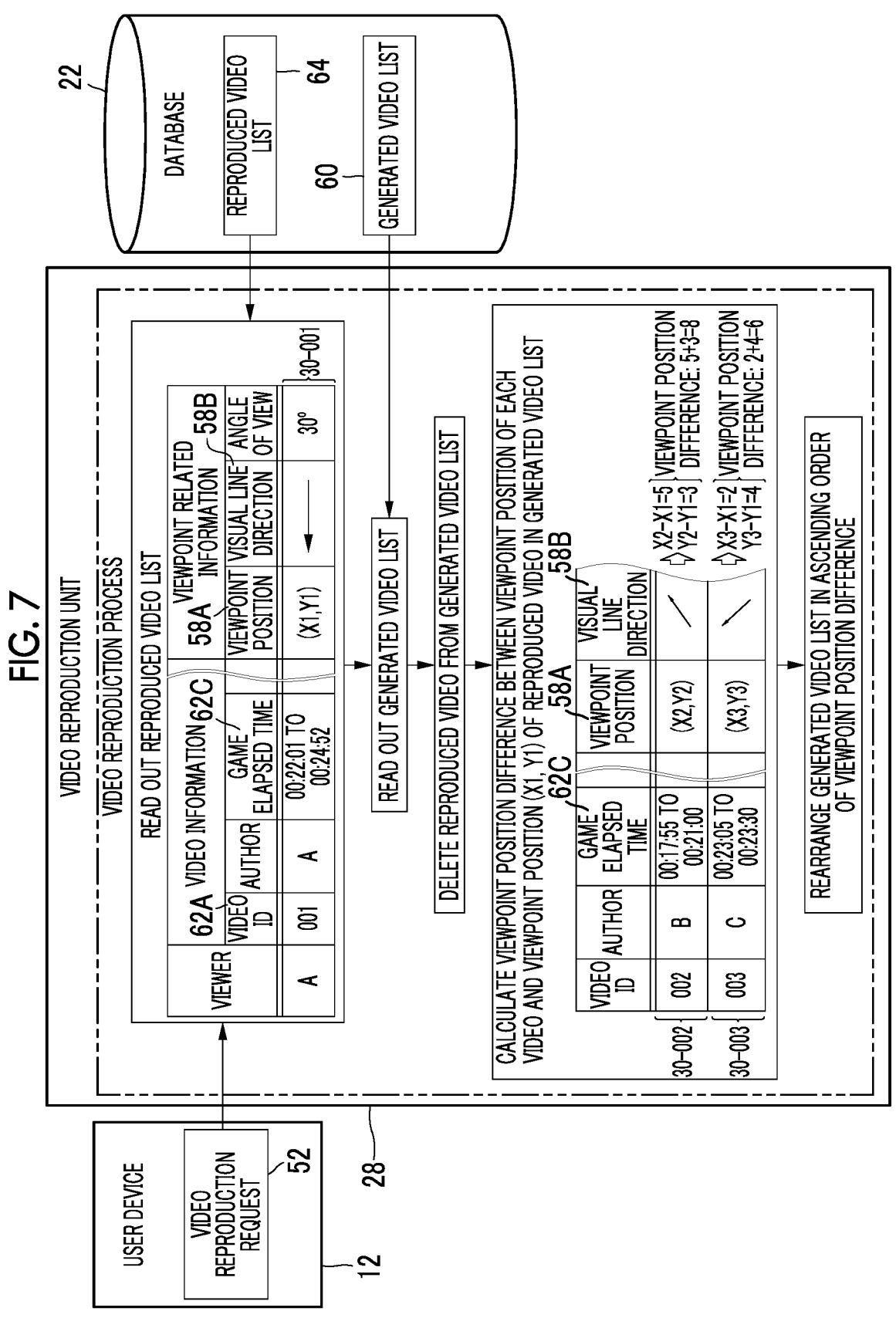
FIG. 7 is a conceptual diagram showing an example of a function of a main constituent of a video reproduction unit according to the first embodiment.

An example of the video reproduction process performed by the video reproduction unit 28 will be specifically described below with reference to FIG. 7. For example, in a case where the video reproduction request 52 is received from the user device 12 of the user A, the video reproduction unit 28 reads out the reproduced video list 64 corresponding to the account of the user A from the database 22. Information regarding the virtual viewpoint video 30 (hereinafter, referred to as a "virtual viewpoint video 30-001") having an image ID 62A of "001" is recorded in the reproduced video list 64 corresponding to the account of the user A. The virtual viewpoint video 30-001 is an example of a "first virtual viewpoint image" according to the technology of the present disclosure.

The video reproduction unit 28 reads out the generated video list 60 from the database 22. In the generated video list 60, data regarding the virtual viewpoint video 30 created by the video generation unit 26 is recorded (refer to FIG. 5). The video reproduction unit 28 deletes information regarding the virtual viewpoint video 30-001 recorded in the reproduced video list 64 from the generated video list 60. As a result, information regarding the virtual viewpoint video 30 that is different from the virtual viewpoint video 30-001, that is, information regarding the virtual viewpoint video 30 (untransmitted virtual viewpoint video 30) that has not been transmitted to the user device 12 remains in the generated video list 60. The untransmitted virtual viewpoint video 30 is an example of a "second virtual viewpoint image" according to the technology of the present disclosure. The information regarding the virtual viewpoint video 30-001 recorded in the reproduced video list 64 does not necessarily have to be deleted from the generated video list 60, and information indicating completion of transmission may be added to the information regarding the virtual viewpoint video 30-001 to be distinguished from the virtual viewpoint video 30 which has not been transmitted.

The video reproduction unit 28 calculates a viewpoint position difference between the viewpoint position 58A of each untransmitted virtual viewpoint video 30 remaining in the generated video list 60 and the viewpoint position 58A of the virtual viewpoint video 30-001 recorded in the reproduced video list 64 (hereinafter, referred to as a "reference viewpoint position"). For example, the video reproduction unit 28 acquires coordinates (X2, Y2) indicating the viewpoint position 58A of the untransmitted virtual viewpoint video 30 (hereinafter, referred to as an "untransmitted virtual viewpoint video 30-002") having the video ID 62A of "002" and the coordinates (X1, Y1) of the reference viewpoint position. The video reproduction unit 28 takes a difference between X2 and X1 to calculate a difference in an X-axis direction between the viewpoint position 58A of the untransmitted virtual viewpoint video 30-002 and the reference viewpoint position (hereinafter, an "X-axis direction viewpoint position difference"). The video reproduction unit 28 takes a difference between Y2 and Y1 to calculate a difference in a Y-axis direction between the viewpoint position 58A of the untransmitted virtual viewpoint video 30-002 and the reference viewpoint position (hereinafter, a "Y-axis direction viewpoint position difference"). The video reproduction unit 28 calculates a sum of the X-axis direction viewpoint position difference and the Y-axis direction viewpoint position difference as a viewpoint position difference of the untransmitted virtual viewpoint video 30-002.

The video reproduction unit 28 similarly calculates a viewpoint position difference between the viewpoint position 58A of the virtual viewpoint video 30 (hereinafter, referred to as an "untransmitted virtual viewpoint video 30-003") having the video ID 62A of "003" and the reference viewpoint position. The video reproduction unit 28 rearranges the untransmitted virtual viewpoint videos 30 in the generated video list 60 in ascending order of viewpoint position difference, that is, in descending order of the similarity with the reference viewpoint position. For example, in a case where the viewpoint position difference of the untransmitted virtual viewpoint video 30-002 is 8 and the viewpoint position difference of the untransmitted virtual viewpoint video 30-003 is 6, the video reproduction unit 28 moves the untransmitted virtual viewpoint video 30-003 to a higher position in the generated video list 60 than the untransmitted virtual viewpoint video 30-002.

Figure 8:
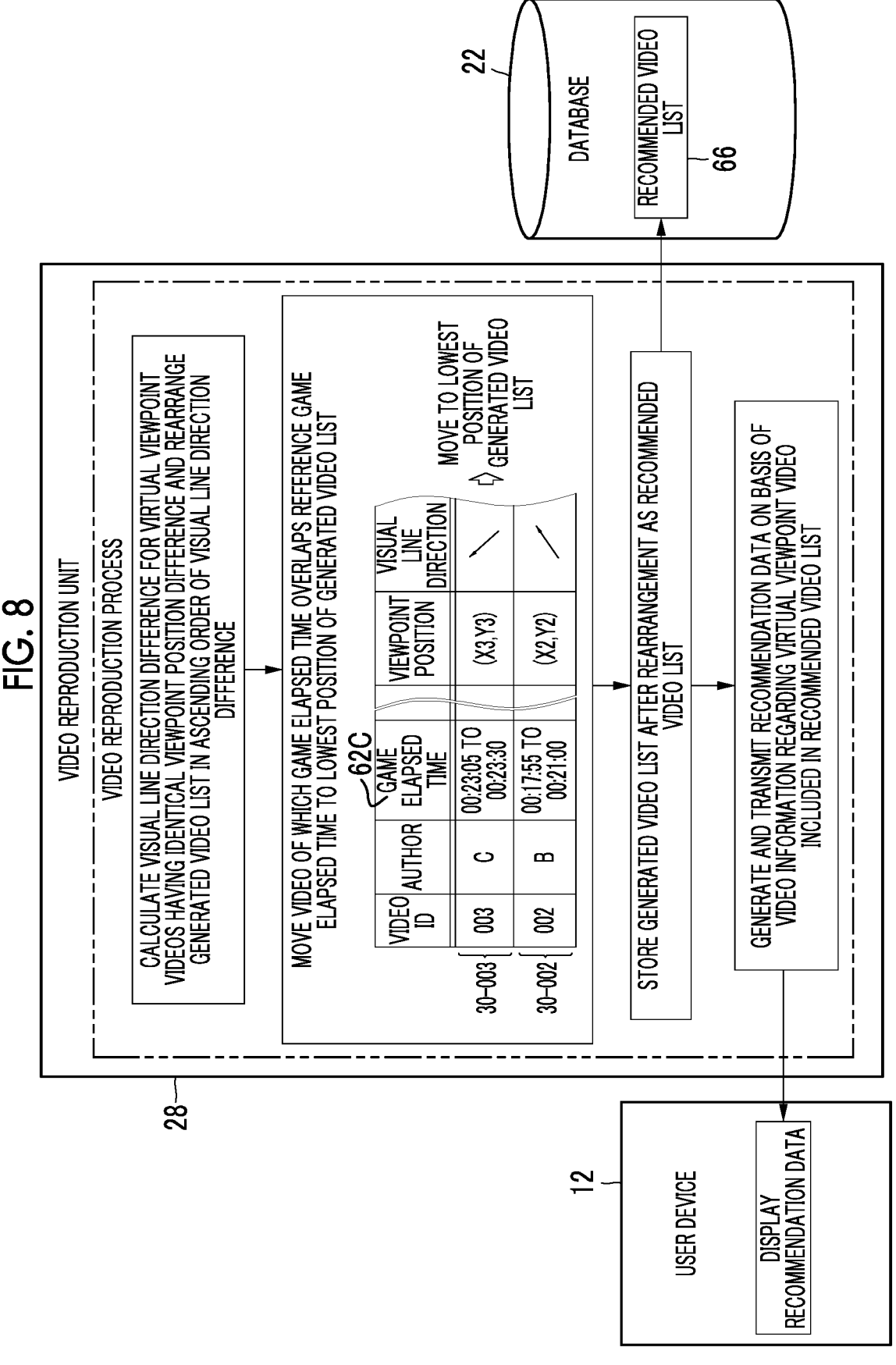
FIG. 8 is a conceptual diagram showing an example of a function of a main constituent of the video reproduction unit according to the first embodiment.

As shown in FIG. 8 as an example, the video reproduction unit 28 calculates, for the untransmitted virtual viewpoint videos 30 having an identical viewpoint position difference, a difference (hereinafter, a "visual line direction difference") between the visual line direction 58B of each untransmitted virtual viewpoint video 30 and the visual line direction 58B (hereinafter, a "reference visual line direction") of the virtual viewpoint videos 30-001. The video reproduction unit 28 rearranges the untransmitted virtual viewpoint videos 30 in the generated video list 60 in ascending order of difference in visual line direction, that is, in descending order of similarity with the reference visual line direction, for the untransmitted virtual viewpoint videos 30 having an identical viewpoint position difference.

The video reproduction unit 28 compares the game elapsed time 62C of the untransmitted virtual viewpoint video 30 with the game elapsed time 62C (hereinafter, referred to as a "reference game elapsed time") of the virtual viewpoint video 30-001 recorded in the reproduced video list 64. The video reproduction unit 28 moves the untransmitted virtual viewpoint video 30 of which the game elapsed time 62C overlaps the reference game elapsed time over a predetermined value (for example, several tens of seconds) or more to the lowest position of the generated video list 60. That is, the video reproduction unit 28 moves the untransmitted virtual viewpoint video 30 having the game elapsed time 62C having a high similarity with the reference game elapsed time to the lowest position in the generated video list 60. For example, in the first embodiment, the game elapsed time 62C of the virtual viewpoint video 30-003 overlaps the reference game elapsed time for 25 seconds. Therefore, the video reproduction unit 28 moves the virtual viewpoint video 30-003 to the lowest position of the generated video list 60.

The video reproduction unit 28 stores the generated video list 60 after the rearrangement in the database 22 as the recommended video list 66. The video reproduction unit 28 generates the recommendation data 32 on the basis of the video information 62 regarding the untransmitted virtual viewpoint video 30 in the arrangement order of the untransmitted virtual viewpoint videos 30 recorded in the recommended video list 66.

As shown in FIG. 9 as an example, in the recommended video list 66, information regarding the untransmitted virtual viewpoint video 30 is recorded in the recommended order. The video reproduction unit 28 reads out the video information 62 regarding the five untransmitted virtual viewpoint videos 30 recorded in the recommended video list 66 from the database 22 in the arrangement order of the untransmitted virtual viewpoint videos 30 recorded in the recommended video list 66. The video reproduction unit 28 generates the recommendation data 32 including the video information 62 regarding the five untransmitted virtual viewpoint videos 30 read out from the database 22, and the video ID 62A, the author 62B, the game elapsed time 62C, the video length 62D, and the disposition information of the thumbnail image 62E included in the video information 62. The video reproduction unit 28 transmits the generated recommendation data 32 to the user device 12. The user device 12 receives the recommendation data 32 and displays the received recommendation data 32 on the touch panel display 12A as a recommendation screen 70 (refer to FIG. 10).

Figure 10:
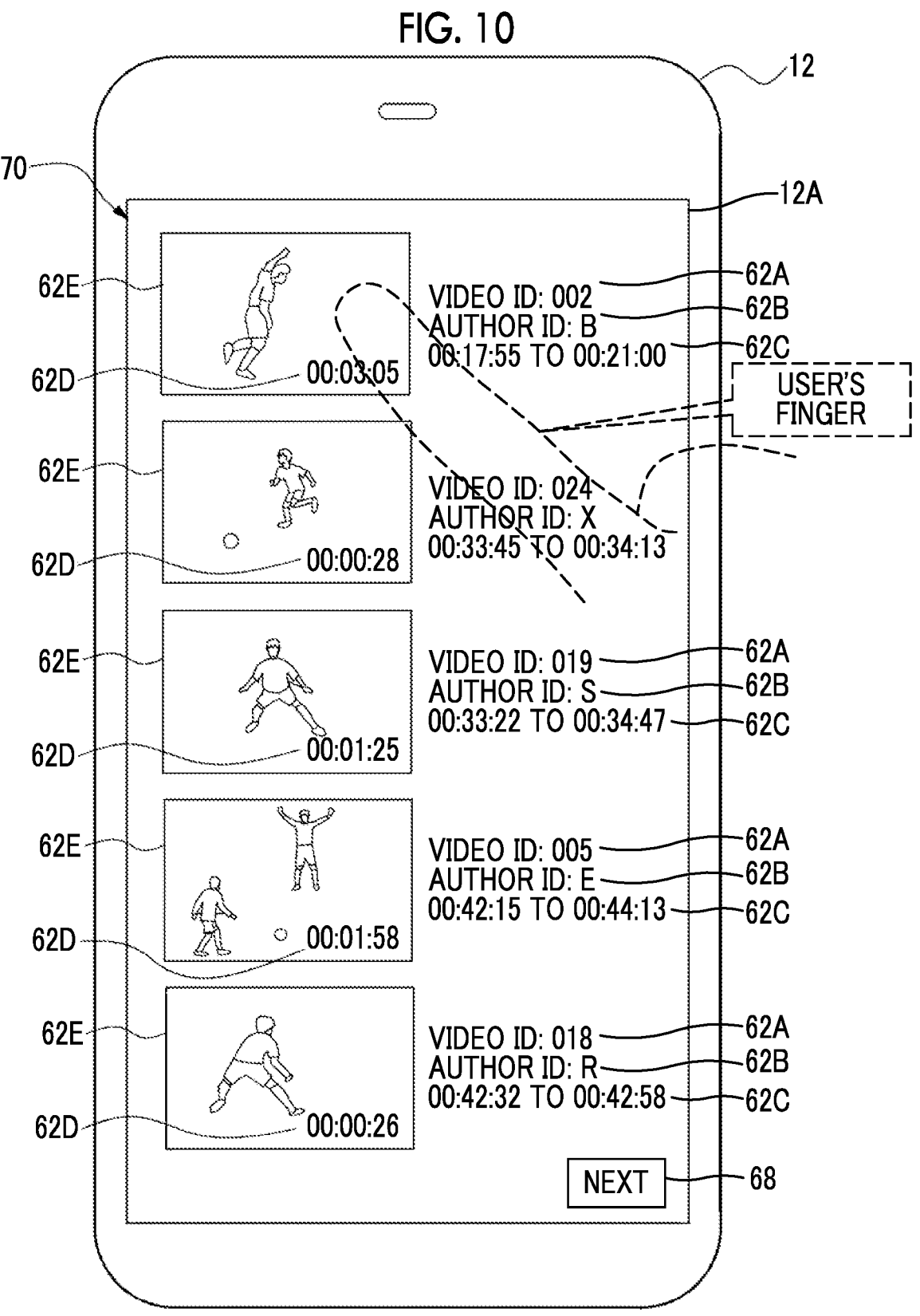
FIG. 10 is a conceptual diagram showing an example of a recommendation screen according to the first embodiment displayed on the user device.

As shown in FIG. 10 as an example, the recommendation data 32 is displayed on the recommendation screen 70. The recommendation screen 70 displays the video information 62 regarding the five untransmitted virtual viewpoint videos 30. The number of untransmitted virtual viewpoint videos 30 displayed on the recommendation screen 70 is not limited to five, and may be freely set by the user. In the recommendation screen 70, the thumbnail image 62E is disposed on the left side of the recommendation screen 70. The length 62D of the corresponding untransmitted virtual viewpoint video 30 is disposed at the lower right of each thumbnail image 62E. The author 62B, the video ID 62A, and the game elapsed time 62C are disposed on the right side of the corresponding thumbnail image 62E. The thumbnail image 62E is an example of a "reduced image" according to the technology of the present disclosure.

An update button 68 is disposed at the lower right of the recommendation screen 70. In a case where the user touches the update button 68 on the touch panel display 12A, the user device 12 gives an instruction for updating the recommendation data 32 to the video reproduction unit 28. The video reproduction unit 28 receives the update instruction from the user device 12, and generates the recommendation data 32 on the basis of the video information 62 regarding the next five untransmitted virtual viewpoint videos 30, that is, the video information 62 regarding the sixth to tenth recorded untransmitted virtual viewpoint videos 30. The video reproduction unit 28 transmits the generated recommendation data 32 to the user device 12.

Figure 11:
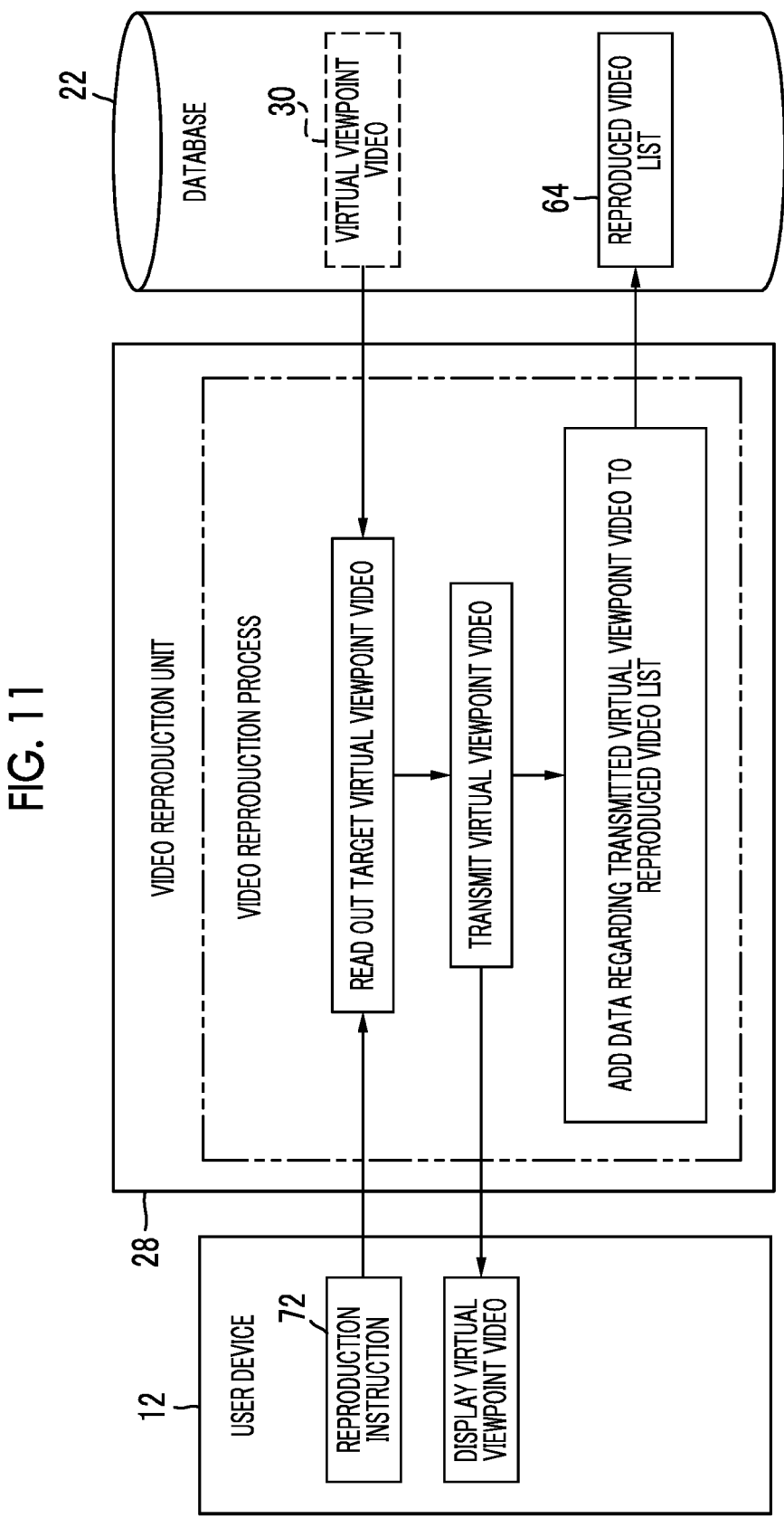
FIG. 11 is a conceptual diagram showing an example of a function of a main constituent of the video reproduction unit according to the first embodiment.

In a case where the user touches the thumbnail image 62E displayed on the recommendation screen 70, as shown in FIG. 11 as an example, the user device 12 gives a reproduction instruction 72 for the untransmitted virtual viewpoint video 30 corresponding to the touched thumbnail image 62E to the video reproduction unit 28. The video reproduction unit 28 reads out the target untransmitted virtual viewpoint video 30 from the database 22. The video reproduction unit 28 transmits the untransmitted virtual viewpoint video 30 read out from the database 22 to the user device 12 that is an output source of the reproduction instruction 72. The user device 12 receives the untransmitted virtual viewpoint video 30 and reproduces the received virtual viewpoint video 30 on the touch panel display 12A. The reproduction instruction 72 is an example of a "reproduction instruction" according to the technology of the present disclosure.

Figure 12:
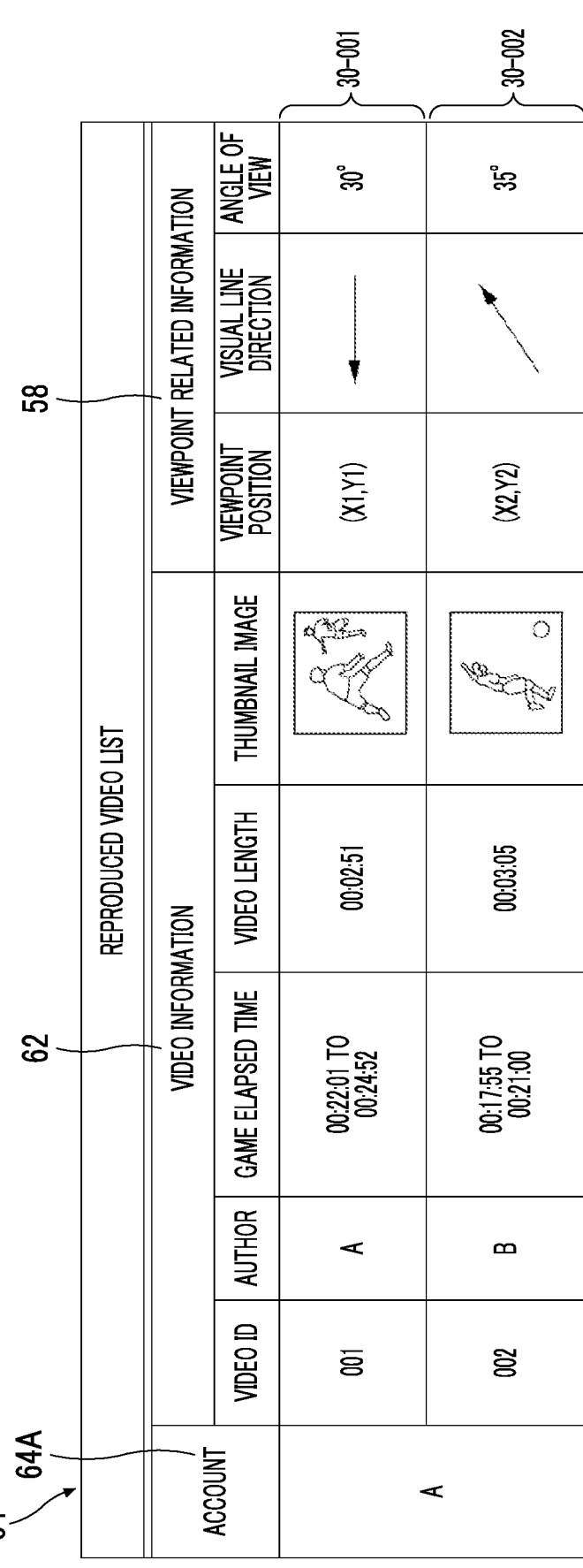
FIG. 12 is a conceptual diagram showing an example of an aspect in which a reproduced virtual viewpoint video is added to the reproduced video list according to the first embodiment.

The video reproduction unit 28 adds information regarding the virtual viewpoint video 30 transmitted to the user device 12 to the reproduced video list 64 corresponding to the account of the user using the user device 12. Consequently, as shown in FIG. 12 as an example, in a case where the virtual viewpoint video 30-002 is transmitted to the user device 12 that is a transmission source of the reproduction instruction 72 in response to the reproduction instruction 72 given from the user device 12 accessing the data processing apparatus 10 with the account of the user A, data regarding the virtual viewpoint video 30-002 is added to the reproduced video list 64 corresponding to the account of the user A.

As in the example shown in FIG. 12, in a case where the reproduced video list 64 includes information regarding the plurality of virtual viewpoint videos 30, the video reproduction unit 28 generates the recommended video list 66 with reference to information (hereinafter, referred to as "reference information") regarding the virtual viewpoint video 30-002 added latest to the reproduced video list 64 among the plurality of virtual viewpoint videos 30 included in the reproduced video list 64. Instead of using the information regarding the virtual viewpoint videos 30-002 added latest to the reproduced video list 64 as a reference, the recommended video list 66 may be generated with reference to a plurality of virtual viewpoint videos 30.

Figure 13:
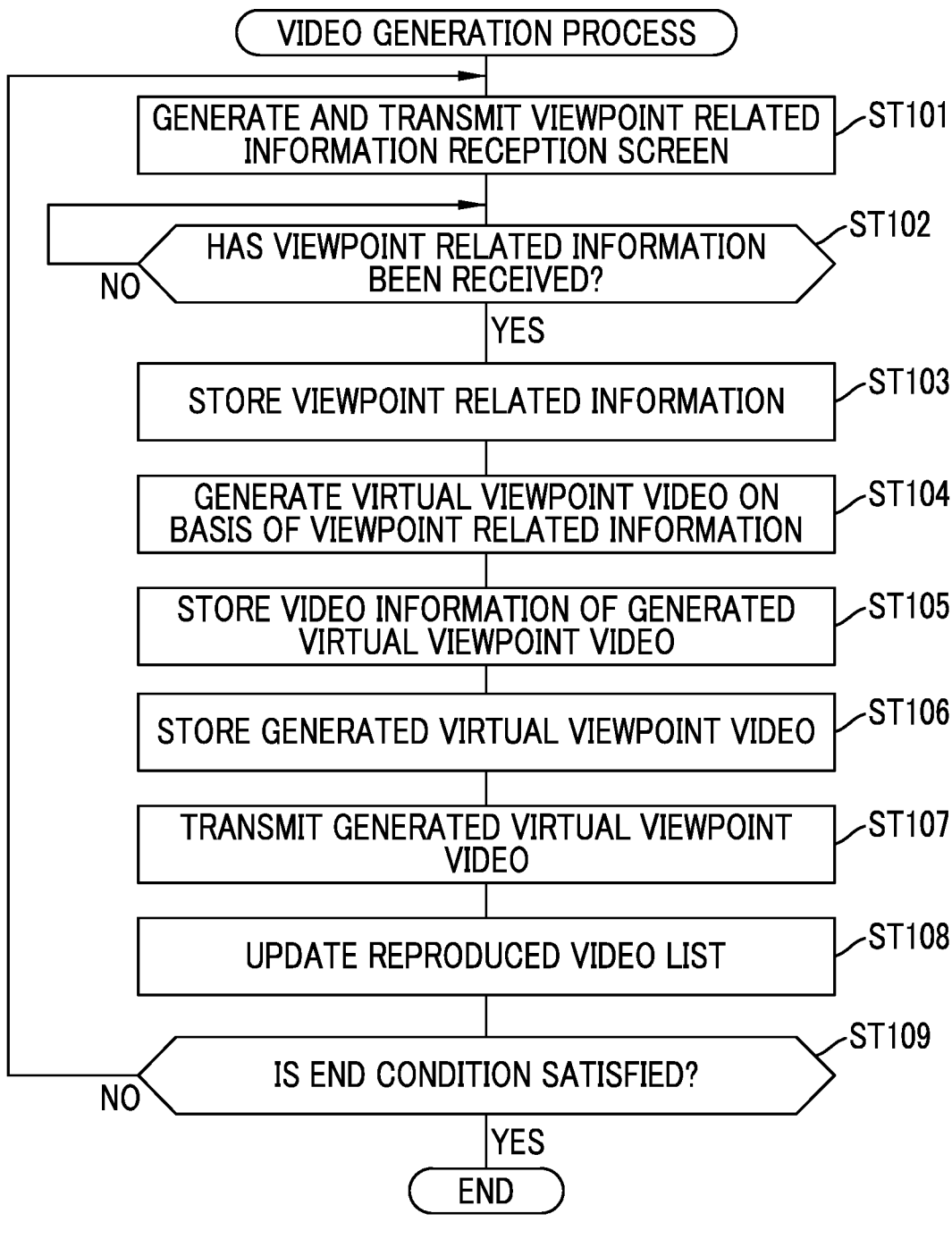
FIG. 13 is a flowchart showing an example of a flow of a video generation process according to the first embodiment.

Next, an operation of the video generation unit 26 according to the first embodiment will be described with reference to FIG. 13. A video generation process shown in FIG. 13 is realized by the CPU 14A executing the operation program 24. The video generation process shown in FIG. 13 is started in a case where the video generation unit 26 receives the video generation request 50 from at least one of the plurality of user devices 12.

In the video generation process shown in FIG. 13, first, in step ST101, the video generation unit 26 generates the viewpoint related information reception screen 54, and transmits the generated viewpoint related information reception screen 54 to the user device 12 that is an output source of the video generation request 50. The user device 12 receives the viewpoint related information reception screen 54 and displays the received viewpoint related information reception screen 54 on the touch panel display 12A. Thereafter, the video generation process proceeds to step ST102.

In step ST102, the video generation unit 26 determines whether or not the viewpoint related information 58 has been received from the user device 12 to which the viewpoint related information reception screen 54 has been transmitted. In a case where the viewpoint related information 58 has been received in step ST102, a determination result is positive, and the video generation process proceeds to step ST103. In a case where the viewpoint related information 58 has not been received in step ST102, a determination result is negative, and the video generation process proceeds to step ST102.

In step ST103, the video generation unit 26 stores the viewpoint related information 58 received from the user device 12 in the generated video list 60 of the database 22. Thereafter, the video generation process proceeds to step ST104.

In step ST104, the video generation unit 26 generates the virtual viewpoint video 30 on the basis of the viewpoint related information 58 received from the user device 12. Thereafter, the video generation process proceeds to step ST105.

In step ST105, the video generation unit 26 stores the generated video information 62 regarding the virtual viewpoint video 30 in the generated video list 60 of the database 22 in association with the viewpoint related information 58. Thereafter, the video generation process proceeds to step ST106.

In step ST106, the video generation unit 26 stores the generated virtual viewpoint video 30 in the database 22. Thereafter, the video generation process proceeds to step ST107.

In step ST107, the video generation unit 26 transmits the generated virtual viewpoint video 30 to the user device 12 that is an output source of the video generation request 50. The user device 12 receives the virtual viewpoint video 30 and reproduces the received virtual viewpoint video 30 on the video reproduction screen 33. Thereafter, the video generation process proceeds to step ST108.

In step ST108, the video generation unit 26 adds the generated virtual viewpoint video 30 to the reproduced video list 64 corresponding to the account of the user who uses the user device 12 that is an output source of the video generation request 50. Thereafter, the video generation process proceeds to step ST109.

In step ST109, the video generation unit 26 determines whether or not an end condition is satisfied. An example of the end condition includes a case where a video generation stop request is received from the user device 12. In step ST109, in a case where the end condition is satisfied, a determination result is positive, and the video generation process is ended. In step ST109, in a case where the end condition is not satisfied, a determination result is negative, and the video generation process proceeds to step ST101.

Figure 14:
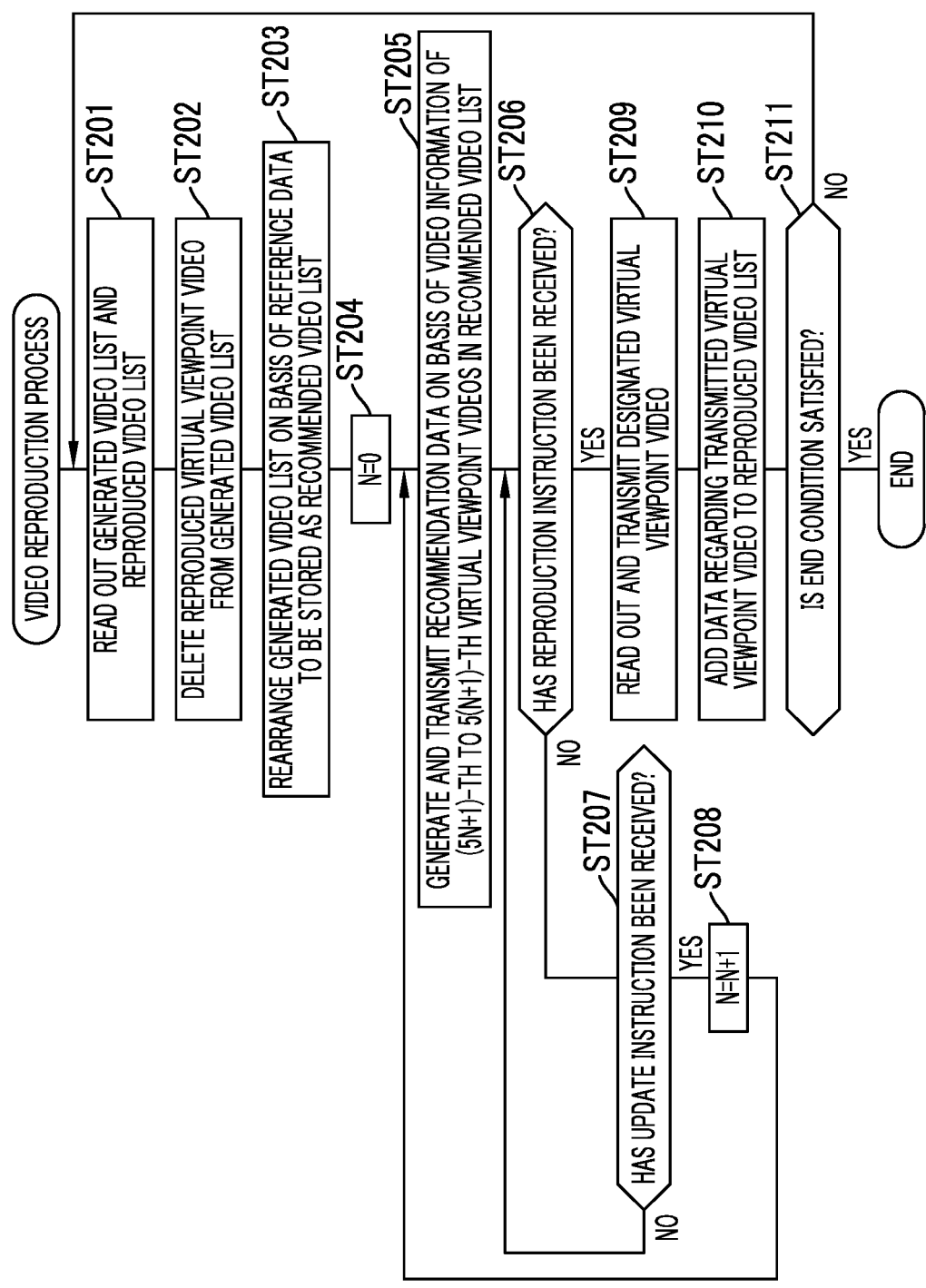
FIG. 14 is a flowchart showing an example of a flow of video reproduction process according to the first embodiment.

Next, an operation of the video reproduction unit 28 according to the first embodiment will be described with reference to FIG. 14. A video reproduction process shown in FIG. 14 is realized by the CPU 14A executing the operation program 24. The video reproduction process shown in FIG. 14 is started in a case where the video reproduction unit 28 receives the video reproduction request 52 from at least one of the plurality of user devices 12.

In the video reproduction process shown in FIG. 14, first, in step ST201, the video reproduction unit 28 reads out the generated video list 60 and the reproduced video list 64 corresponding to the account of the user using the user device 12 that is an output source of the video reproduction request 52 from the database 22. Thereafter, the video reproduction process proceeds to step ST202.

In step ST202, the video reproduction unit 28 deletes the information regarding the virtual viewpoint video 30 stored in the reproduced video list 64 from the generated video list 60. Thereafter, the video reproduction process proceeds to step ST203.

In step ST203, the video reproduction unit 28 acquires reference information from the reproduced video list 64, and rearranges the virtual viewpoint videos 30 in the generated video list 60 on the basis of the acquired reference information. The video reproduction unit 28 stores the generated video list 60 after the rearrangement in the database 22 as the recommended video list 66. Thereafter, the video reproduction process proceeds to step ST204.

In step ST204, the video reproduction unit 28 sets N=0. Thereafter, the video reproduction process proceeds to step ST205.

In step ST205, the video reproduction unit 28 generates the recommendation data 32 on the basis of the video information 62 of the (5N+1)-th to 5(N+1)-th virtual viewpoint videos 30 in the recommended video list 66. That is, in a case of N=0, the video reproduction unit 28 generates the recommendation data 32 on the basis of the video information 62 of the first to fifth virtual viewpoint videos 30 in the recommended video list 66. The video reproduction unit 28 transmits the generated recommendation data 32 to the user device 12. Thereafter, the video reproduction process proceeds to step ST206.

In step ST206, the video reproduction unit 28 determines whether or not the reproduction instruction 72 for any of the five virtual viewpoint videos 30 included in the recommendation data 32 has been received from the user device 12. In a case where the reproduction instruction 72 has been received, the video reproduction process proceeds to step ST209. In a case where the reproduction instruction 72 has not been received, the video reproduction process proceeds to step ST207.

In step ST207, the video reproduction unit 28 determines whether or not an update instruction has been received from the user device 12. In a case where the update instruction has been received in step ST207, a determination result is positive, and the video reproduction process proceeds to step ST208. In step ST207, in a case where the update instruction has not been received, a determination result is negative, and the video reproduction process proceeds to step ST206.

In step ST208, the video reproduction unit 28 increments N by 1. Thereafter, the video reproduction process proceeds to step ST205.

In step ST209, the video reproduction unit 28 reads out the virtual viewpoint video 30 designated by the reproduction instruction 72 from the database 22. The video reproduction unit 28 transmits the virtual viewpoint video 30 read out from the database 22 to the user device 12. Thereafter, the video reproduction process proceeds to step ST210.

In step ST210, the video reproduction unit 28 adds the information regarding the virtual viewpoint video 30 transmitted to the user device 12 to the reproduced video list 64. Thereafter, the video reproduction process proceeds to step ST211.

In step ST211, the video reproduction unit 28 determines whether or not an end condition is satisfied. An example of the end condition includes a case where a video viewing stop request is received from the user device 12. In step ST211A, in a case where the end condition is satisfied, a determination result is positive, and the video reproduction process is ended. In step ST211A, in a case where the end condition is not satisfied, a determination result is negative, and the video reproduction process proceeds to step ST201.

As described above, in the first embodiment, the data processing apparatus 10 transmits the virtual viewpoint video 30 generated on the basis of the captured video 34 to the user device 12. In a case where the video reproduction request 52 is received from the user device 12 accessing the data processing apparatus 10 with an account of a certain user, the video reproduction unit 28 reads out the reproduced video list 64 corresponding to the account that is a request source from the database 22. The video reproduction unit 28 generates the recommendation data 32 regarding the untransmitted virtual viewpoint video 30 on the basis of the viewpoint related information 58 and the game elapsed time 62C included in the acquired reproduced video list 64. The video reproduction unit 28 transmits the generated recommendation data 32 to the user device 12. Therefore, according to the present configuration, a user can easily select the virtual viewpoint video 30 intended by the user compared with a case where only the reproduced video list 64 is used in the user device 12.

In the first embodiment, the video reproduction unit 28 performs control for transmitting the recommendation data 32 regarding the untransmitted virtual viewpoint video 30 that is different from the virtual viewpoint video 30 recorded in the reproduced video list 64. Therefore, according to the present configuration, a user can easily select the virtual viewpoint video 30 intended by the user compared with a case where only the reproduced video list 64 is used in the user device 12.

In the first embodiment, the reproduced video list 64 includes the viewpoint related information 58 related to a viewpoint of the virtual viewpoint video 30. Therefore, according to the present configuration, compared with a case where the reproduced video list 64 includes information that is not correlated with the viewpoint related information 58, a user can easily select the virtual viewpoint video 30 correlated with the viewpoint related information 58 among the untransmitted virtual viewpoint videos 30.

In the first embodiment, the viewpoint related information 58 includes the viewpoint position 58A, the visual line direction 58B, and the angle of view 58C. Therefore, according to the present configuration, compared with a case where the viewpoint related information 58 includes information not correlated with any of the viewpoint position 58A, the visual line direction 58B, and the angle of view 58C, a user can easily select the virtual viewpoint video 30 correlated with at least one of the viewpoint position 58A, the visual line direction 58B, and the angle of view 58C among the untransmitted virtual viewpoint videos 30.

In the first embodiment, the reproduced video list 64 includes the game elapsed time 62C regarding an imaging time of the captured video 34 used to generate the virtual viewpoint video 30. Therefore, according to the present configuration, compared with a case where the reproduced video list 64 includes information not correlated with an imaging time of the captured video 34, a user can easily select the virtual viewpoint video 30 correlated with an imaging time of the captured video 34 among the untransmitted virtual viewpoint videos 30.

In the first embodiment, the recommendation data 32 is data in which the thumbnail images 62E of the untransmitted virtual viewpoint videos 30 are displayed on the user device 12 in descending order of the similarity regarding the viewpoint related information 58 with the viewpoint related information 58 included in the reproduced video list 64 and in ascending order of the similarity regarding the game elapsed time 62C with the game elapsed time 62C included in the reproduced video list 64. Therefore, according to the present configuration, compared with a case where the thumbnail images 62E regarding the untransmitted virtual viewpoint videos 30 are randomly displayed on the user device 12, a user can easily select the virtual viewpoint video 30 having a high similarity regarding the viewpoint related information 58 with the viewpoint related information 58 included in the reproduced video list 64 and having a low similarity regarding the game elapsed time 62C with the game elapsed time 62C included in the reproduced video list 64.

In the first embodiment, the data processing apparatus 10 transmits a plurality of virtual viewpoint videos 30 generated on the basis of the captured video 34 to the user device 12. In a case where the video reproduction request 52 is received from the user device 12, the video reproduction unit 28 acquires information regarding the virtual viewpoint video 30 of which at least a part has been transmitted to the user device 12 that is a transmission source of the video reproduction request 52 among the plurality of virtual viewpoint videos 30 from the reproduced video list 64. On the basis of the acquired information, the video reproduction unit 28 generates information regarding the virtual viewpoint video 30 (untransmitted virtual viewpoint video 30) that has not been transmitted to the user device 12 that is a request source among the plurality of virtual viewpoint videos 30 as the recommendation data 32. The video reproduction unit 28 transmits the generated recommendation data 32 to the user device 12 that is a request source. Therefore, according to the present configuration, a user can easily select the virtual viewpoint video 30 intended by the user compared with a case where only the reproduced video list 64 is used in the user device 12.

Second Embodiment

In the first embodiment, a form example in which the viewpoint related information 58 includes the viewpoint position 58A, the visual line direction 58B, and the angle of view 58C has been described, but, in the second embodiment, a form example in which the viewpoint related information 58 includes a viewpoint position path 58D and a gaze point 58E instead of the viewpoint position 58A and the visual line direction 58B will be described. In the first embodiment, a form example in which the video reproduction unit 28 generates the recommendation data 32 including the video information 62 regarding the untransmitted virtual viewpoint videos 30 in descending order of the similarity regarding the viewpoint related information 58 with the viewpoint related information 58 included in the reproduced video list 64 and in ascending order of the similarity regarding the game elapsed time 62C with the game elapsed time 62C included in the reproduced video list 64. However, in the second embodiment, a form example in which the video reproduction unit 28 generates the recommendation data 32 including the video information 62 regarding the untransmitted virtual viewpoint videos 30 in ascending order of the similarity regarding the viewpoint related information 58 with the viewpoint related information 58 included in the reproduced video list 64 and in descending order of the similarity regarding the game elapsed time 62C with the game elapsed time 62C included in the reproduced video list 64 will be described. Hereinafter, the differences from the first embodiment will be described. In the following description, identical configurations as those of the first embodiment will be represented by identical reference numerals as those of the first embodiment, and identical configurations and operations as those of the first embodiment will not be described. Also in the first embodiment, the recommendation data 32 may be generated according to a method similar to that in the second embodiment. Also in the second embodiment, the recommendation data 32 may be generated according to a method similar to that in the first embodiment.

Figure 15:
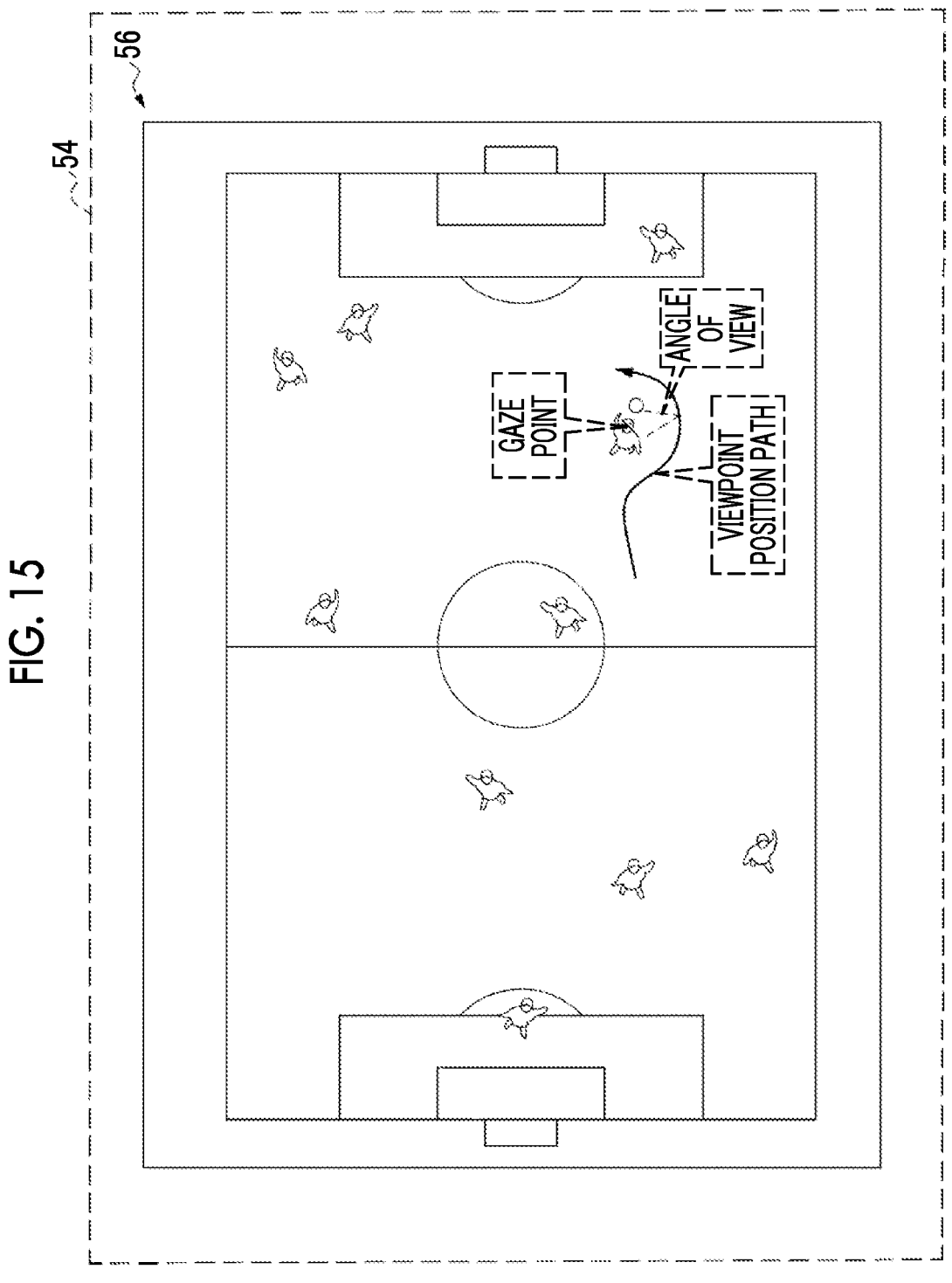
FIG. 15 is a conceptual diagram showing an example of a viewpoint position path, a gaze point, and an angle of view set on a viewpoint related information reception screen according to a second embodiment.

FIG. 15 shows an example of the viewpoint related information reception screen 54 transmitted from the video generation unit 26 to the user device 12 in response to the video generation request 50 from the user device 12. A bird's-eye view image 56 is displayed on the viewpoint related information reception screen 54. In the second embodiment, the user designates a viewpoint position path, a gaze point, and an angle of view on the viewpoint related information reception screen 54. The viewpoint position path indicates displacement of a viewpoint position over time. The gaze point is a gaze position in the imaging region, and in the example shown in FIG. 15, the gaze point is set to a face of a player of interest, but the technology of the present disclosure is not limited to this, and the gaze point may be a position of another object in the imaging region, for example, a position of a ball, a position of a goal, or a position of a specific line. The gaze point may be any position within the imaging region that does not include an object. The angle of view is an angle of view in a case of observing the gaze point from each viewpoint position included in the viewpoint position path.

The user device 12 derives coordinates of the viewpoint position path 58D (refer to FIG. 16) with respect to the soccer field on the basis of coordinates of the viewpoint position path designated for the bird's-eye view image 56. The user device 12 derives coordinates of the gaze point 58E (refer to FIG. 16) in the soccer field on the basis of coordinates of the gaze point designated with respect to the bird's-eye view image 56. The user device 12 derives the angle of view 58C (refer to FIG. 16) in the soccer field on the basis of the designation of the angle of view with respect to the bird's-eye view image 56. The user device 12 transmits the derived viewpoint position path 58D, gaze point 58E, and angle of view 58C to the video generation unit 26 as the viewpoint related information 58. The viewpoint position path 58D is an example of a "viewpoint position path" according to the technology of the present disclosure. The gaze point 58E is an example of a "gaze point" according to the technology of the present disclosure.

Figure 16:
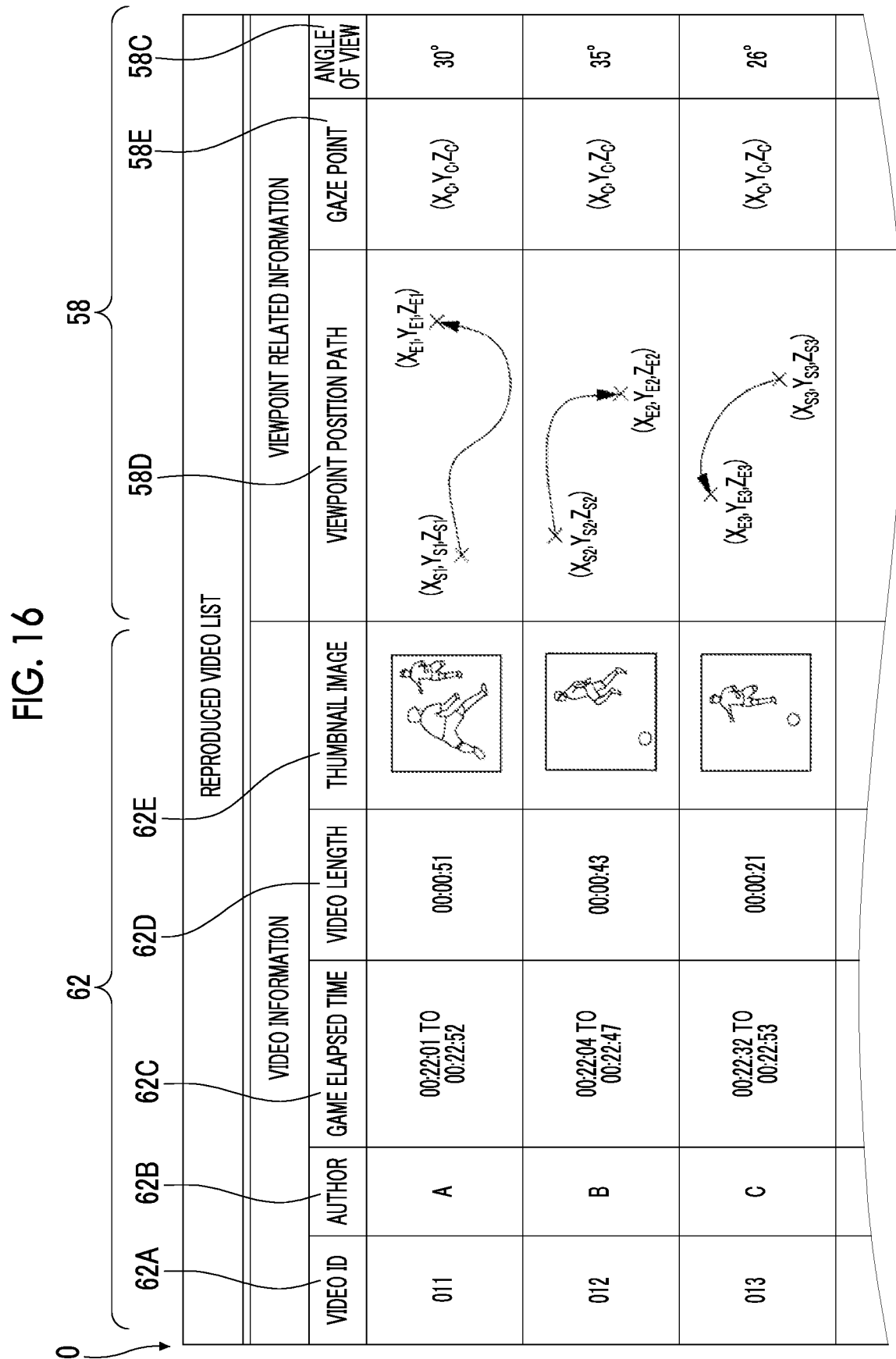
FIG. 16 is a conceptual diagram showing an example of a generated video list according to the second embodiment.

As shown in FIG. 16 as an example, the video generation unit 26 records the viewpoint related information 58 received from the user device 12 in the generated video list 60. The video generation unit 26 generates the virtual viewpoint video 30 by using the captured video 34 on the basis of the viewpoint related information 58 received from the user device 12. The video generation unit 26 records the generated video information 62 regarding the virtual viewpoint video 30 in the generated video list 60 in association with the viewpoint related information 58. The viewpoint related information 58 and the video information 62 regarding the plurality of virtual viewpoint videos 30 generated by the video generation unit 26 on the basis of the viewpoint related information 58 received from the plurality of user devices 12 are recorded in the generated video list 60.

The video generation unit 26 transmits the generated virtual viewpoint video 30 to the user device 12 that is a request source, and records the transmitted virtual viewpoint video 30 in the reproduced video list 64 corresponding to the account of the user using the user device 12 that is a request source. As an example, as shown in FIG. 17, in a case where the video generation unit 26 generates the virtual viewpoint video 30 on the basis of the viewpoint related information 58 received from the user device 12 accessing the data processing apparatus 10 with the account of the user A, the video generation unit 26 transmits the generated virtual viewpoint video 30 to the user device 12 that is a transmission source of the viewpoint related information 58, and records the transmitted virtual viewpoint video 30 in the reproduced video list 64 corresponding to the account of the user A.

Figure 18:
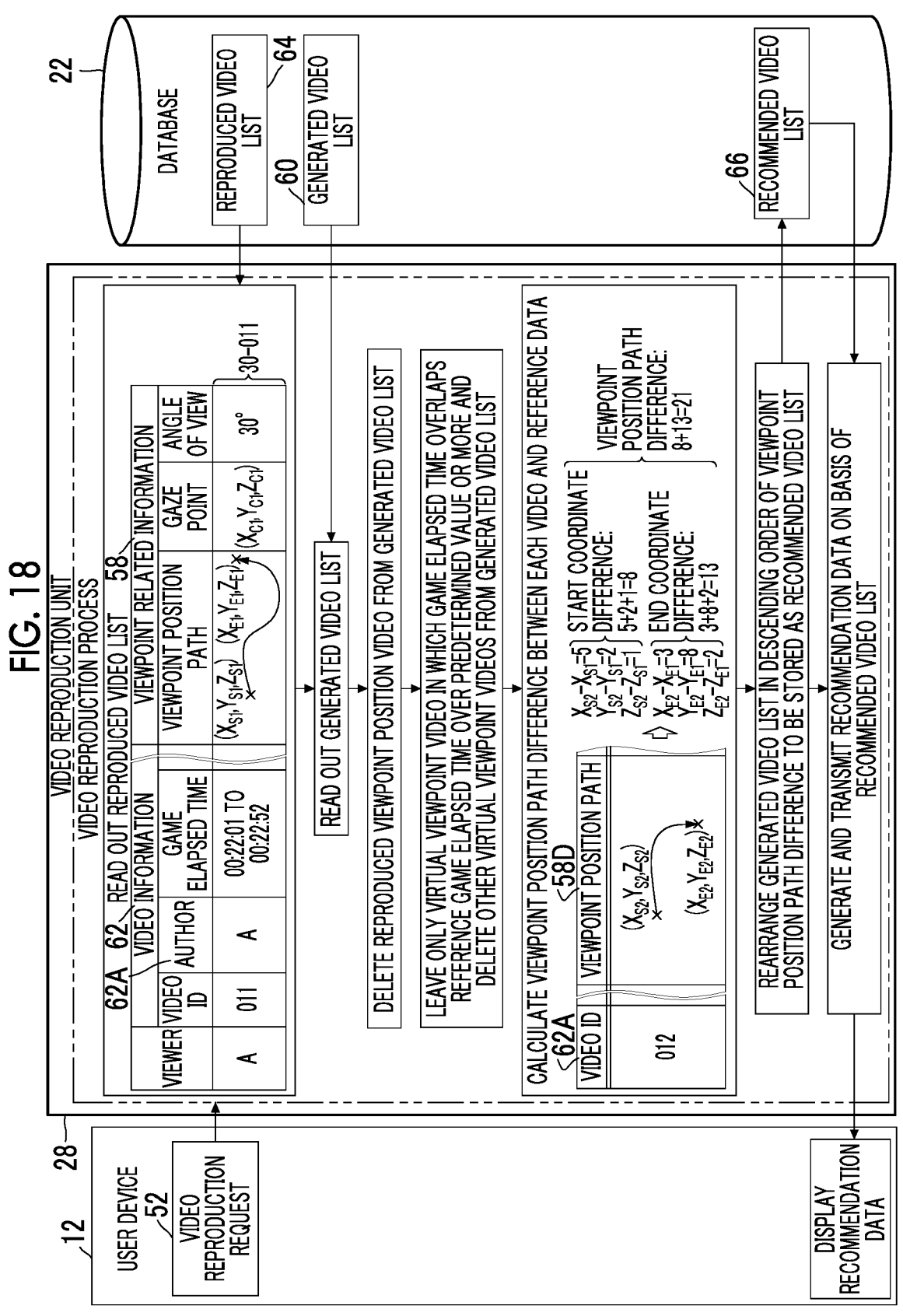
FIG. 18 is a conceptual diagram showing an example of a function of a main constituent of a video reproduction unit according to the second embodiment.

A video reproduction process performed by the video reproduction unit 28 according to the second embodiment will be specifically described below with reference to FIG. 18. For example, in a case where the video reproduction unit 28 receives the video reproduction request 52 from the user device 12 accessing the data processing apparatus 10 with the account of the user A, the video reproduction unit 28 reads out the reproduced video list 64 corresponding to the account of the user A from the database 22. Information regarding the virtual viewpoint video 30 (hereinafter, referred to as a "virtual viewpoint video 30-011") having the video ID 62A of "011" is recorded in the readout reproduced video list 64. The virtual viewpoint video 30-011 is an example of a "first virtual viewpoint image" according to the technology of the present disclosure.

The video reproduction unit 28 reads out the generated video list 60 from the database 22. In the generated video list 60, data regarding the virtual viewpoint video 30 generated by the video generation unit 26 is recorded (refer to FIG. 16). The video reproduction unit 28 deletes the information regarding the virtual viewpoint video 30-011 recorded in the reproduced video list 64 from the generated video list 60. As a result, information regarding the virtual viewpoint video 30 that has not been transmitted to the user device 12 that is an output source of the video reproduction request 52 remains in the generated video list 60.

The video reproduction unit 28 compares the game elapsed time 62C of each untransmitted virtual viewpoint video 30 with the game elapsed time 62C (hereinafter, "reference game elapsed time") of the virtual viewpoint videos 30-011 recorded in the reproduced video list 64. The video reproduction unit 28 leaves the virtual viewpoint video 30 in which the game elapsed time 62C overlaps the reference game elapsed time over a predetermined value (for example, several tens of seconds) or more, and deletes other virtual viewpoint videos 30 from the generated video list 60. That is, the video reproduction unit 28 leaves the untransmitted virtual viewpoint video 30 having the game elapsed time 62C having a high similarity with the reference game elapsed time in the generated video list 60.

The video reproduction unit 28 compares positions of the viewpoint position path 58D of each untransmitted virtual viewpoint video 30 with viewpoint position path 58D (hereinafter, a "reference viewpoint position path") of the virtual viewpoint video 30-011 recorded in the reproduced video list 64 to derive a similarity regarding the viewpoint position path 58D of each untransmitted virtual viewpoint video 30 with respect to the reference viewpoint position path. Specifically, for example, the video reproduction unit 28 acquires start coordinates $(X_{S2}, Y_{S2}, Z_{S2})$ and end coordinates $(X_{E2}, Y_{E2}, Z_{E2})$ of the viewpoint position path 58D of the virtual viewpoint video 30 (hereinafter, referred to as a "virtual viewpoint video 30-012") having the video ID 62A of "012", and start coordinates $(X_{S1}, Y_{S1}, Z_{S1})$ and end coordinates $(X_{E1}, Y_{E1}, Z_{E1})$ of the reference viewpoint position path. The video reproduction unit 28 takes a difference between the start coordinates and a difference between the end coordinates of the viewpoint position path 58D of the virtual viewpoint video 30-012 and the reference viewpoint position path.

By calculating $X_{S2}-X_{S1}$, the video reproduction unit 28 calculates a difference between the start coordinates of the viewpoint position path 58D of the virtual viewpoint video 30-012 and the reference viewpoint position path in the X-axis direction (hereinafter, referred to as an "X-axis direction start coordinate difference"). By calculating $Y_{S2}-Y_{S1}$, the video reproduction unit 28 calculates a difference between the start coordinates of the viewpoint position path 58D of the virtual viewpoint video 30-012 and the reference viewpoint position path in the Y-axis direction (hereinafter, referred to as a "Y-axis direction start coordinate difference"). By calculating $Z_{S2}-Z_{S1}$, the video reproduction unit 28 calculates a difference between the start coordinates of the viewpoint position path 58D of the virtual viewpoint video 30-012 and the reference viewpoint position path in the Z-axis direction (hereinafter, a "Z-axis direction start coordinate difference"). The video reproduction unit 28 calculates a sum of the X-axis direction start coordinate difference, the Y-axis direction start coordinate difference, and the Z-axis direction start coordinate difference as a start coordinate difference.

By calculating $X_{E2}-X_{E1}$, the video reproduction unit 28 calculates a difference between the end coordinates of the viewpoint position path 58D of the virtual viewpoint video 30-012 and the reference viewpoint position path in the X-axis direction (hereinafter, referred to as an "X-axis direction end coordinate difference"). By calculating $Y_{E2}-Y_{E1}$, the video reproduction unit 28 calculates a difference between the end coordinates of the viewpoint position path 58D of the virtual viewpoint video 30-012 and the reference viewpoint position path in the Y-axis direction (hereinafter, referred to as an "Y-axis direction end coordinate difference"). By calculating $Z_{E2}-Z_{E1}$, the video reproduction unit 28 calculates a difference between the end coordinates of the viewpoint position path 58D of the virtual viewpoint video 30-012 and the reference viewpoint position path in the Z-axis direction (hereinafter, referred to as an "Z-axis direction end coordinate difference"). The video reproduction unit 28 calculates a sum of the X-axis direction end coordinate difference, the Y-axis direction end coordinate difference, and the Z-axis direction end coordinate difference as an end coordinate difference. The video reproduction unit 28 calculates a sum of the start coordinate difference and the end coordinate difference as a viewpoint position path difference. The viewpoint position path difference is not limited to the sum of the start coordinate difference and the end coordinate difference. For example, a coordinate difference of any point on a path may be acquired in addition to the start coordinate difference and the end coordinate difference. More specifically, for example, a coordinate difference of a viewpoint every second from reproduction of the virtual viewpoint video 30 may be calculated and added to the start coordinate difference and the end coordinate difference.

The video reproduction unit 28 similarly calculates a viewpoint position path difference between the viewpoint position path 58D of each untransmitted virtual viewpoint video 30 and the reference viewpoint position path. The video reproduction unit 28 rearranges the untransmitted virtual viewpoint videos 30 in the generated video list 60 in descending order of viewpoint position path difference, that is, in ascending order of the similarity between the viewpoint position path 58D of the virtual viewpoint video 30 and the reference viewpoint position path.

The video reproduction unit 28 stores the generated video list 60 after the rearrangement in the database 22 as the recommended video list 66. The video reproduction unit 28 reads out information regarding the five virtual viewpoint videos 30 from the database 22 in an arrangement order of the virtual viewpoint videos 30 recorded in the recommended video list 66. The video reproduction unit 28 generates the recommendation data 32 including the video ID 62A, the game elapsed time 62C, the thumbnail image 62E, the viewpoint position path 58D, and disposition information regarding the five untransmitted virtual viewpoint videos 30 read out from the database 22. The video reproduction unit 28 transmits the generated recommendation data 32 to the user device 12.

Figure 19:
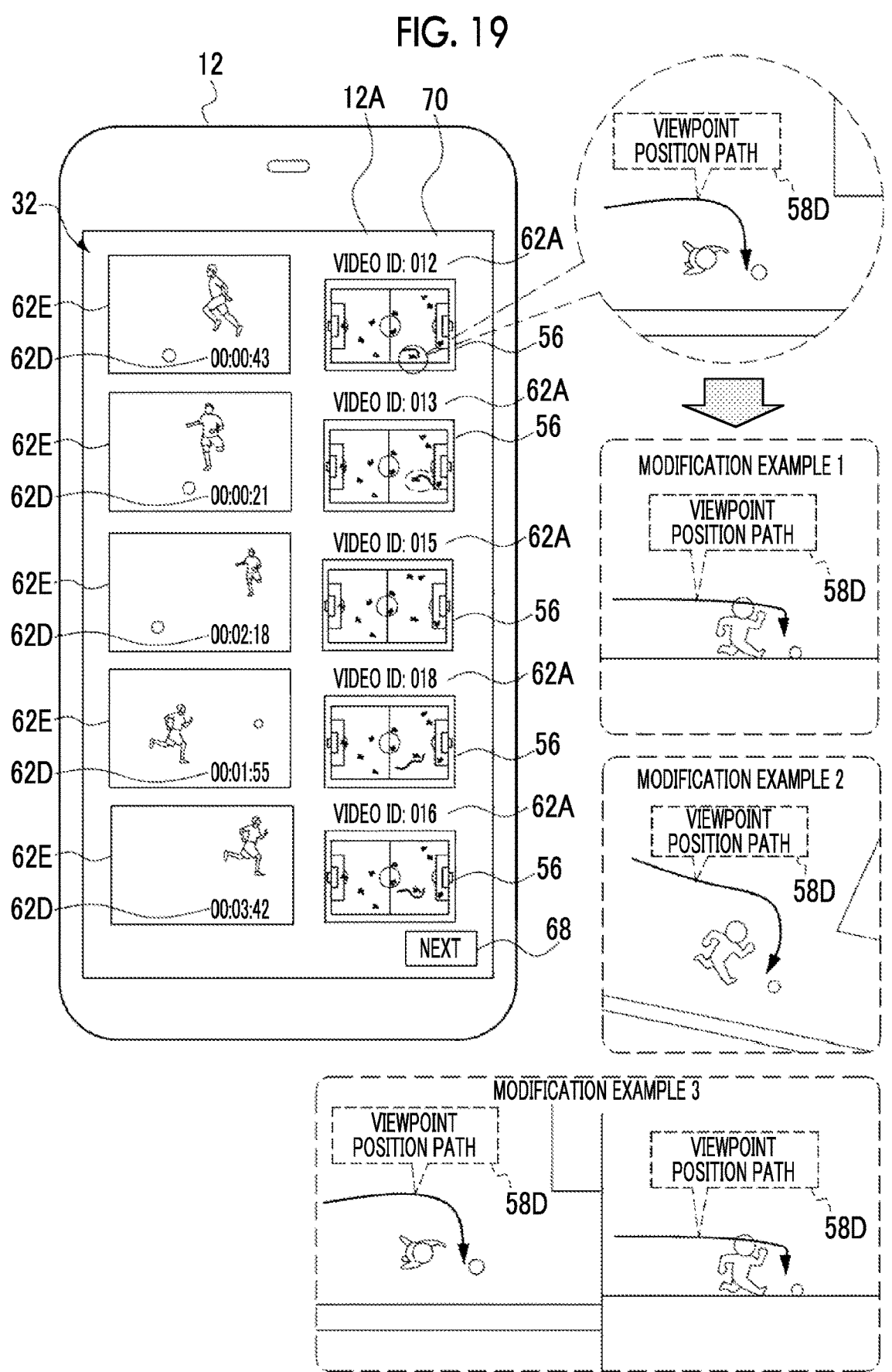
FIG. 19 is a conceptual diagram showing an example of a recommendation screen according to the second embodiment displayed on a user device.

As shown in FIG. 19 as an example, the user device 12 receives the recommendation data 32 and displays the received recommendation data 32 on the touch panel display 12A as the recommendation screen 70. In the recommendation screen 70 according to the second embodiment, the thumbnail images 62E regarding the five untransmitted virtual viewpoint videos 30 are displayed on the left side of the recommendation screen 70. On the right side of each thumbnail image 62E, the video ID 62A and a form of the viewpoint position path 58D of the untransmitted virtual viewpoint video 30 corresponding to the thumbnail image 62E are displayed. The form of the viewpoint position path 58D is displayed to be superimposed on the bird's-eye view image 56 of the soccer field.

As a modification example of a display method regarding the form of the viewpoint position path 58D, as shown in a modification example 1 in FIG. 19, the form of the viewpoint position path 58D may be displayed to be superimposed on a side view of the soccer field. As shown in a modification example 2 of FIG. 19, the form of the viewpoint position path 58D may be displayed to be superimposed on a three-dimensional image showing the soccer field. An image in which the form of the viewpoint position path 58D is superimposed on the bird's-eye view image 56 and an image in which the form of the viewpoint position path 58D is superimposed on the side view may be displayed side by side on the right side of the thumbnail image 62E.

Figure 20:
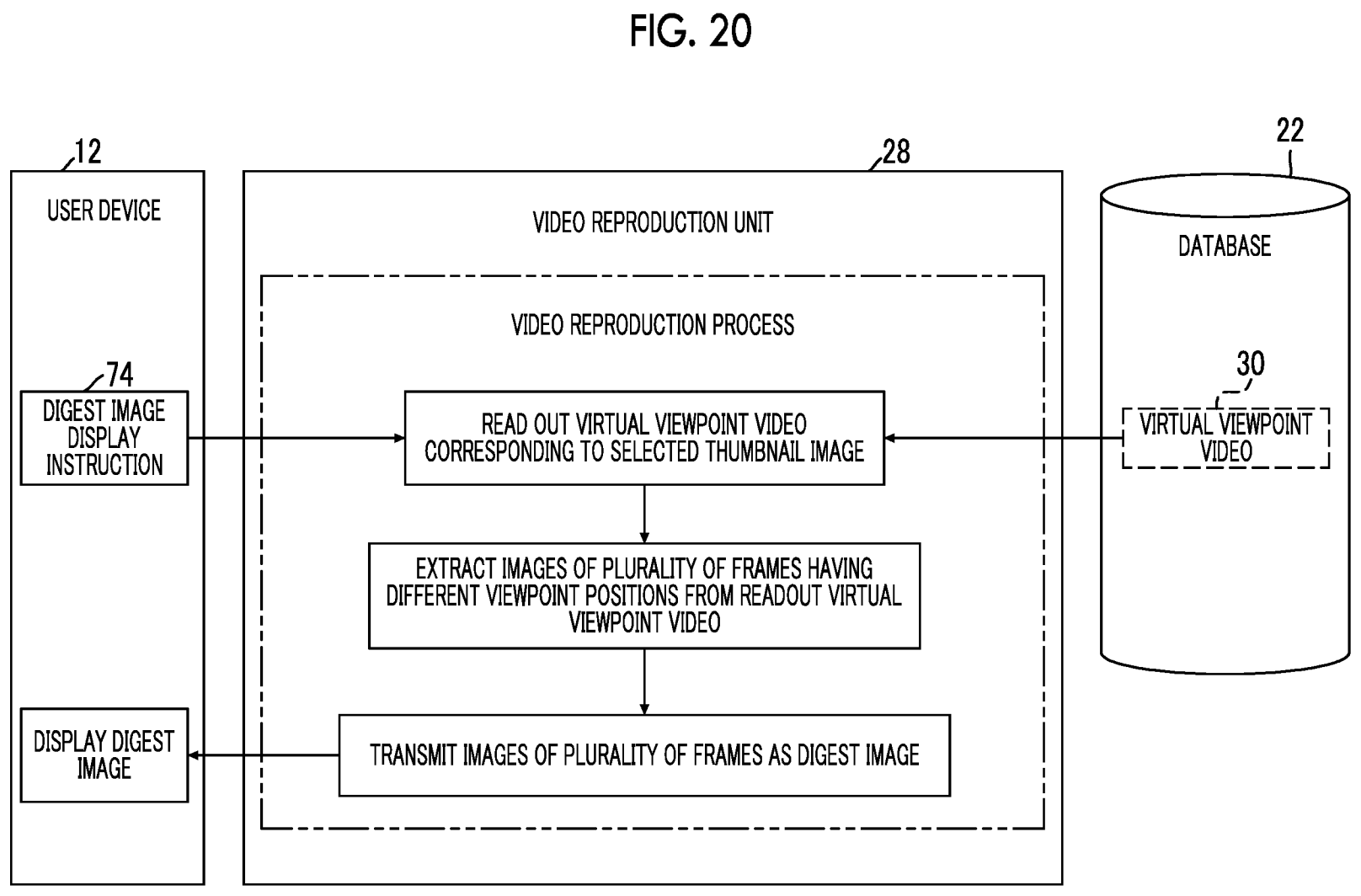

As shown in FIG. 20 as an example, in a case where the user touches the thumbnail image 62E displayed on the recommendation screen 70 with a finger, a stylus pen, or the like, the user device 12 transmits a digest image display instruction 74 for the touched thumbnail image 62E to the video reproduction unit 28. In a case where the digest image display instruction 74 is received from the user device 12, the video reproduction unit 28 reads out the virtual viewpoint video 30 corresponding to the touched thumbnail image 62E from the database 22. The digest image display instruction 74 is an example of a "digest image display instruction" according to the technology of the present disclosure.

The video reproduction unit 28 extracts images (hereinafter, referred to as "extracted images") 27 (refer to FIG. 21) of a plurality of frames in which viewpoint positions differ at predetermined intervals from the virtual viewpoint video 30 read out from the database 22. The video reproduction unit 28 generates a digest image 76 (refer to FIG. 21) including the extracted images 27. The video reproduction unit 28 transmits digest data including the generated digest image 76 and disposition information of the digest image 76 to the user device 12. The digest image 76 is an example of a "digest image" according to the technology of the present disclosure. The digest data is an example of "second data" according to the technology of the present disclosure.

Figure 21:
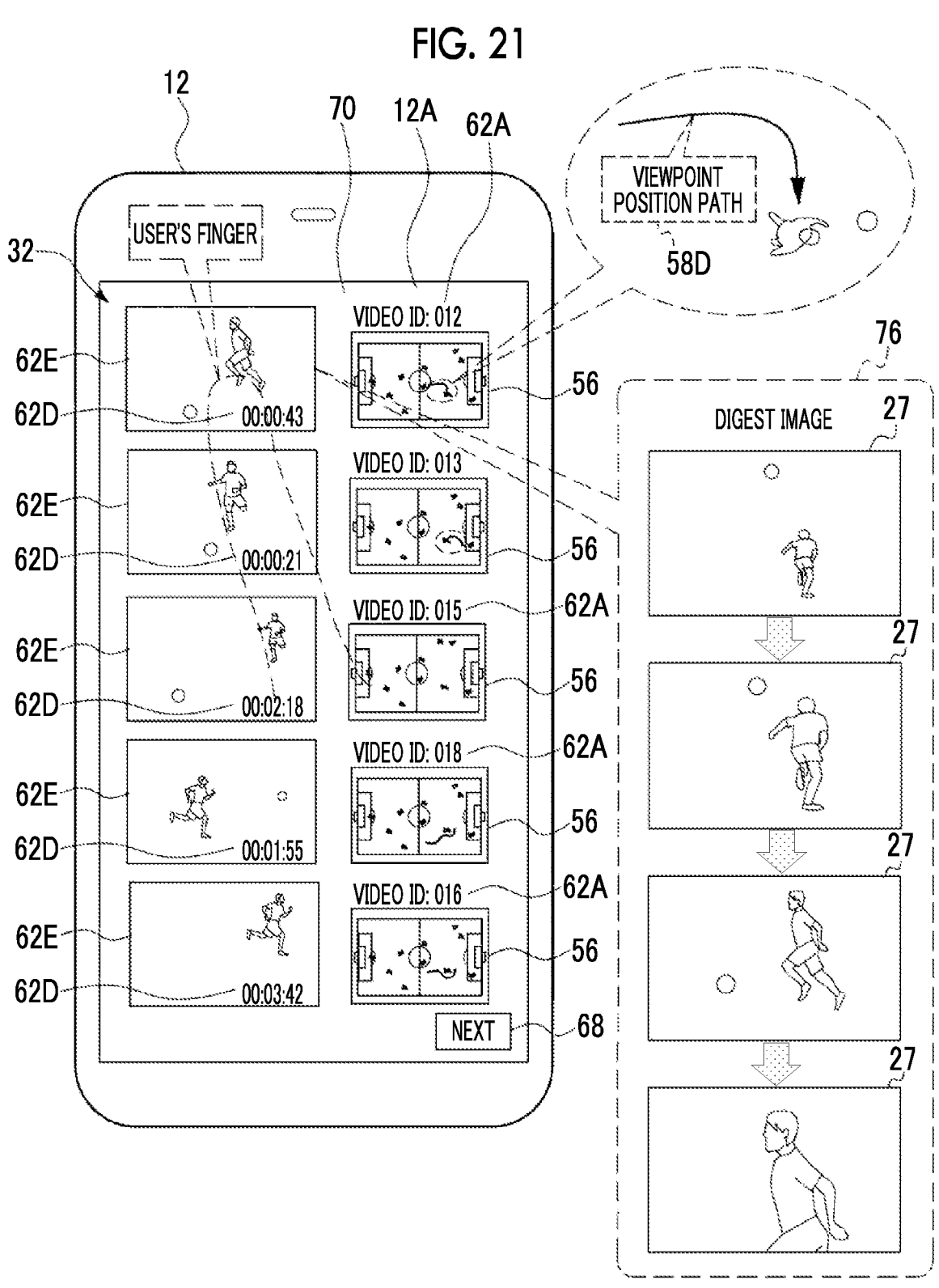
FIG. 21 is a conceptual diagram showing an example of an aspect in which a digest image is displayed on the user device.

As shown in FIG. 21 as an example, the user device 12 receives the digest data and displays the received digest data on the touch panel display 12A. Thus, for example, the digest image 76 including the four extracted images 27 is displayed in a display frame of the thumbnail image 62E.

As described above, in the second embodiment, the recommendation data 32 is data in which the thumbnail images 62E and the viewpoint position path 58D of the untransmitted virtual viewpoint videos 30 are displayed on the user device 12 in ascending order of the similarity regarding the viewpoint related information 58 with the viewpoint related information 58 included in the reproduced video list 64 and in descending order of the similarity regarding the game elapsed time 62C with the game elapsed time 62C included in the reproduced video list 64. Therefore, according to the present configuration, compared with a case where the thumbnail images 62E and the viewpoint position path 58D regarding the untransmitted virtual viewpoint videos 30 are randomly displayed on the user device 12, a user can easily select the virtual viewpoint video 30 having a low similarity regarding the viewpoint related information 58 with the viewpoint related information 58 included in the reproduced video list 64 and having a high similarity regarding the game elapsed time 62C with the game elapsed time 62C included in the reproduced video list 64.

In the second embodiment, the video reproduction unit 28 compares positions of the viewpoint position path 58D between the viewpoint related information 58 included in the reproduced video list 64 and the viewpoint related information 58 included in the recommendation data 32 to derive a similarity regarding the viewpoint related information 58. Therefore, according to the present configuration, a similarity can be derived with high accuracy compared with a case where a similarity is derived without comparing any data.

In the second embodiment, the recommendation data 32 includes the thumbnail image 62E and the viewpoint related information 58 of the untransmitted virtual viewpoint video 30. Therefore, according to the present configuration, compared with a case where the recommendation data 32 does not include either the thumbnail image 62E or the viewpoint related information 58 of the untransmitted virtual viewpoint video 30, a user can easily select the virtual viewpoint video 30 intended by the user.

In the second embodiment, the viewpoint related information 58 includes the viewpoint position path 58D and the gaze point 58E. Therefore, according to the present configuration, compared with a case where the viewpoint related information 58 does not include either the viewpoint position path 58D or the gaze point 58E, a user can easily select the virtual viewpoint video 30 correlated with at least one of the viewpoint position path 58D and the gaze point 58E among the untransmitted virtual viewpoint videos 30.

In the second embodiment, in a case where the video reproduction unit 28 receives the digest image display instruction 74 from the user device 12, the video reproduction unit 28 extracts the extracted images 27 of a plurality of frames in which the viewpoint positions 58A differ at a predetermined interval from the virtual viewpoint video 30 to generate the digest image 76. The video reproduction unit 28 transmits, to the user device 12, reproduction data in which the generated digest image 76 is reproduced by the user device 12. Therefore, according to the present configuration, a user can select the virtual viewpoint video 30 with reference to the digest image 76. The selected virtual viewpoint video 30 is reproduced on the touch panel display 12A similarly to the first embodiment. An operation of reproducing a digest image is not limited to the above description. For example, in a case where the user presses the thumbnail image 62E displayed on the recommendation screen 70 with a finger, a stylus pen, or the like for a long period, the digest image may be reproduced, and in a case where the thumbnail image 62E displayed on the recommendation screen 70 with a finger, a stylus pen, or the like is tapped, the virtual viewpoint video 30 may be reproduced.

In the second embodiment, in a case where the user touches the thumbnail image 62E displayed on the recommendation screen 70, the user device 12 transmits the digest image display instruction 74 for the touched thumbnail image 62E to the video reproduction unit 28. However, the technology of the present disclosure is not limited to this. In a case where a user's finger, a stylus pen, or the like overlaps the thumbnail image 62E, or in a case where the user touches a digest button (not shown) provided on the recommendation screen 70, the user device 12 may transmit the digest image display instruction 74 to the video reproduction unit 28.

In the second embodiment, the viewpoint related information 58 includes the gaze point 58E, but the technology of the present disclosure is not limited to this. The viewpoint related information 58 may include a gaze point path indicating displacement of the gaze point 58E over time instead of the gaze point 58E. In this case, the video reproduction unit 28 may compare positions of the gaze point path between the viewpoint related information 58 included in the reproduced video list 64 and the viewpoint related information 58 included in the recommendation data 32 to derive a similarity regarding the viewpoint related information 58. The gaze point path is an example of a "gaze point path" according to the technology of the present disclosure. According to the present configuration, compared with a case where the viewpoint related information 58 does not include a gaze point path, a user can easily select the virtual viewpoint video 30 correlated with the gaze point path among the untransmitted virtual viewpoint videos 30.

Figure 22:
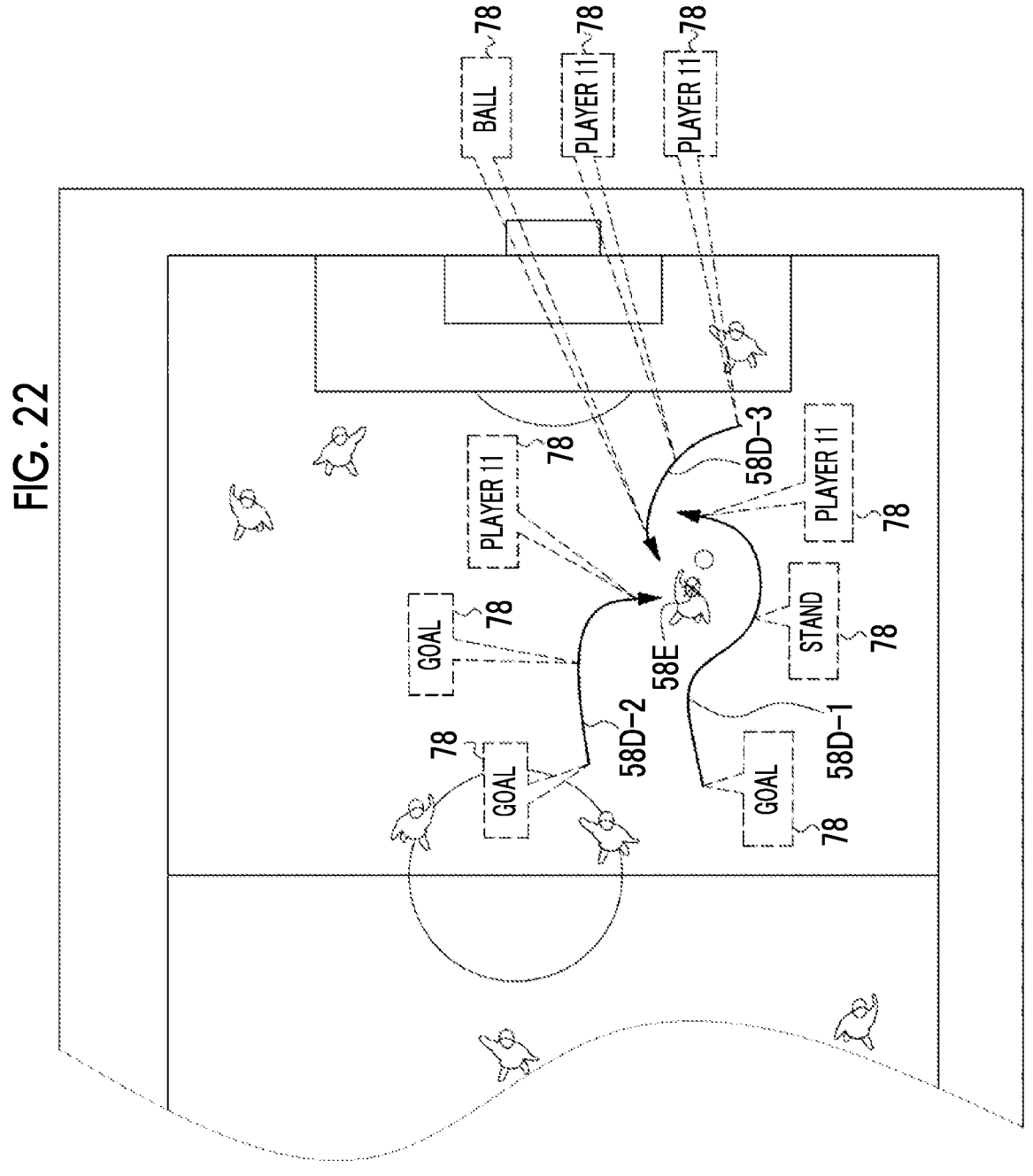
FIG. 22 is a conceptual diagram showing an example of a tag attached to a viewpoint position path.

In the second embodiment, the video reproduction unit 28 compares positions of the viewpoint position path 58D between the viewpoint related information 58 included in the reproduced video list 64 and the viewpoint related information 58 included in the recommendation data 32 to derive a similarity regarding the viewpoint related information 58, but the technology of the present disclosure is not limited to this. As shown in FIG. 22 as an example, the video reproduction unit 28 may extract an object captured in an image in which the gaze point 58E is observed from a start viewpoint position, an intermediate viewpoint position, and an end viewpoint position among the plurality of viewpoint positions 58A included in each viewpoint position path 58D, by using an image recognition technology, and attach a tag 78 indicating the extracted object to each viewpoint position path 58D. The video reproduction unit 28 may derive a similarity regarding the viewpoint related information 58 by comparing the tags 78 attached to the viewpoint position paths 58D. The tag 78 is an example of a "tag" according to the technology of the present disclosure.

In the example shown in FIG. 22, three tags such as a "goal", a "stand", and a "player 11" are attached to a viewpoint position path 58D-1. Three tags such as a "goal", a "goal", and a "player 11" are attached to a viewpoint position path 58D-2. Three tags such as a "ball", a "player 11", and a "player 11" are attached to a viewpoint position path 58D-3. The player 11 means a player having a uniform number of 11. A player is identified by using, for example, a well-known face recognition technology.

In a case where the tag 78 attached to the viewpoint position path 58D-1 and the tag 78 attached to the viewpoint position path 58D-2 are compared, the tags of "goal" and "player 11" are common. In a case where the tag 78 attached to the viewpoint position path 58D-1 and the tag 78 attached to the viewpoint position path 58D-3 are compared, the tag of "player 11" is common. Therefore, the viewpoint position path 58D-2 has a higher similarity with the viewpoint position path 58D-1 than the viewpoint position path 58D-3.

According to the configuration shown in FIG. 22, a similarity can be derived with high accuracy compared with the case where a similarity is derived without comparing any data. Instead of the viewpoint position path 58D, a tag may be attached to a gaze point path, and a similarity regarding the viewpoint related information 58 may be derived by comparing the tags attached to the gaze point paths.

In the second embodiment, a form of the viewpoint position path 58D of the untransmitted virtual viewpoint video 30 is displayed to be superimposed on the bird's-eye view image 56 on the recommendation screen 70, but the technology of the present disclosure is not limited to this. As an example, as shown in FIG. 23, in addition to a form of the viewpoint position path 58D of the untransmitted virtual viewpoint video 30, a form of the viewpoint position path 58D of the viewpoint related information 58 included in the reproduced video list 64 may be displayed to be superimposed on the bird's-eye view image 56.

In this case, the video reproduction unit 28 generates a path image in which the form of the viewpoint position path 58D of the viewpoint related information 58 included in the reproduced video list 64 is displayed in association with the recommendation data 32, and transmits the generated path image to the user device 12. The path image shows an aspect in which a form of the viewpoint position path 58D of the viewpoint related information 58 included in the reproduced video list 64 can be distinguished from a form of the viewpoint position path 58D of the untransmitted virtual viewpoint video 30 included in the recommendation data 32. The path image is an example of a "path image" according to the technology of the present disclosure.

Figure 23:
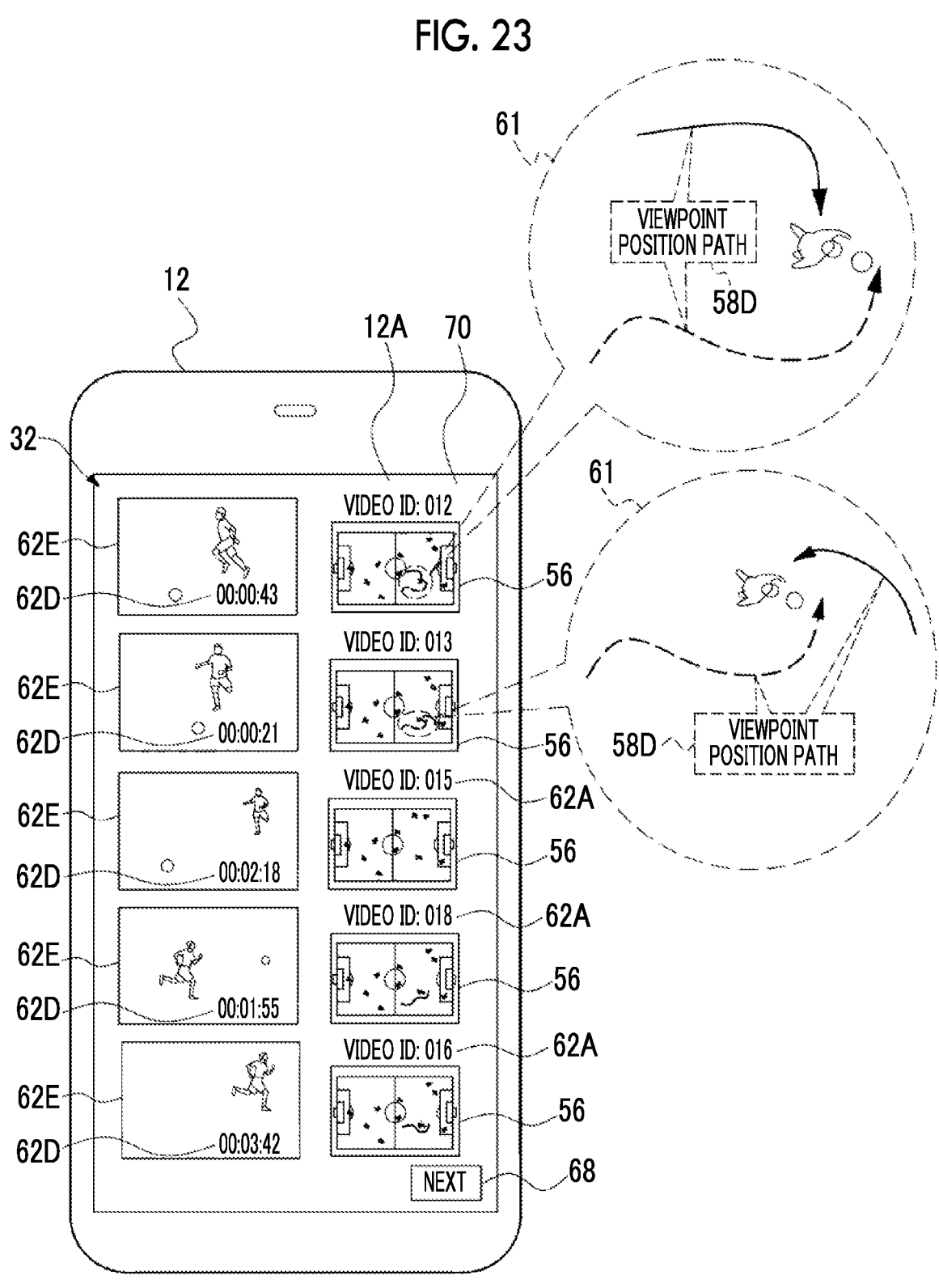
FIG. 23 is a conceptual diagram showing an example of an aspect in which a form of a viewpoint position path related to the reproduced virtual viewpoint video is displayed on the recommendation screen according to the second embodiment displayed on the user device.

According to the configuration shown in FIG. 23, the user can select the virtual viewpoint video 30 with reference to the form of the viewpoint position path 58D of the viewpoint related information 58 included in the reproduced video list 64. In a case where the form of the gaze point path of the untransmitted virtual viewpoint video 30 is displayed to be superimposed on the bird's-eye view image 56 on the recommendation screen 70, a form of the gaze point path of the viewpoint related information 58 included in the reproduced video list 64 may be displayed to be superimposed on the bird's-eye view image 56.

In the second embodiment described above, a form example in which the recommendation screen 70 shown in FIG. 19 is displayed on the touch panel display 12A has been described, but the technology of the present disclosure is not limited to this. Hereinafter, another form example of the recommendation screen 70 will be described with reference to FIGS. 24 and 25.

Figure 24:
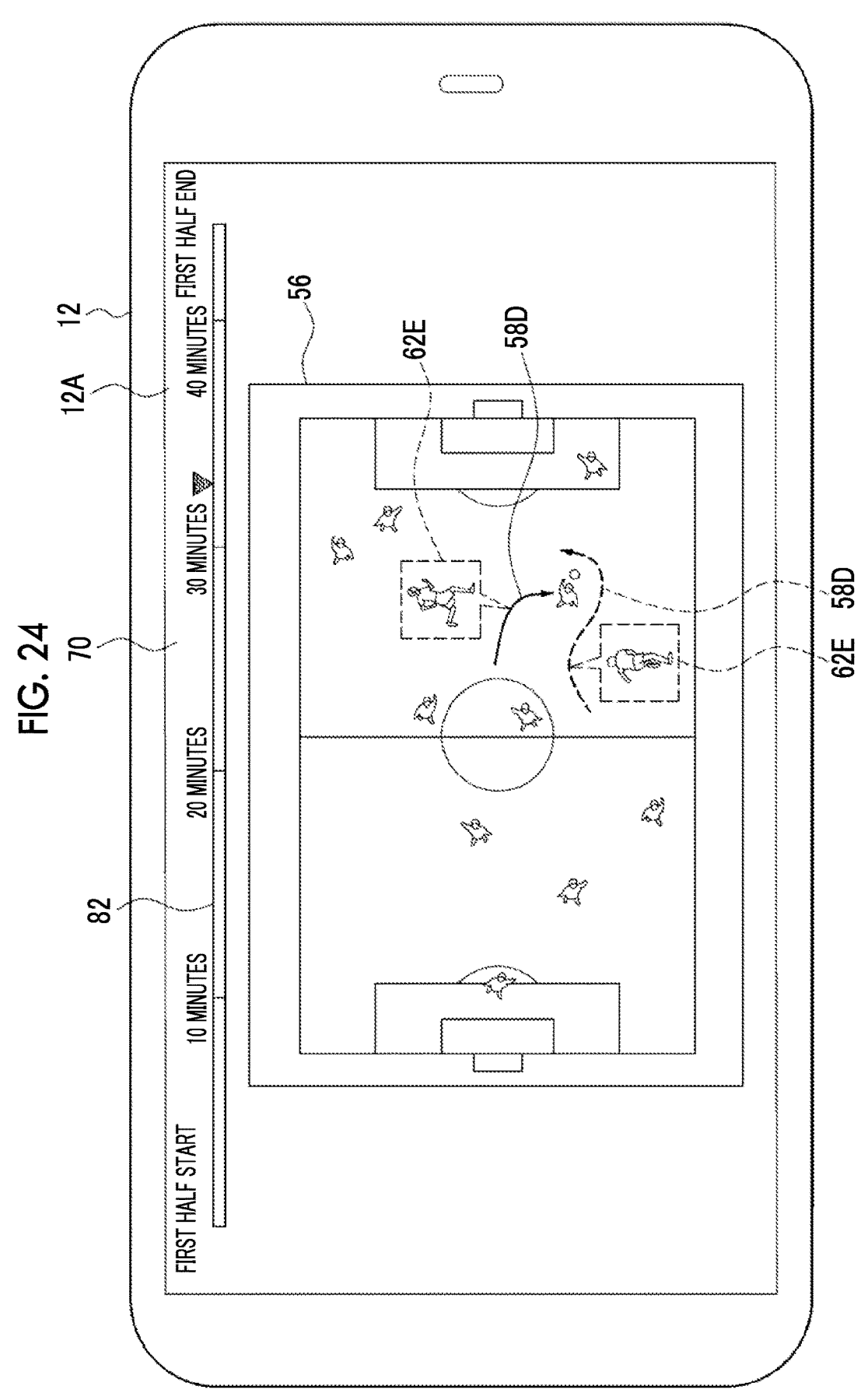
FIG. 24 is a conceptual diagram showing another example of the recommendation screen according to the second embodiment displayed on the user device.

As an example, the recommendation screen 70 shown in FIG. 24 may be displayed on the touch panel display 12A. The recommendation data 32 includes a seek bar 82, the bird's-eye view image 56, forms of the thumbnail image 62E and the viewpoint position path 58D of the untransmitted virtual viewpoint video 30 included in the recommendation data 32, and forms of the thumbnail image 62E and the viewpoint position path 58D of the virtual viewpoint video 30 included in the reproduced video list 64.

On the recommendation screen 70, the seek bar 82 indicates the game elapsed time 62C of the virtual viewpoint video 30 included in the recommendation data 32. The form of the viewpoint position path 58D of the virtual viewpoint video 30 included in the reproduced video list 64 and the form of the viewpoint position path 58D of the untransmitted virtual viewpoint video 30 included in the recommendation data 32 are displayed on the recommendation screen 70 in a distinguishable manner. Each thumbnail image 62E is displayed at a corresponding position on each viewpoint position path 58D.

That is, the video reproduction unit 28 acquires information indicating that each thumbnail image 62E is an image observed from which viewpoint position among the plurality of viewpoint positions included in each viewpoint position path 58D, and generates the recommendation data 32 including first position information that can specify a position of each thumbnail image 62E on the viewpoint position path 58D. The first position information is an example of "first position information" according to the technology of the present disclosure.

According to the configuration shown in FIG. 24, compared with a case where the thumbnail image 62E and the viewpoint position path 58D are separately displayed on the recommendation screen 70, a user can select the virtual viewpoint video 30 by referring to a position of the thumbnail image 62E with respect to the viewpoint position path 58D. Instead of the viewpoint position path 58D, the recommendation screen 70 including the gaze point path may be displayed. In this case, the recommendation data 32 includes position information that can specify a position of the thumbnail image 62E on the gaze point path. In the example shown in FIG. 24, although the viewpoint position path 58D and the thumbnail image 62E regarding a single untransmitted virtual viewpoint video 30 are displayed on the recommendation screen 70, the viewpoint position path 58D and the thumbnail image 62E regarding a plurality of untransmitted virtual viewpoint videos 30 may be displayed on the recommendation screen 70.

In the second embodiment, the recommendation screen 70 shown in FIG. 19 is displayed on the touch panel display 12A. However, as an example, the recommendation screen 70 shown in FIG. 25 may be displayed on the touch panel display 12A. The recommendation screen 70 includes the seek bar 82, the video information 62 regarding the plurality of virtual viewpoint videos 30 included in the recommendation data 32, that is, the video ID 62A, the author 62B, the game elapsed time 62C, the video length 62D, the thumbnail image 62E, and the like.

On the recommendation screen 70, the seek bar 82 indicates from the start time to the end time of the game. The video information 62 regarding the virtual viewpoint video 30 is roughly classified for each game elapsed time 62C included in the video information 62, and is disposed in the horizontal direction in a time series. Specifically, the video information 62 regarding the virtual viewpoint video 30 in which the start time of the game elapsed time 62C is between 0 minutes and 10 minutes is disposed in the leftmost column of the recommendation screen 70, the video information 62 regarding the virtual viewpoint video 30 between 11 minutes and 20 minutes is disposed in the second column from the left of the recommendation screen 70, the video information 62 regarding the virtual viewpoint video 30 between 21 minutes and 30 minutes is disposed in the third column from the left of the recommendation screen 70, and the video information 62 regarding the virtual viewpoint video 30 between 31 minutes and 45 minutes is disposed in the rightmost column of the recommendation screen 70.

Figure 25:
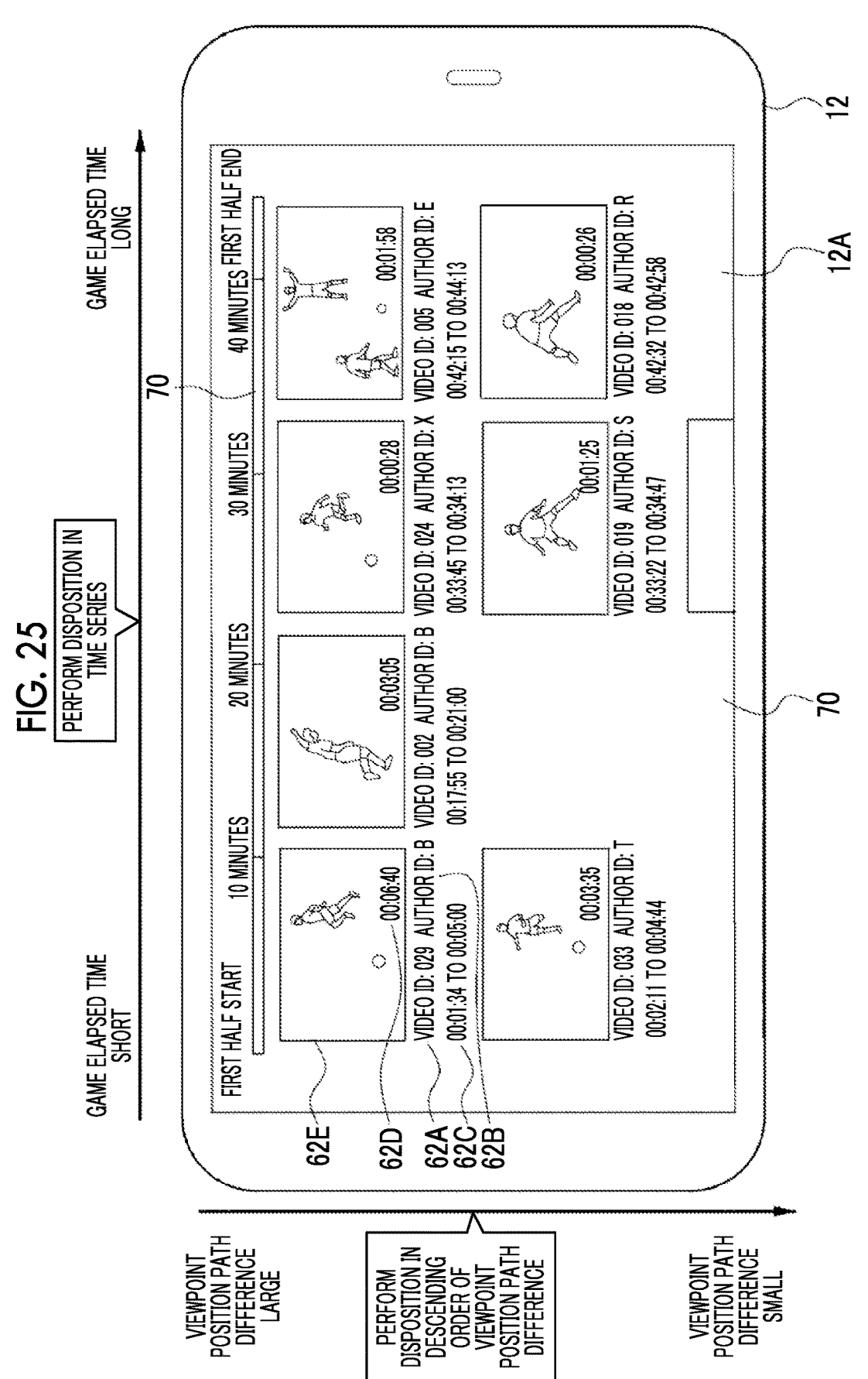
FIG. 25 is a conceptual diagram showing still another example of the recommendation screen according to the second embodiment displayed on the user device.

In each column, the video information 62 regarding the virtual viewpoint video 30 is disposed from the top in descending order of viewpoint position path difference from the viewpoint position path 58D of the viewpoint related information 58 included in the reproduced video list 64, that is, in ascending order of similarity regarding the viewpoint position path 58D. The recommendation screen 70 shown in FIG. 25 is only a part, and the recommendation screen 70 can be scrolled in the left-right direction and the up-down direction of the touch panel display 12A. A method of dividing the game elapsed time is not limited to the above division method, and any method may be used. Information regarding a vertical axis related to the viewpoint position path difference may be displayed on the touch panel display 12A. In the present embodiment, the information regarding the vertical axis related to the viewpoint position path difference is, for example, information that the viewpoint position path difference becomes larger as a position becomes higher and the viewpoint position path difference becomes smaller as the position becomes lower.

That is, the recommendation data 32 includes second position information in which the video information 62 regarding the plurality of virtual viewpoint videos 30 is disposed in the horizontal direction in a time series of the game elapsed time 62C and is disposed in the vertical direction in ascending order of similarity regarding the viewpoint position path 58D with the viewpoint position path 58D of the viewpoint related information 58 included in the reproduced video list 64. The second position information is an example of "second position information" according to the technology of the present disclosure.

According to the configuration shown in FIG. 25, a user can easily select the virtual viewpoint video 30 intended by the user, compared with a case where the video information 62 regarding the plurality of virtual viewpoint videos 30 is randomly disposed. In the example shown in FIG. 25, the video information 62 regarding the virtual viewpoint video 30 is disposed from the top in descending order of viewpoint position path difference from the viewpoint position path 58D of the viewpoint related information 58 included in the reproduced video list 64. However, the technology of the present disclosure is not limited to this, and the video information 62 regarding the virtual viewpoint video 30 may be disposed from the top in ascending order of viewpoint position path difference from the viewpoint position path 58D of the viewpoint related information 58 included in the reproduced video list 64.

In the first and second embodiments, a form example in which the video reproduction unit 28 generates the recommendation data 32 on the basis of the similarity with the viewpoint related information 58 included in the reproduced video list 64 and the similarity with the game elapsed time 62C has been described. However, the technology of the present disclosure is not limited to this. Hereinafter, with reference to FIGS. 26 to 39, a form example will be described in which the recommendation data 32 is generated on the basis of elements other than the similarity of the viewpoint related information 58 and the similarity of the game elapsed time 62C between the virtual viewpoint video 30 included in the reproduced video list 64 and the untransmitted virtual viewpoint video 30.

Figure 26:
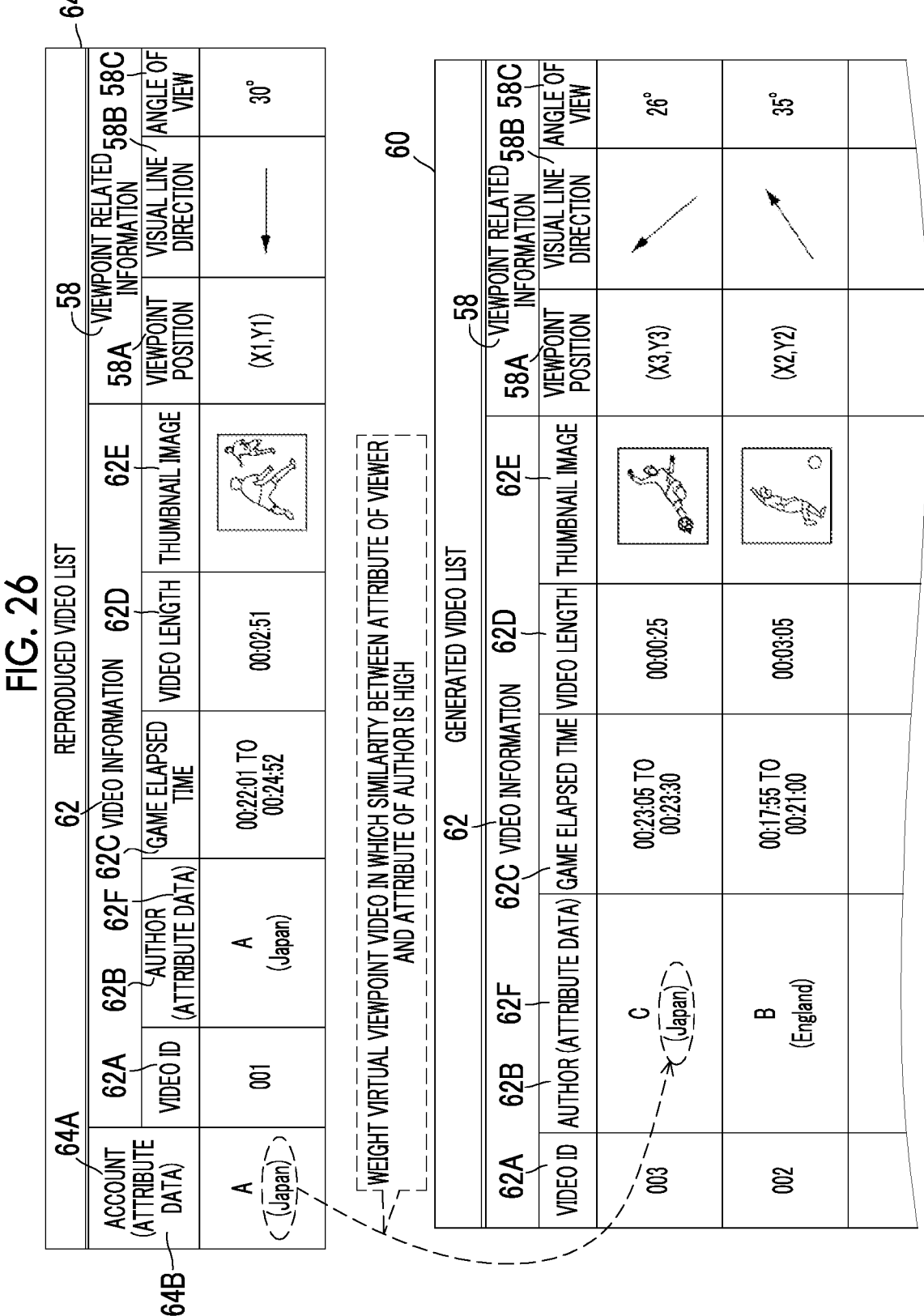
FIG. 26 is a conceptual diagram showing an example of an aspect in which recommendation data is generated by using attribute data registered in association with an account.

As shown in FIG. 26 as an example, the video reproduction unit 28 may acquire registration data of a user and generate the recommendation data 32 on the basis of the acquired registration data. Examples of the registration data include attribute data indicating an attribute of the user.

In the example shown in FIG. 26, attribute data 64B of the user A indicating "Japan" is recorded in the reproduced video list 64 corresponding to the account of the user A. This attribute data indicates that the user A is a fan of the "Japan" team. The attribute data may be registered in the data processing apparatus 10 from the user device 12 or may be registered in the data processing apparatus 10 from another device. The attribute data may be registered when the user registers the account, or may be included in the video reproduction request 52 received from the user device 12. In addition to the team name that the user likes, the attribute data includes a user's sex, age, favorite player name, and the like. The attribute data is an example of "attribute data" according to the technology of the present disclosure.

The video reproduction unit 28 may generate the recommendation data 32 in which the thumbnail image 62E and/or the viewpoint related information 58 is displayed on the user device 12 in descending order of the similarity between the attribute data 64B of the user included in the reproduced video list 64 and the attribute data 62F of the author 62B of the untransmitted virtual viewpoint video 30. For example, in the example shown in FIG. 26, since the attribute data 64B of the user A matches the attribute data 62F of an author C, the video reproduction unit 28 weights the virtual viewpoint video 30 created by the author C. The number of attributes included in the attribute data 64B is not limited to one, and the video reproduction unit 28 may weight the virtual viewpoint video 30 according to the similarity of a plurality of attributes. The video reproduction unit 28 generates the recommended video list 66 by rearranging the virtual viewpoint videos 30 in the generated video list 60 in descending order of weights given to the virtual viewpoint videos 30, and creates the recommendation data 32 according to the generated recommended video list 66.

According to the configuration shown in FIG. 26, the video reproduction unit 28 generates the recommendation data 32 on the basis of the registration data of the user. Therefore, according to the present configuration, the user can easily select the virtual viewpoint video 30 intended by the user, compared with a case where the recommendation data 32 is generated without considering the registration data of the user.

According to the configuration shown in FIG. 26, the registration data of the user is the attribute data 64B indicating the attribute of the user. Therefore, according to the present configuration, the user can easily select the virtual viewpoint video 30 intended by the user, compared with a case where the recommendation data 32 is generated without considering the attribute data 64B of the user.

According to the configuration shown in FIG. 26, the recommendation data 32 is data in which the thumbnail image 62E and/or the viewpoint related information 58 is displayed on the user device 12 in an order determined on the basis of a similarity between the attribute data 64B of the user using the user device 12 and the attribute data 62F of the author 62B of the virtual viewpoint video 30. Therefore, according to the present configuration, compared with a case where the recommendation data 32 regarding the virtual viewpoint video 30 is randomly displayed on the user device 12, the user can easily select the virtual viewpoint video 30 intended by the user on the basis of a similarity between the attribute data 64B of the user and the attribute data 62F of the author 62B. In FIG. 26, an aspect example in which the recommendation data 32 is generated in descending order of the similarity between the attribute data 64B of the user A included in the reproduced video list 64 and the attribute data 62F of the author 62B of the virtual viewpoint video 30 has been described, but the technology of the present disclosure is not limited to this, and the recommendation data 32 may be generated in ascending order of the similarity between the attribute data 64B of the user included in the reproduced video list 64 and the attribute data 62F of the author 62B of the virtual viewpoint video 30.

Figure 27:
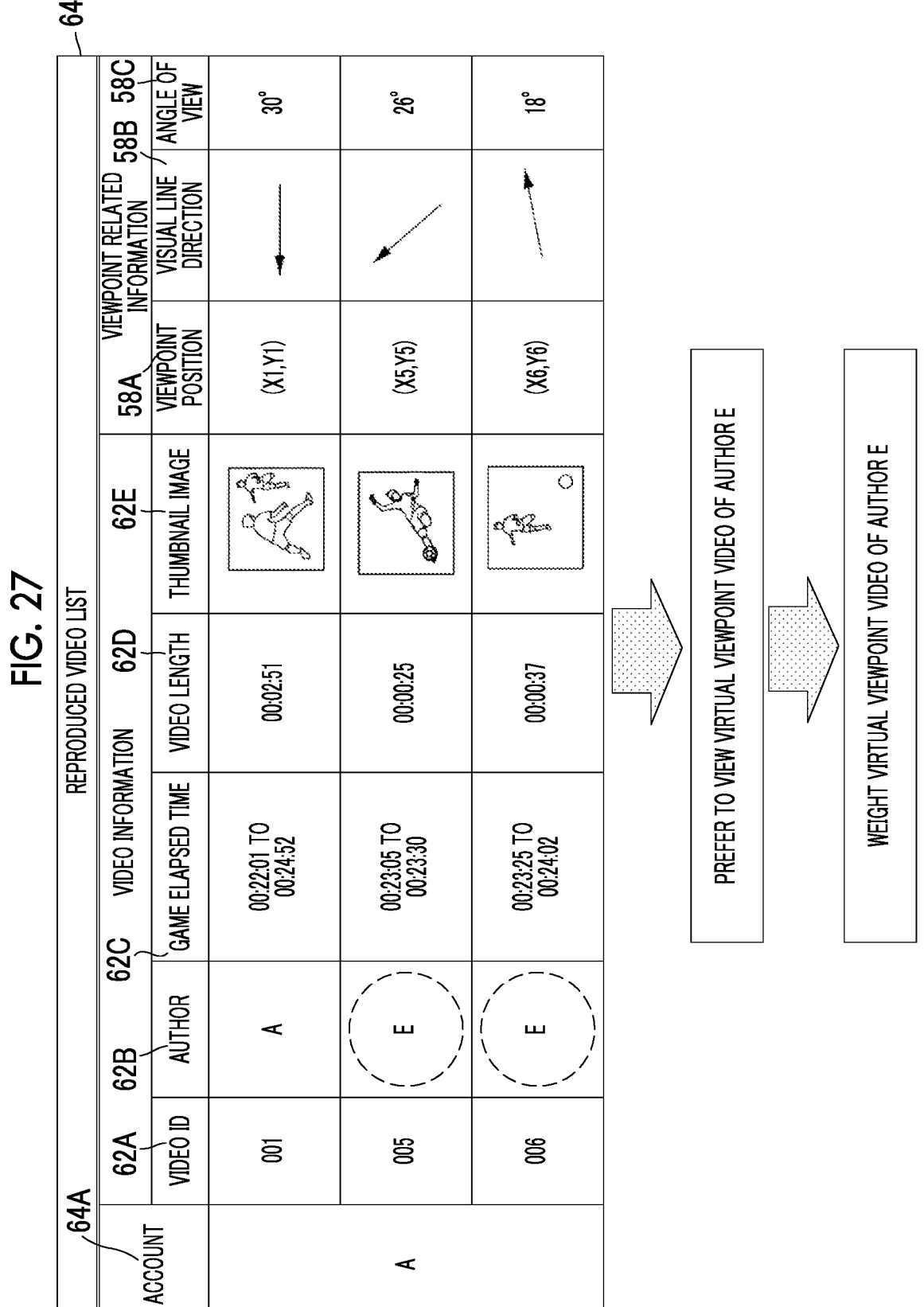
FIG. 27 is a conceptual diagram showing an example of an aspect in which recommendation data is generated on the basis of a reproduction tendency shown in a reproduced video list.

As shown in FIG. 27 as an example, the video reproduction unit 28 may generate the recommendation data 32 in which the thumbnail image 62E and/or the viewpoint related information 58 is displayed on the user device 12 in an order determined on the basis of a reproduction tendency extracted from a reproduction history of the virtual viewpoint video 30 shown in the reproduced video list 64 corresponding to the account of the user using the user device 12.

In the example shown in FIG. 27, in the reproduced video list 64 corresponding to the account of the user A, information regarding one virtual viewpoint video 30 created by the user A and information regarding two virtual viewpoint videos 30 created by the user E are recorded. The video reproduction unit 28 refers to the reproduced video list 64 and determines that the user A prefers to view the virtual viewpoint video 30 created by the user E. The video reproduction unit 28 weights the virtual viewpoint video 30 in which the author 62B is "E" among the virtual viewpoint videos 30 recorded in the generated video list 60. The video reproduction unit 28 generates the recommended video list 66 by rearranging the virtual viewpoint videos 30 in the generated video list 60 in descending order of weight, and creates the recommendation data 32 according to the generated recommended video list 66.

According to the configuration shown in FIG. 27, compared to a case where the recommendation data 32 includes the information regarding the virtual viewpoint video 30 randomly selected, the user can easily select the virtual viewpoint video 30 intended by the user on the basis of the reproduction tendency of the virtual viewpoint video 30 of the user.

In the example shown in FIG. 27, the video reproduction unit 28 extracts the reproduction tendency from the reproduction history of the virtual viewpoint video 30 shown in the reproduced video list 64, but the technology of the present disclosure is not limited to this. The user may register the favorite author "E" in advance as preference data indicating the preference of the user, and the video reproduction unit 28 may create the recommendation data 32 on the basis of the preference data of the user. The preference data is an example of "preference data" according to the technology of the present disclosure. According to the present configuration, the user can easily select the virtual viewpoint video 30 intended by the user, compared with a case where the recommendation data 32 is generated without considering preference data of the user. In addition to the favorite author, examples of the preference data include a favorite viewpoint position, a favorite visual line direction, and a favorite angle of view.

Figure 28:
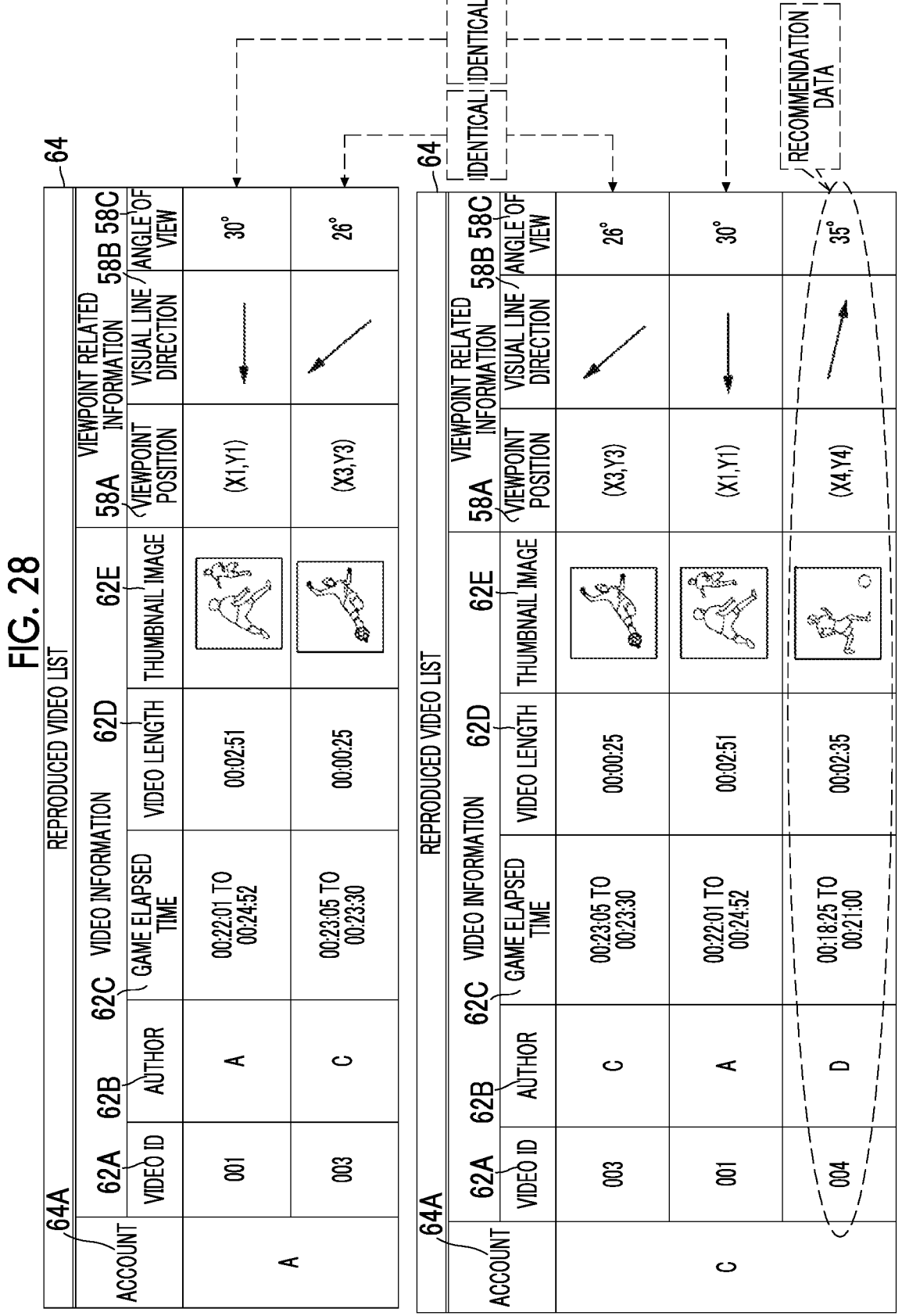
FIG. 28 is a conceptual diagram showing an example of an aspect in which recommendation data is generated on the basis of a reproduction history shown in the reproduced video list.

As shown in FIG. 28 as an example, the video reproduction unit 28 may generate the recommendation data 32 in which the thumbnail image 62E and/or the viewpoint related information 58 is displayed on the user device 12 in an order determined on the basis of a result of comparison between a reproduction history of the virtual viewpoint video 30 shown in the reproduced video list 64 corresponding to the account of the user using the user device 12 and a reproduction history of the virtual viewpoint video 30 shown in the reproduced video list 64 corresponding to an account of another user.

In the example shown in FIG. 28, information regarding the virtual viewpoint videos 30 having the video IDs 62A of "001" and "003" is recorded in the reproduced video list 64 corresponding to the account of the user A. The virtual viewpoint videos 30 having the video IDs 62A of "001" and "003" are a reproduction history of the virtual viewpoint video 30 of the user A, that is, a viewing history of the user A. The video reproduction unit 28 reads out the reproduced video list 64 corresponding to the account of the user C who has a viewing history similar to the viewing history of the user A. The video reproduction unit 28 compares the viewing history of the user A with the viewing history of the user C, and weights, among the virtual viewpoint videos 30 recorded in the generated video list 60, the virtual viewpoint video 30 that is included in the viewing history of the user C and is not included in the viewing history of the user A. That is, in the example shown in FIG. 27, the video reproduction unit 28 weights the virtual viewpoint video 30 having the video ID 62A of "004". The video reproduction unit 28 rearranges the virtual viewpoint videos 30 in the generated video list 60 in descending order of weight, and stores the generated video list 60 after the rearrangement as the recommended video list 66. The video reproduction unit 28 creates the recommendation data 32 according to the generated recommended video list 66.

According to the configuration shown in FIG. 28, compared to a case where the recommendation data 32 includes the information regarding the virtual viewpoint video 30 randomly selected, the user can easily select the virtual viewpoint video 30 intended by the user on the basis of a result of comparison between the reproduction history of the virtual viewpoint video 30 shown in the reproduced video list 64 corresponding to the account of the user and the reproduction history of the virtual viewpoint video 30 shown in the reproduced video list 64 corresponding to the account of another user.

As shown in FIG. 29 as an example, the video reproduction unit 28 may generate the recommendation data 32 in which the thumbnail image 62E and/or the viewpoint related information 58 is displayed on the user device 12 in an order determined on the basis of comments added to each of the virtual viewpoint videos 30.

In the example shown in FIG. 29, a comment 86 is added to the viewpoint position path 58D of each virtual viewpoint video 30. The comment 86 may be added by the author of each virtual viewpoint video 30, or may be added by a viewer who has viewed each virtual viewpoint video 30. The comment 86 is recorded in the generated video list 60 in association with a position on the viewpoint position path 58D of each virtual viewpoint video 30. The comment 86 is an example of a "comment" according to the technology of the present disclosure.

The video reproduction unit 28 weights the virtual viewpoint video 30 according to the number of given comments 86. That is, in the example shown in FIG. 29, the virtual viewpoint video 30 to which the two comments 86 are added is weighted more heavily than the virtual viewpoint video 30 to which one comment 86 is added. The video reproduction unit 28 generates the recommended video list 66 by rearranging the virtual viewpoint videos 30 in the generated video list 60 in descending order of weight, and generates the recommendation data 32 according to the generated recommended video list 66. The video reproduction unit 28 transmits the generated recommendation data 32 to the user device 12.

Figure 30:
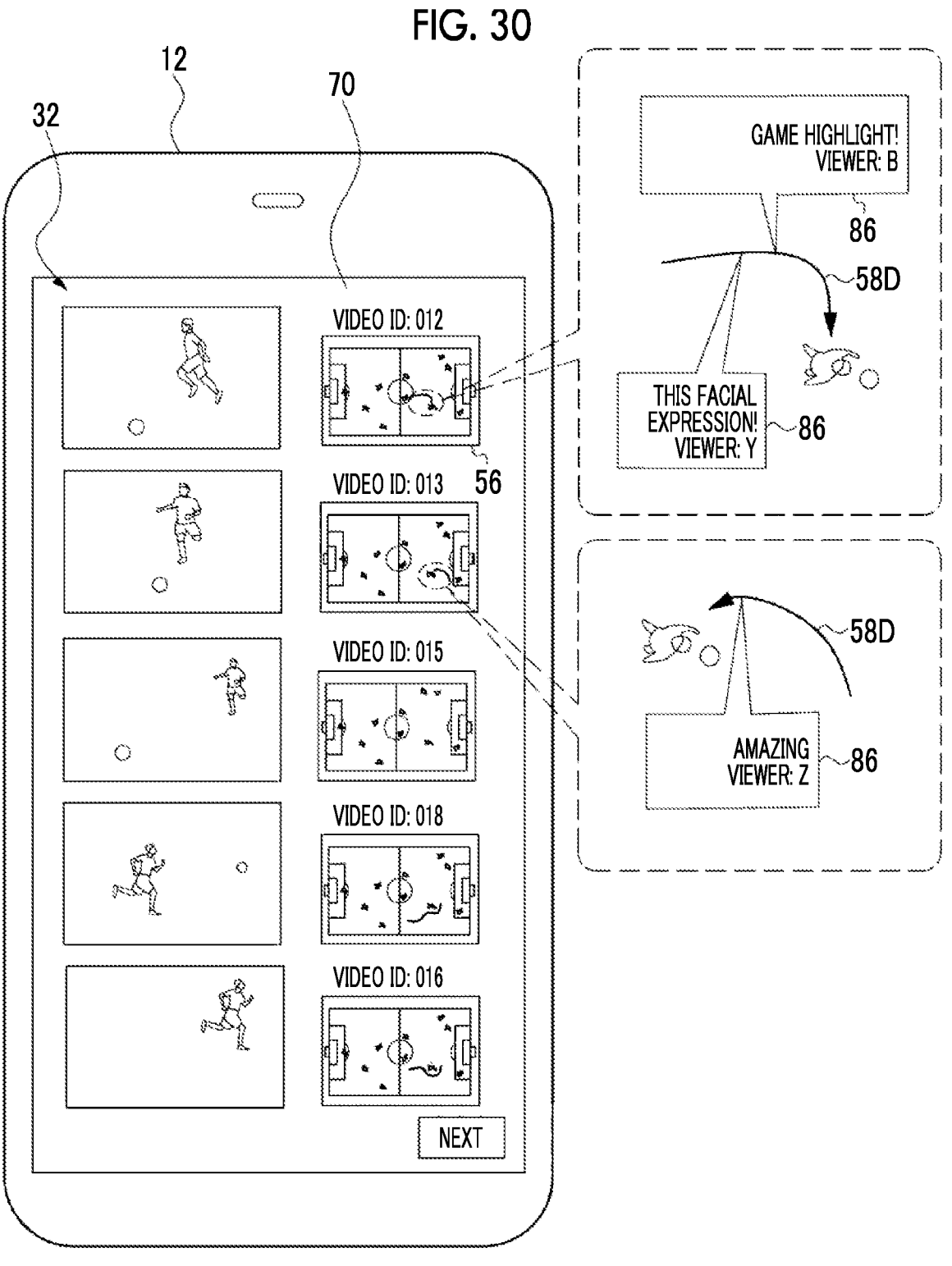
FIG. 30 is a conceptual diagram showing an example of a recommendation screen showing recommendation data generated on the basis of the comment attached to the viewpoint position path.

As shown in FIG. 30 as an example, the user device 12 receives the recommendation data 32 and displays the received recommendation data 32 on the touch panel display 12A as the recommendation screen 70. On the recommendation screen 70, the comment 86 is displayed to be superimposed on the bird's-eye view image 56 in association with a position on the viewpoint position path 58D. That is, the recommendation data 32 is data in which an image in which the comment 86 is added to the form of the viewpoint position path 58D is displayed on the user device 12.

According to the configuration shown in FIG. 29, compared with a case where the recommendation data 32 includes the information regarding the virtual viewpoint video 30 randomly selected, the user can easily select the virtual viewpoint video 30 intended by the user on the basis of the comment 86 added to each of the virtual viewpoint videos 30. According to the configuration shown in FIG. 30, the user can easily select the virtual viewpoint video 30 intended by the user compared with a case where only the comment 86 is displayed on the recommendation screen 70. The comment 86 may be added to the gaze point path instead of the viewpoint position path 58D.

Figure 31:
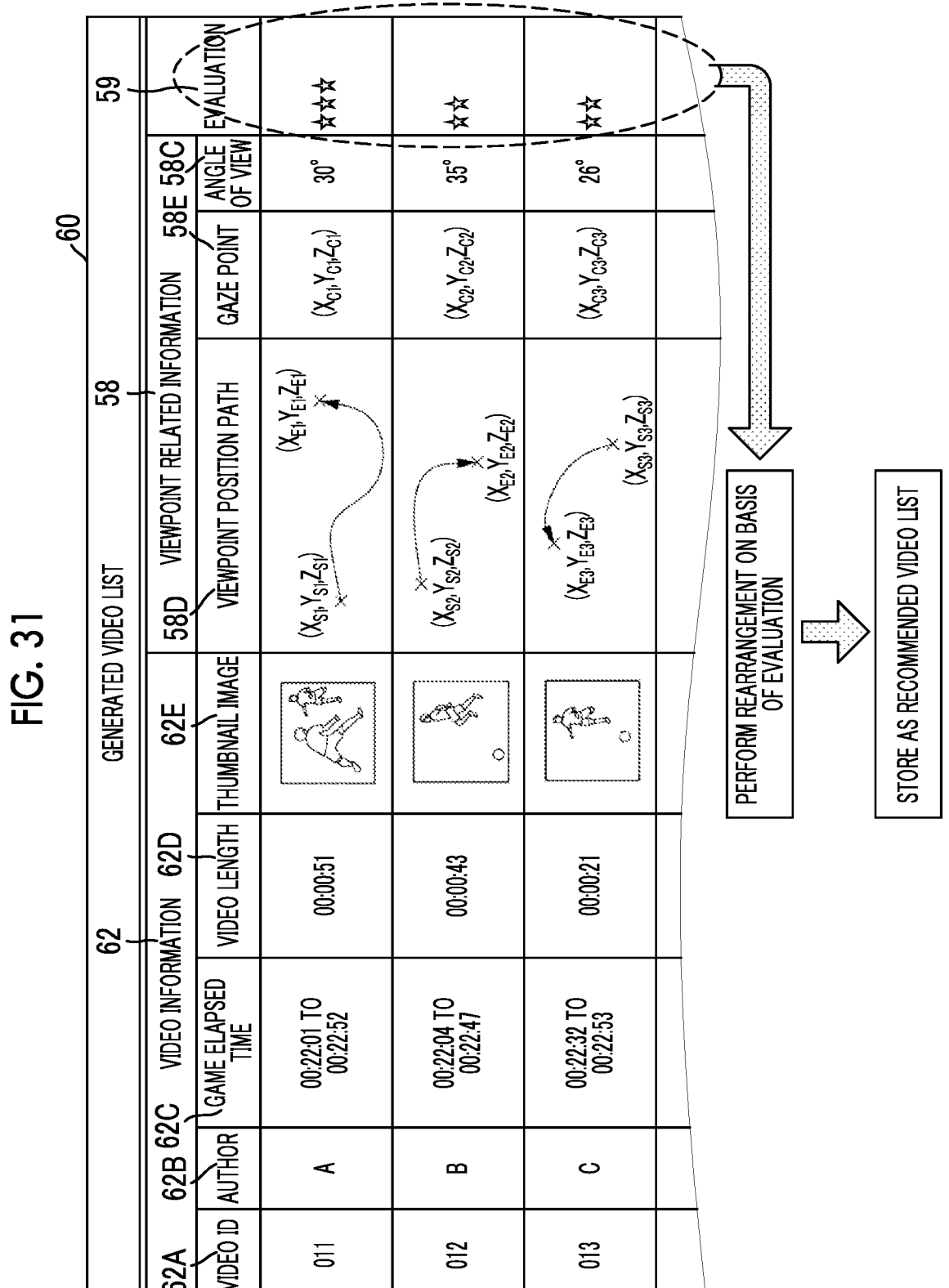
FIG. 31 is a conceptual diagram showing an example of an aspect in which recommendation data is generated on the basis of evaluation given to the virtual viewpoint video by a user who has viewed the virtual viewpoint video.

As shown in FIG. 31 as an example, in the generated video list 60, an evaluation 59 may be added to each virtual viewpoint video 30. The evaluation 59 is an evaluation added by a user who has viewed each of the virtual viewpoint videos 30. The evaluation 59 may be an evaluation added by one user, or may be an average value, a most frequent value, or the like of evaluations added by a plurality of users. The video reproduction unit 28 may generate the recommendation data 32 in which the thumbnail image 62E and/or the viewpoint related information 58 is displayed on the user device 12 in an order determined on the basis of the evaluation 59. The evaluation 59 is an example of a "first evaluation" according to the technology of the present disclosure.

In the example shown in FIG. 31, the virtual viewpoint video 30 having the video ID 62A of "011" is given the evaluation 59 with three stars.

The virtual viewpoint videos 30 having the videos ID 62A of "012" and "013" are given the evaluation 59 with two stars. The video reproduction unit 28 weights the virtual viewpoint video 30 according to the number of stars. That is, the video reproduction unit 28 generates the recommended video list 66 by rearranging the virtual viewpoint videos 30 in the generated video list 60 in descending order of the number of stars, and creates the recommendation data 32 according to the generated recommended video list 66.

According to the configuration shown in FIG. 31, the user can easily select the virtual viewpoint video 30 intended by the user on the basis of the evaluation 59 added to each virtual viewpoint video 30 compared with a case where the recommendation data 32 includes the information regarding the virtual viewpoint video 30 randomly selected.

As shown in FIG. 32 as an example, for example, in the reproduced video list 64 corresponding to the account of the user A, an evaluation 90 may be added to each virtual viewpoint video 30. The evaluation 90 is an evaluation added by the user A. The video reproduction unit 28 estimates the preference of the user A on the basis of the evaluation 90 added to each virtual viewpoint video 30. The video reproduction unit 28 may generate the recommendation data 32 in which the thumbnail image 62E and/or the viewpoint related information 58 is displayed on the user device 12 in an order determined according to the estimated preference of the user A. The evaluation 90 is an example of a "second evaluation" according to the technology of the present disclosure.

In the example shown in FIG. 32, the virtual viewpoint video 30 created by the author A is given the evaluation 90 with one star. The virtual viewpoint video 30 created by the author B is given the evaluation 90 with two stars. The virtual viewpoint video 30 created by the author E is given the evaluation 90 with three stars. The video reproduction unit 28 estimates that the user A prefers the virtual viewpoint video 30 created by the author E on the basis of the fact that the virtual viewpoint video 30 created by the author E is given the high evaluation 90. The video reproduction unit 28 weights the virtual viewpoint video 30 created by the author E in the generated video list 60. The video reproduction unit 28 rearranges the virtual viewpoint videos 30 in the generated video list 60 in descending order of weight, and stores the generated video list 60 after the rearrangement as the recommended video list 66. The video reproduction unit 28 creates the recommendation data 32 according to the generated recommended video list 66.

According to the configuration shown in FIG. 32, the user can easily select the virtual viewpoint video 30 intended by the user on the basis of the user's preference, compared with a case where the recommendation data 32 includes the information regarding the virtual viewpoint video 30 randomly selected.

Figure 33:
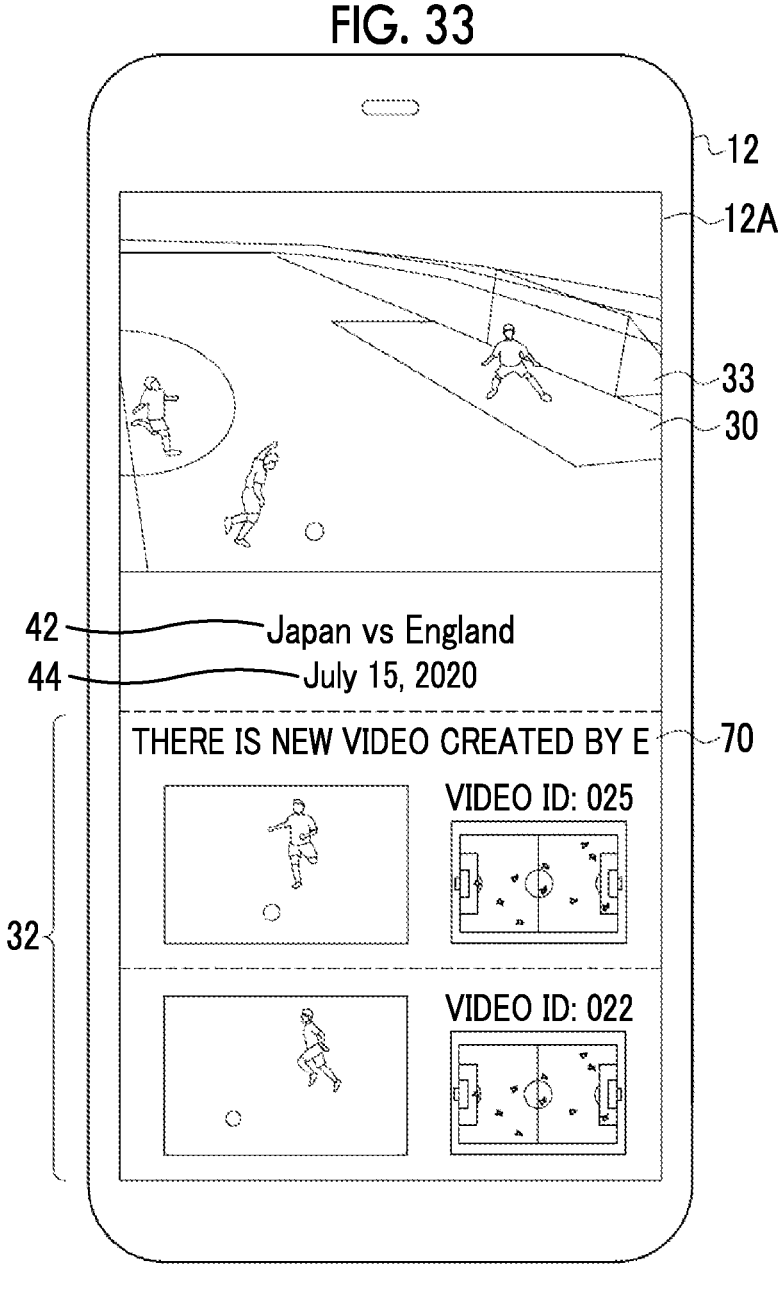
FIG. 33 is a conceptual diagram showing an example of an aspect of notifying that a virtual viewpoint video is newly added on the basis of the user's preference data.

As shown in FIG. 33 as an example, in a case where the new virtual viewpoint video 30 is added to the generated video list 60, the video reproduction unit 28 may generate the recommendation data 32 in which the thumbnail image 62E and/or the viewpoint related information 58 regarding the added virtual viewpoint video 30 is displayed on the user device 12 on the basis of the registration data of the user using the user device 12.

In the example shown in FIG. 33, the user using the user device 12 registers the author E as a favorite author. In a case where the new virtual viewpoint video 30 created by the author E is added to the generated video list 60, the video reproduction unit 28 weights the added virtual viewpoint video 30. The video reproduction unit 28 rearranges the virtual viewpoint videos 30 in the generated video list 60 in descending order of weight, and stores the generated video list 60 after the rearrangement as the recommended video list 66. The video reproduction unit 28 creates the recommendation data 32 according to the generated recommended video list 66.

The recommendation data 32 is displayed on the touch panel display 12A as the recommendation screen 70. Information regarding the new virtual viewpoint video 30 created by the author E may be displayed at the top of the recommendation screen 70 in a manner distinguishable from information regarding other virtual viewpoint videos 30.

According to the configuration shown in FIG. 33, the user can easily select the virtual viewpoint video 30 intended by the user on the basis of the registration data of the user, compared with a case where the recommendation data 32 includes only existing information regarding the virtual viewpoint video 30. In the example shown in FIG. 33, the video reproduction unit 28 creates the recommendation data 32 including the information regarding the new virtual viewpoint video 30 added to the generated video list 60 on the basis of the registration data of the user, but the technology of the present disclosure is not limited to this. The video reproduction unit 28 may create the recommendation data 32 including information regarding the new virtual viewpoint video 30 added to the generated video list 60 on the basis of the reproduction history of the virtual viewpoint video 30 shown in the reproduced video list 64 corresponding to the account of the user instead of the registration data of the user. The recommendation data 32 may be created in the same manner as described above on the basis of the virtual viewpoint video 30 registered as a favorite in the account of the user, regardless of the reproduction history corresponding to the account of the user.

As shown in FIG. 34 as an example, the video reproduction unit 28 may generate the recommendation data 32 in which the thumbnail image 62E and/or the viewpoint related information 58 is displayed on the user device 12 in an order determined on the basis of a length of the viewpoint position path 58D with respect to the video length 62D. The length of the viewpoint position path 58D with respect to the video length 62D indicates the degree of change in a viewpoint position in the virtual viewpoint video 30. That is, in a case where the viewpoint position path 58D is long with respect to the video length 62D, it can be estimated that the virtual viewpoint video 30 is a video in which a change in a viewpoint position is large. On the other hand, in a case where the viewpoint position path 58D is short with respect to the video length 62D, it can be estimated that the virtual viewpoint video 30 is a video in which a change in a viewpoint position is small. The degree of change in a viewpoint position is represented by a ratio of the length of the viewpoint position path 58D to the video length 62D (hereinafter, referred to as a "viewpoint position change ratio").

In the example shown in FIG. 34, in the reproduced video list 64 corresponding to the account of the user A, the virtual viewpoint video 30 having the video ID 62A of "015" is given a high evaluation 90. The video reproduction unit 28 calculates the viewpoint position change ratio of the virtual viewpoint video 30 having the high evaluation 90, and in a case where the calculated viewpoint position change ratio is less than a predetermined value, it is estimated that the user A prefers the virtual viewpoint video 30 in which a change in the viewpoint position is small. The video reproduction unit 28 weights the virtual viewpoint video 30 in which the viewpoint position change ratio is less than the predetermined value in the generated video list 60. The video reproduction unit 28 rearranges the virtual viewpoint videos 30 in the generated video list 60 in descending order of weight, and stores the generated video list 60 after the rearrangement as the recommended video list 66. The video reproduction unit 28 creates the recommendation data 32 according to the generated recommended video list 66. In a case where the calculated viewpoint position change ratio is more than the predetermined value, the video reproduction unit 28 may weight the virtual viewpoint video 30 in which the viewpoint position change ratio is more than the predetermined value in the generated video list 60.

According to the configuration shown in FIG. 34, the user can easily select the virtual viewpoint video 30 intended by the user on the basis of the length of the viewpoint position path 58D with respect to the video length 62D, compared with a case where the recommendation data 32 includes the information regarding the virtual viewpoint video 30 randomly selected. In the example shown in FIG. 34, the video reproduction unit 28 estimates the user's preference by comparing a viewpoint position change ratio with a predetermined value, but the technology of the present disclosure is not limited to this. The video reproduction unit 28 may estimate the user's preference by comparing the calculated viewpoint position change ratio with the average value, the most frequent value, or the like of the viewpoint position change ratio. In the example shown in FIG. 34, the video reproduction unit 28 generates the recommendation data 32 on the basis of the length of the viewpoint position path 58D with respect to the video length 62D, but the technology of the present disclosure is not limited to this. The video reproduction unit 28 may generate the recommendation data 32 on the basis of a length of the gaze point path with respect to the video length 62D. The example of referring to the viewpoint position path 58D is not limited to this. For example, the viewpoint position path 58D of the virtual viewpoint video 30 to which the high evaluation 90 is added is given a high weight, and the recommendation data 32 in which the virtual viewpoint videos 30 are arranged in an order similar to the viewpoint position path 58D may be created. The recommendation data 32 may be created by giving high weight to both the author of the virtual viewpoint video 30 with the high evaluation 90 and the viewpoint position path 58D.

Figure 35:
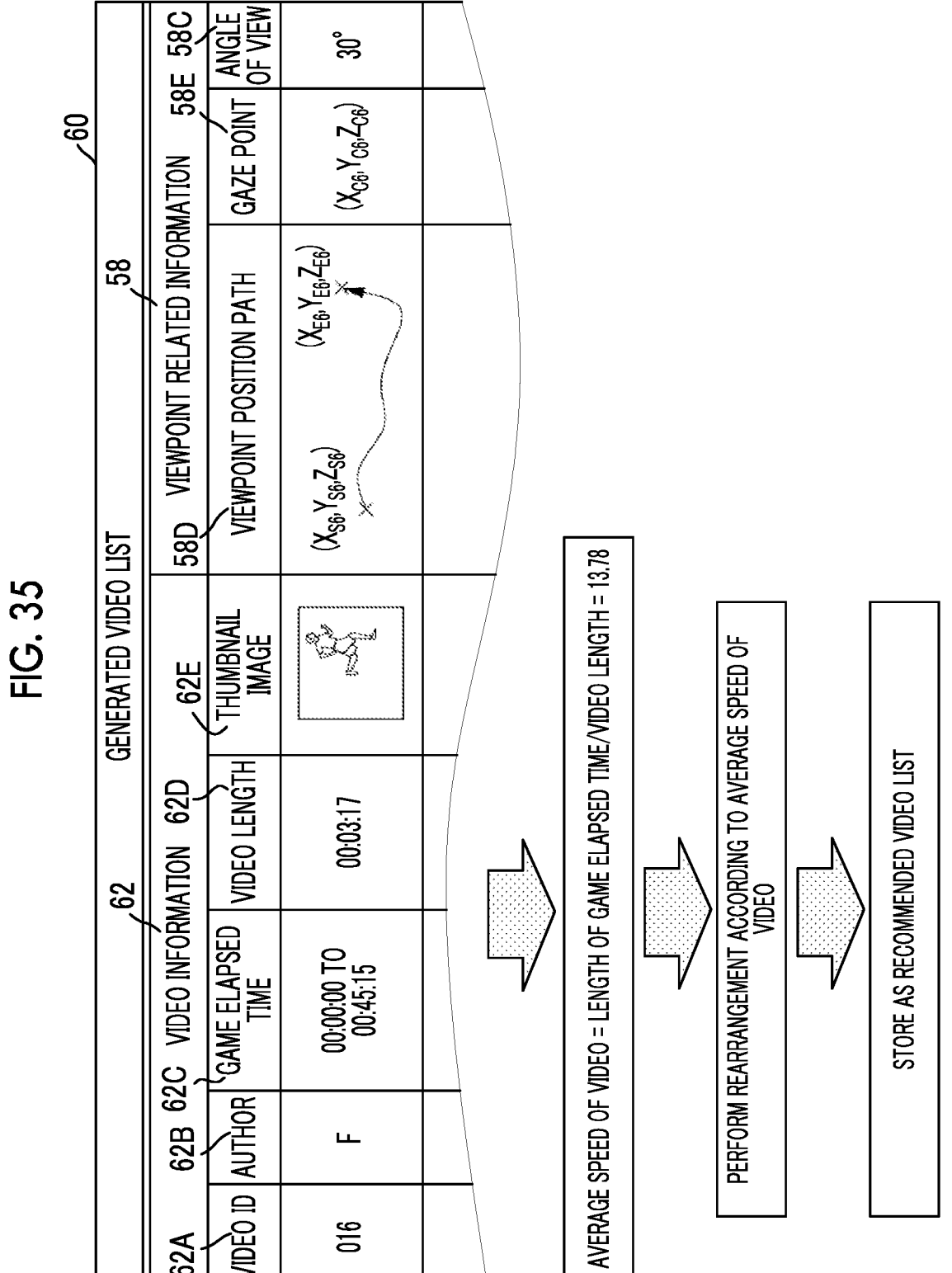
FIG. 35 is a conceptual diagram showing an example of an aspect in which recommendation data is generated on the basis of a ratio of a length of a game elapsed time to a video length.

As shown in FIG. 35 as an example, the video reproduction unit 28 may generate the recommendation data 32 in which the thumbnail image 62E and/or the viewpoint related information 58 is displayed on the user device 12 in an order determined on the basis of a length of the game elapsed time 62C with respect to the video length 62D. The length of the game elapsed time 62C with respect to the video length 62D indicates an average speed of the virtual viewpoint video 30. That is, the virtual viewpoint video 30 in which the game elapsed time 62C is long with respect to the video length 62D, that is, the video having a high average speed is a fast-forwarding video obtained by shortening the long-time captured video 34. The length of the game elapsed time 62C is an example of "second time information" according to the technology of the present disclosure.

In the example shown in FIG. 35, the video reproduction unit 28 calculates an average speed of each virtual viewpoint video 30 recorded in the generated video list 60, and rearranges the virtual viewpoint videos 30 in the generated video list 60 in descending order of the calculated average speed. The video reproduction unit 28 stores the generated video list 60 after the rearrangement as the recommended video list 66. The video reproduction unit 28 creates the recommendation data 32 according to the generated recommended video list 66.

Figure 36:
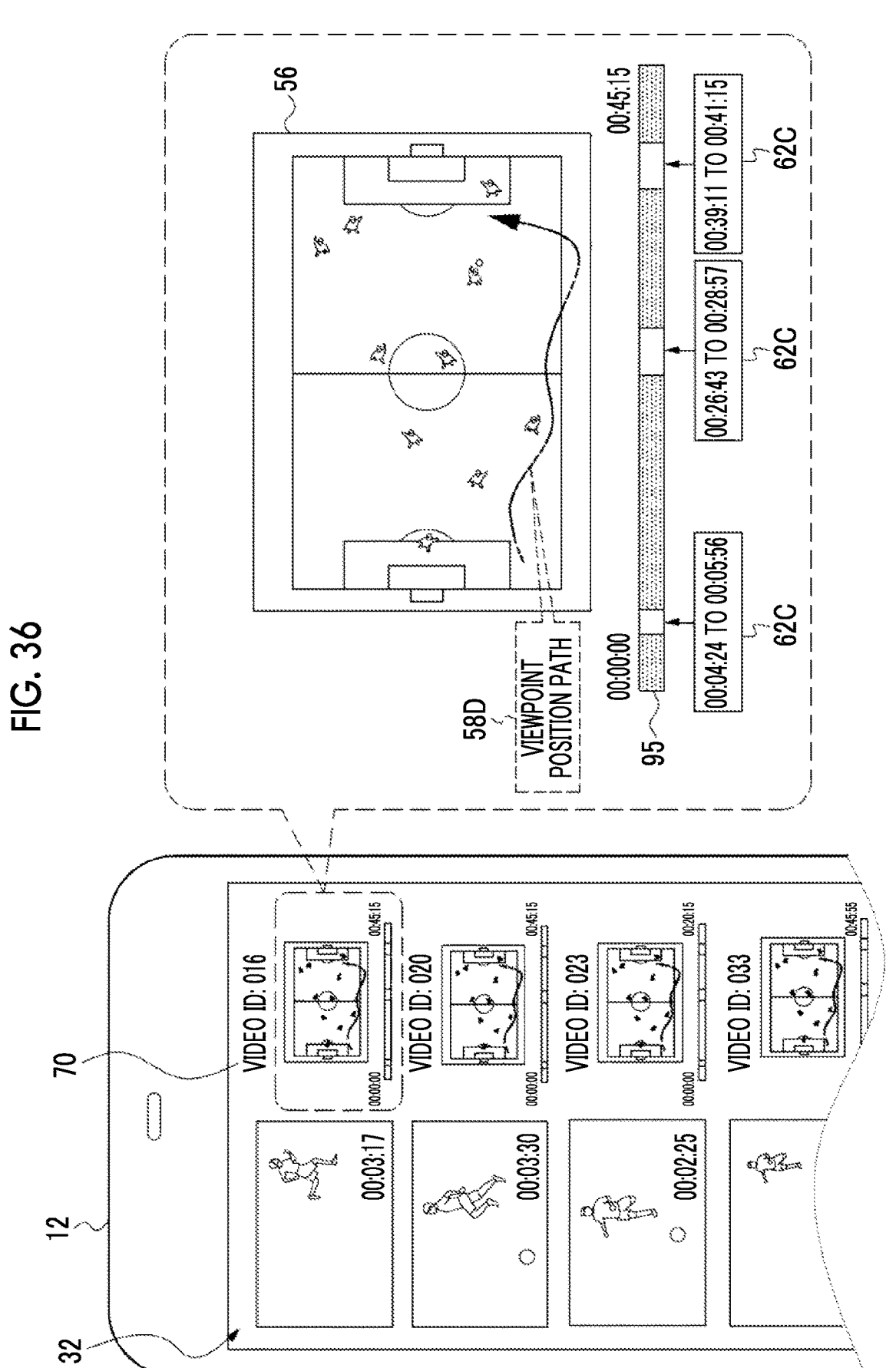
FIG. 36 is a conceptual diagram showing an example of a recommendation screen showing recommendation data generated on the basis of a ratio of a length of a game elapsed time to a video length.

As shown in FIG. 36 as an example, on the recommendation screen 70 that displays the recommendation data 32 generated on the basis of the average speed of the virtual viewpoint video 30, a seek bar 95 is displayed below the bird's-eye view image 56. In the seek bar 95, a portion where the speed of the virtual viewpoint video 30 is more than a predetermined value (hereinafter, referred to as a "fast-forwarding portion") is indicated by hatching. It is estimated that a portion where the speed of the virtual viewpoint video 30 is less than the predetermined value (hereinafter, referred to as a "slow-forwarding portion") is a portion corresponding to a scene of interest such as a good play scene and/or a goal scene. The game elapsed time 62C is displayed to correspond to each slow-forwarding portion. In the viewpoint position path 58D, the fast-forwarding portion and the slow-forwarding portion are displayed in a distinguishable manner.

According to the configurations shown in FIGS. 35 and 36, the user can easily select the virtual viewpoint video 30 intended by the user on the basis of the length of the game elapsed time 62C with respect to the video length 62D, compared with a case where the recommendation data 32 includes the information regarding the virtual viewpoint video 30 randomly selected.

As shown in FIG. 37 as an example, a data capacity 96 of each virtual viewpoint video 30 is stored in the generated video list 60. The video reproduction unit 28 may generate the recommendation data 32 in which the thumbnail image 62E and/or the viewpoint related information 58 is displayed on the user device 12 in an order determined on the basis of the data capacity 96 of each virtual viewpoint video 30. The data capacity 96 is an example of a "data capacity" according to the technology of the present disclosure.

The video reproduction unit 28 determines a communication speed of the user device 12, and rearranges the virtual viewpoint videos 30 in the generated video list 60 according to the determined communication speed of the user device 12. That is, in a case where the communication speed of the user device 12 is less than a predetermined value, the virtual viewpoint videos 30 in the generated video list 60 are rearranged in ascending order of the data capacity 96. On the other hand, in a case where the communication speed of the user device 12 is more than the predetermined value, the virtual viewpoint videos 30 in the generated video list 60 are rearranged in descending order of the data capacity 96. The video reproduction unit 28 stores the generated video list 60 after the rearrangement as the recommended video list 66.

The video reproduction unit 28 creates the recommendation data 32 according to the generated recommended video list 66.

According to the configuration shown in FIG. 37, compared to a case where the recommendation data 32 includes the information regarding the virtual viewpoint video 30 randomly selected, the user can easily select the virtual viewpoint video 30 intended by the user on the basis of the data capacity 96 of each virtual viewpoint video 30.

In the example shown in FIG. 37, the video reproduction unit 28 generates the recommendation data 32 on the basis of the data capacity 96 of the virtual viewpoint video 30, but the technology of the present disclosure is not limited to this. The video reproduction unit 28 may generate the recommendation data 32 in which the thumbnail image 62E and/or the viewpoint related information 58 is displayed on the user device 12 in an order determined on the basis of a resolution 97 of each virtual viewpoint video 30 instead of the data capacity 96 of the virtual viewpoint video 30.

Figure 38:
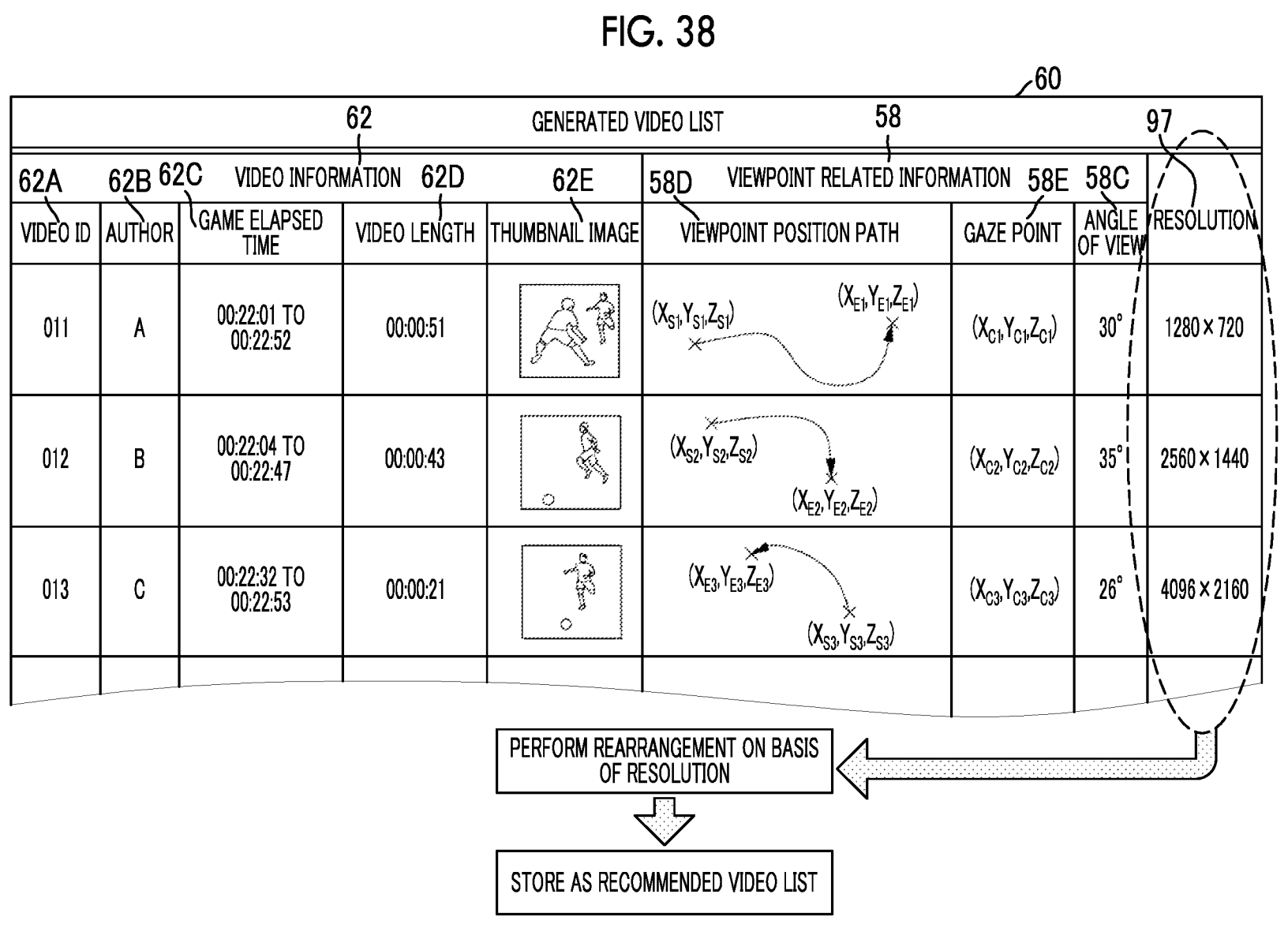

As shown in FIG. 38 as an example, the resolution 97 of each virtual viewpoint video 30 is stored in the generated video list 60. The video reproduction unit 28 rearranges the virtual viewpoint videos 30 in the generated video list 60 according to the communication speed of the user device 12, and stores the generated video list 60 after the rearrangement as the recommended video list 66. The video reproduction unit 28 creates the recommendation data 32 according to the generated recommended video list 66. The resolution 97 is an example of a "parameter related to image quality" according to the technology of the present disclosure.

According to the configuration shown in FIG. 38, compared to a case where the recommendation data 32 includes the information regarding the virtual viewpoint video 30 randomly selected, the user can easily select the virtual viewpoint video 30 intended by the user on the basis of the resolution 97 of each virtual viewpoint video 30. In the example shown in FIG. 38, the video reproduction unit 28 generates the recommendation data 32 on the basis of the resolution 97 of each virtual viewpoint video 30, but the technology of the present disclosure is not limited to this. The video reproduction unit 28 may generate the recommendation data 32 on the basis of a frame rate of each virtual viewpoint video 30 instead of the resolution 97 of each virtual viewpoint video 30.

As shown in FIG. 39 as an example, the generated video list 60 includes information regarding the presence or absence of sound data 98 added to each virtual viewpoint video 30. Examples of the sound data 98 include voice of the commentator, voice of a player, cheering, and singing voice added to each virtual viewpoint video 30. The sound data 98 may be provided with sound included in the captured video 34 used for generating the virtual viewpoint video 30 as it is, or may be added to the virtual viewpoint video 30 after the generation.

The video reproduction unit 28 may generate the recommendation data 32 in which the thumbnail image 62E and/or the viewpoint related information 58 is displayed on the user device 12 in an order determined on the basis of the presence or absence of the sound data 98 added to each virtual viewpoint video 30. In the example shown in FIG. 39, the video reproduction unit 28 rearranges the virtual viewpoint videos 30 in the generated video list 60 such that the virtual viewpoint video 30 having the sound data 98 is located higher than the virtual viewpoint video 30 not having the sound data 98, and stores the generated video list 60 after the rearrangement as the recommended video list 66. The video reproduction unit 28 creates the recommendation data 32 according to the generated recommended video list 66. The sound data 98 is an example of "sound data" according to the technology of the present disclosure.

According to the configuration shown in FIG. 39, compared with a case where the recommendation data 32 includes the information regarding the virtual viewpoint video 30 randomly selected, the user can easily select the virtual viewpoint video 30 intended by the user on the basis of the presence or absence of the sound data 98 added to each virtual viewpoint video 30.

In the first and second embodiments described above, a form example in which a single virtual viewpoint video 30 is reproduced on the user device 12 in response to the reproduction instruction 72 transmitted from the user device 12 through an operation of a user has been described, but the technology of the present disclosure is not limited to this. Hereinafter, a form example in which a plurality of virtual viewpoint videos 30 are reproduced on the user device 12 in response to the reproduction instruction 72 transmitted from the user device 12 will be described with reference to FIGS. 40 to 44.

Figure 40:
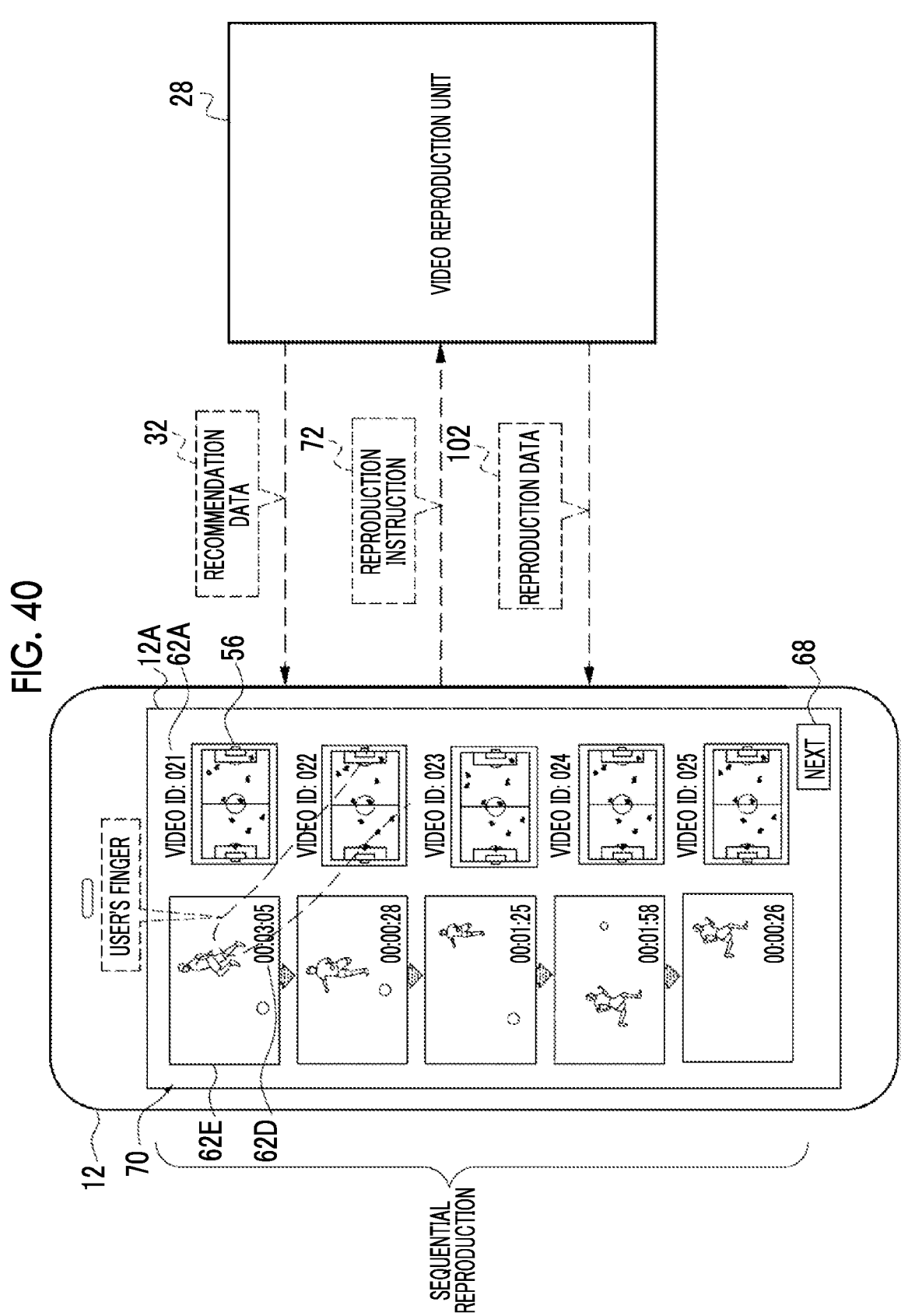
FIG. 40 is a conceptual diagram showing an example of an aspect in which virtual viewpoint videos are sequentially reproduced.

As shown in FIG. 40 as an example, the video reproduction unit 28 generates the recommendation data 32 in any of the form examples described above, and transmits the generated recommendation data 32 to the user device 12. The user device 12 receives the recommendation data 32 and displays the received recommendation data 32 on the touch panel display 12A as the recommendation screen 70.

In a case where the user touches the thumbnail image 62E displayed on the recommendation screen 70, the user device 12 transmits the reproduction instruction 72 to the video reproduction unit 28. In a case where the reproduction instruction 72 is received from the user device 12, the video reproduction unit 28 may read out, from the database 22, the five virtual viewpoint videos 30 having the information displayed on the recommendation screen 70, and may generate reproduction data 102 in which the readout five virtual viewpoint videos 30 are sequentially reproduced by the user device 12. The video reproduction unit 28 transmits the generated reproduction data 102 to the user device 12. The user device 12 receives the reproduction data 102 and reproduces the received reproduction data 102 on the touch panel display 12A. The reproduction data 102 is an example of "second data" according to the technology of the present disclosure.

"The five virtual viewpoint videos 30 being sequentially reproduced on the user device 12" may mean that reproduction of the next virtual viewpoint video 30 may be started immediately after the reproduction of one virtual viewpoint video 30 is ended, or reproduction of the next virtual viewpoint video 30 may be started before the reproduction of one virtual viewpoint video 30 is ended. Reproduction of the next virtual viewpoint video 30 may be started after a predetermined time has elapsed from the end of the reproduction of one virtual viewpoint video 30. The five virtual viewpoint videos 30 may be repeatedly reproduced until a stop instruction is transmitted from the user device 12 through an operation of the user.

According to the configuration shown in FIG. 40, it is possible to save the user the trouble of performing a reproduction operation of the virtual viewpoint video 30. In the configuration shown in FIG. 40, all of the five virtual viewpoint videos 30 having the information displayed on the recommendation screen 70 are sequentially reproduced on the user device 12, but the technology of the present disclosure is not limited to this, and two or more of the five virtual viewpoint videos 30 may be sequentially reproduced on the user device 12.

Figure 41:
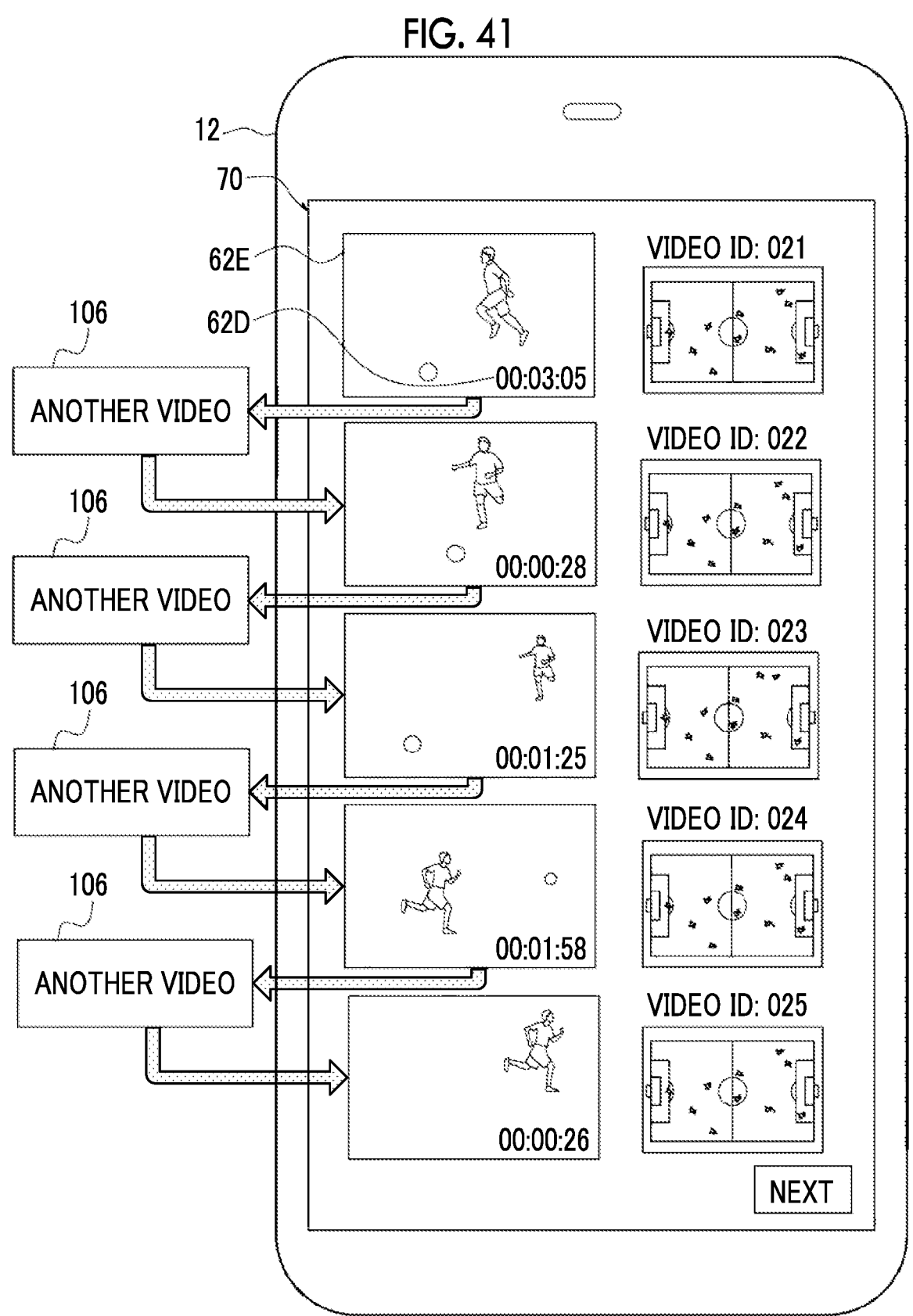
FIG. 41 is a conceptual diagram showing an example of an aspect in which another video is inserted between the virtual viewpoint videos in a case where the virtual viewpoint videos are sequentially reproduced.

In the example shown in FIG. 40, an aspect in which the video reproduction unit 28 generates the reproduction data 102 in which the five virtual viewpoint videos 30 are sequentially reproduced on the user device 12 has been described, but the technology of the present disclosure is not limited to this. As an example, as shown in FIG. 41, the video reproduction unit 28 may generate the reproduction data 102 in which another video 106 is reproduced on the user device 12 each time reproduction of each of the plurality of virtual viewpoint videos 30 sequentially reproduced on the user device 12 is ended. The video 106 is an example of a "first image" according to the technology of the present disclosure.

The video 106 may be the virtual viewpoint video 30 or the captured video 34. Alternatively, the video 106 may be a video different from the virtual viewpoint video 30 or the captured video 34. In the example shown in FIG. 41, the video 106 is reproduced on the user device 12 each time the reproduction of each of the five virtual viewpoint videos 30 is ended. However, the technology of the present disclosure is not limited to this, and the video 106 may be reproduced between reproductions of at least two virtual viewpoint videos 30. Examples of the video 106 include a replay video or a digest video of the virtual viewpoint video 30 that is reproduced immediately before the video 106 is reproduced.

According to the configuration shown in FIG. 41, compared with a case where only the virtual viewpoint videos 30 having the information displayed on the recommendation screen 70 are sequentially reproduced, the user is allowed to view another video 106 regardless of the intention of the user.

Figure 42:
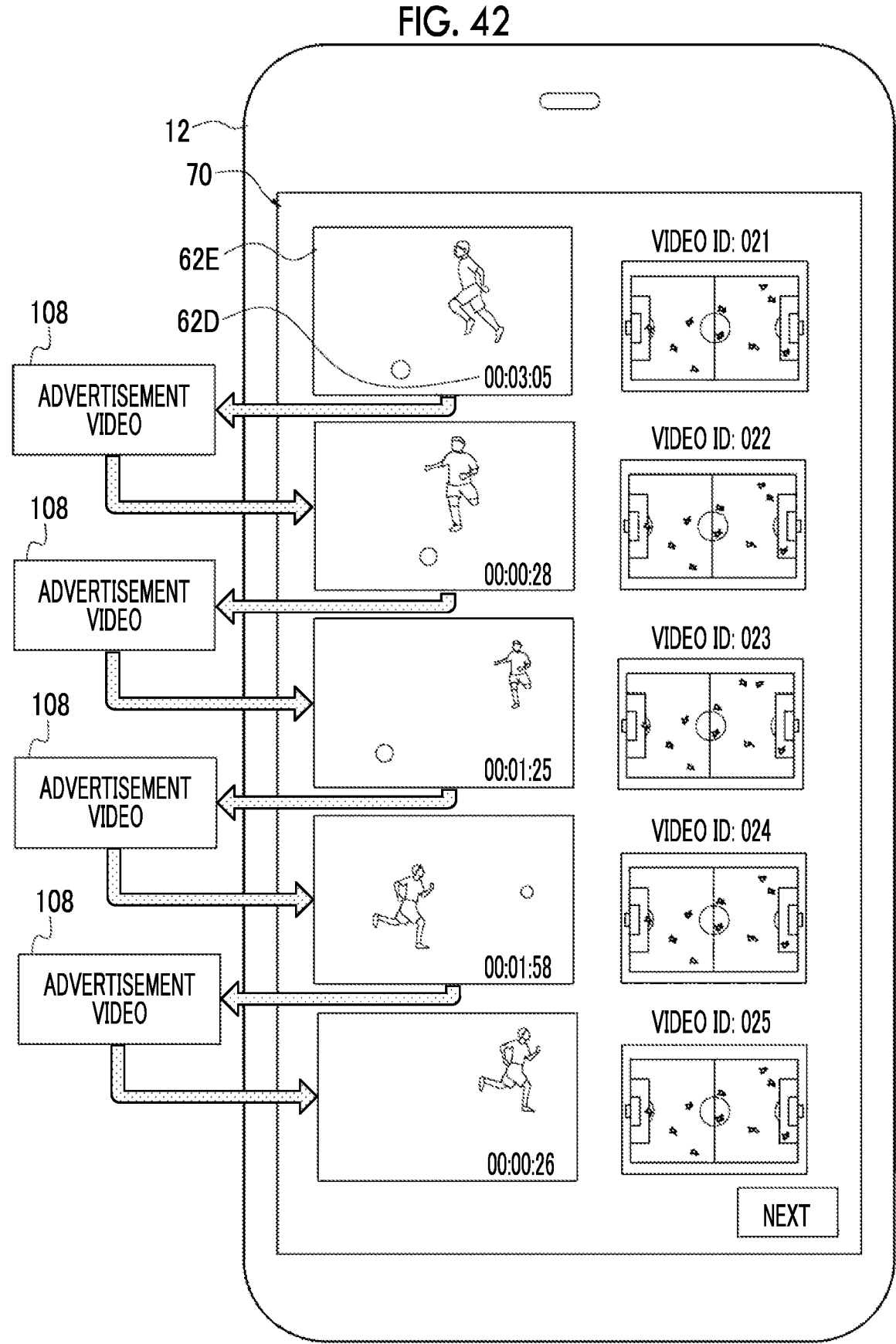
FIG. 42 is a conceptual diagram showing an example of an aspect in which an advertisement video is inserted between virtual viewpoint videos in a case where the virtual viewpoint videos are sequentially reproduced.

In the example shown in FIG. 41, an aspect in which the video reproduction unit 28 generates the reproduction data 102 in which another video 106 is reproduced on the user device 12 each time reproduction of each virtual viewpoint video 30 is ended has been described, but the technology of the present disclosure is not limited to this. As an example, as shown in FIG. 42, the video reproduction unit 28 may generate the reproduction data 102 in which, each time reproduction of each of the virtual viewpoint videos 30 is ended, an advertisement video 108 that is a condition for reproducing the next virtual viewpoint video 30 is reproduced on the user device 12. The advertisement video 108 is an example of a "second image" according to the technology of the present disclosure.

Figure 43:
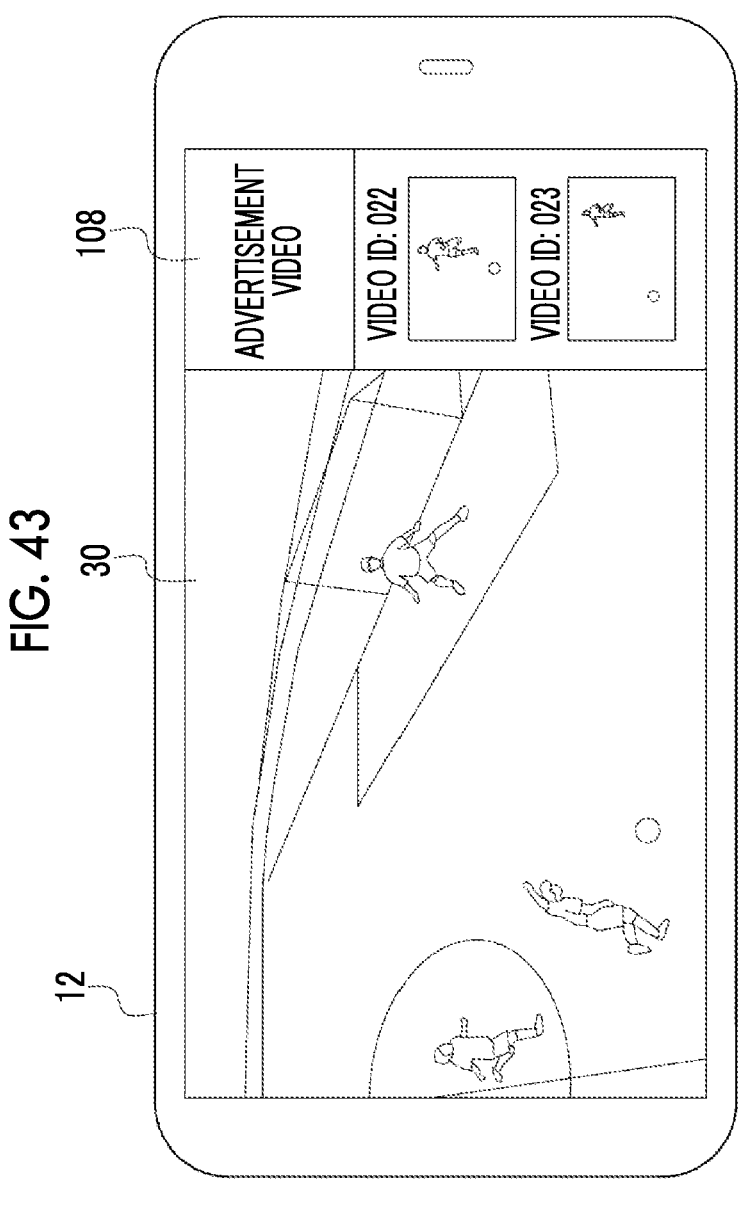
FIG. 43 is a conceptual diagram showing an example of an aspect in which an advertisement video is displayed during reproduction of a virtual viewpoint video.

According to the configuration shown in FIG. 42, the effect of the advertisement can be obtained compared with a case where only the virtual viewpoint videos 30 having the information displayed on the recommendation screen 70 are sequentially reproduced. In the example shown in FIG. 42, the advertisement video 108 is reproduced on the user device 12 each time the reproduction of each virtual viewpoint video 30 is ended. However, the technology of the present disclosure is not limited to this, and a questionnaire image requesting the user using the user device 12 to answer the questionnaire may be reproduced. In the example shown in FIG. 42, the advertisement video 108 is reproduced on the user device 12 each time reproduction of each virtual viewpoint video 30 ends, but the technology of the present disclosure is not limited to this. As an example, as shown in FIG. 43, the advertisement video 108 may be reproduced on the user device 12 during the reproduction of the virtual viewpoint video 30.

In the example shown in FIG. 42, the video reproduction unit 28 generates the reproduction data 102 in which an identical advertisement video 108 is reproduced on the user device 12 each time reproduction of each virtual viewpoint video 30 is ended, but the technology of the present disclosure is not limited to this. The video reproduction unit 28 may generate the reproduction data 102 in which the advertisement video 108 that is a condition for reproducing the virtual viewpoint video 30 is reproduced on the user device 12 on the basis of advertisement information 110 regarding details of the advertisement video 108 transmitted to the user device 12. The advertisement information 110 is an example of "image information" according to the technology of the present disclosure.

As shown in FIG. 44 as an example, in the reproduced video list 64 corresponding to the account of the user A, advertisement information 110 indicating details of an advertisement displayed on the user device 12 after or during the reproduction of each virtual viewpoint video 30 is recorded. The video reproduction unit 28 reads out the advertisement information 110 from the reproduced video list 64, and in a case where an identical advertisement video is continuously reproduced a predetermined number of times (for example, several times) or more, generates the reproduction data 102 in which another advertisement video is reproduced on the user device 12. In the example shown in FIG. 44, a first advertisement video is continuously reproduced three times after or during reproduction of the virtual viewpoint videos 30 having the video IDs 62A of "021", "022", and "023". Therefore, the video reproduction unit 28 generates the reproduction data 102 in which the first advertisement video is switched to a second advertisement video and the second advertisement video is reproduced on the user device 12. The first advertisement video is an example of a "second image" according to the technology of the present disclosure, and the second advertisement video is an example of a "third image" according to the technology of the present disclosure.

According to the configuration shown in FIG. 44, the effect of an advertisement can be further improved compared with a case where only the first advertisement video is repeatedly reproduced on the user device 12.

In the configurations shown in FIGS. 40 to 44, a form example in which the video reproduction unit 28 generates reproduction data 102 in which all of the plurality of virtual viewpoint videos 30 are reproduced on the user device 12, but the technology of the present disclosure is not limited to this. Hereinafter, a form example will be described in which, in response to an instruction transmitted from the user device 12, the virtual viewpoint video 30 that is being reproduced on the user device 12 is switched to another virtual viewpoint video 30 with reference to FIGS. 45 to 49.

Figure 45:
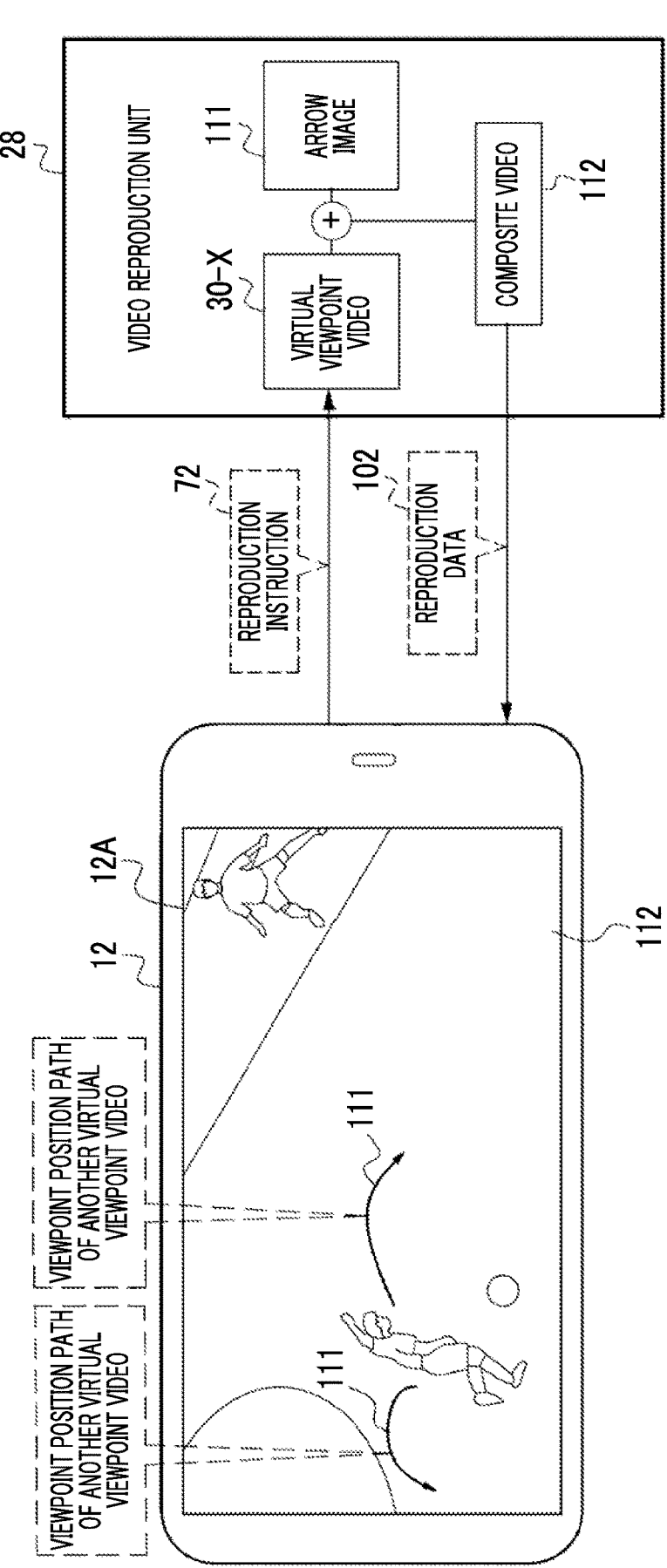
FIG. 45 is a conceptual diagram showing an example of an aspect in which a composite video is displayed on a user device.

As shown in FIG. 45 as an example, in a case where the user touches the thumbnail image 62E displayed on the recommendation screen (refer to FIG. 10), the user device 12 transmits the reproduction instruction 72 to the video reproduction unit 28. The video reproduction unit 28 generates a composite video 112 in which an arrow image 111 indicating the viewpoint position path 58D related to other virtual viewpoint videos 30-Y and 30-Z is combined with a virtual viewpoint video 30-X selected in accordance with the reproduction instruction 72 given from the user device 12 among the plurality of virtual viewpoint videos 30. The video reproduction unit 28 generates the reproduction data 102 in which the composite video 112 is reproduced on the user device 12, and transmits the generated reproduction data 102 to the user device 12. The user device 12 reproduces the reproduction data 102 on the touch panel display 12A. The composite video 112 is an example of a "composite image" according to the technology of the present disclosure.

Figure 46:
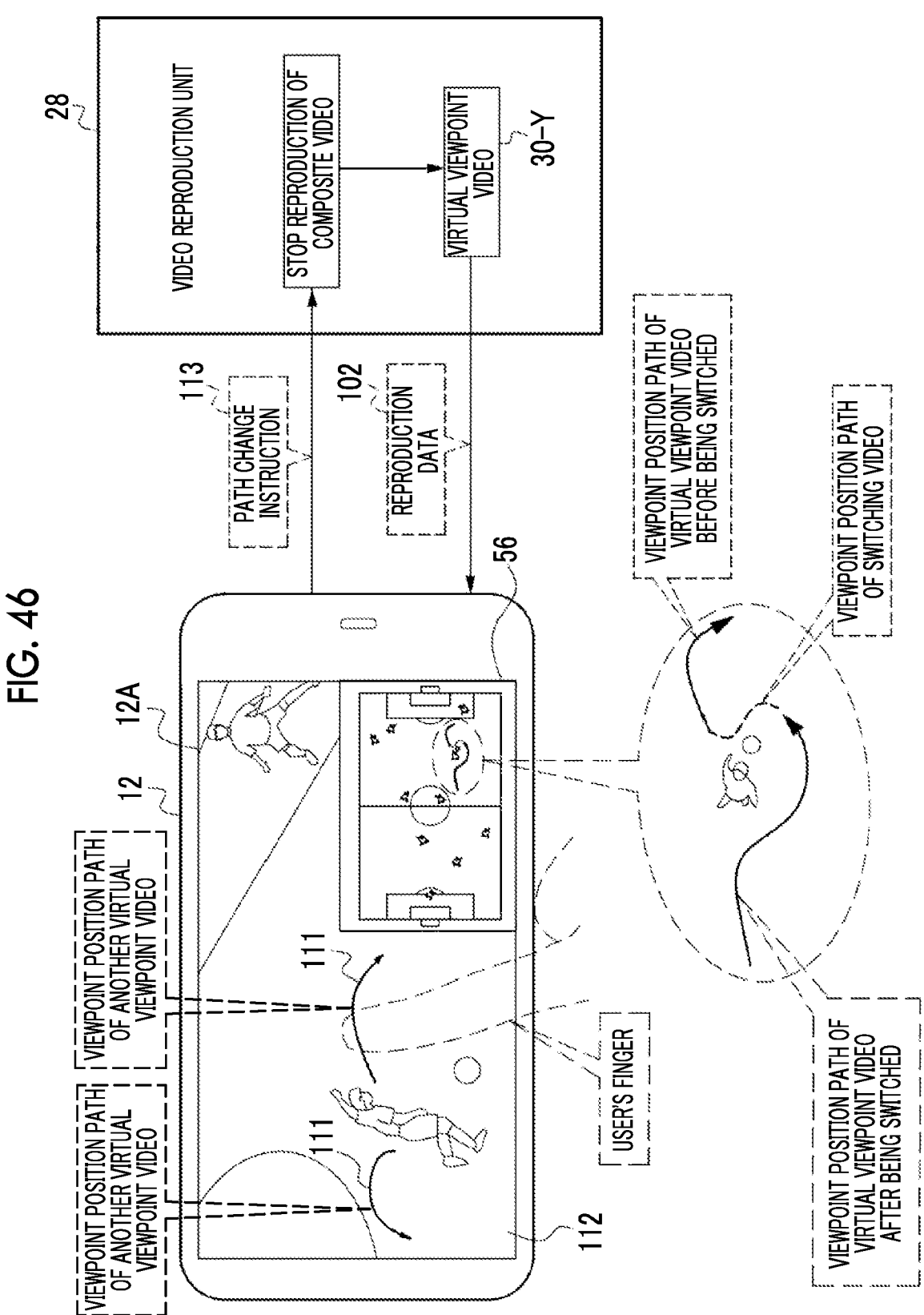
FIG. 46 is a conceptual diagram showing an example of an aspect in which a virtual viewpoint video displayed on the user device is changed to a virtual viewpoint video having another viewpoint position path on the basis of a path change instruction.

As shown in FIG. 46 as an example, in a case where the user touches the arrow image 111 indicating the viewpoint position path 58D of the virtual viewpoint video 30-Y with a finger, a stylus pen, or the like, the user device 12 transmits a path change instruction 113 to the video reproduction unit 28. In a case where the video reproduction unit 28 receives the path change instruction 113 from the user device 12, the video reproduction unit 28 stops the reproduction of the composite video 112, and generates the reproduction data 102 in which the virtual viewpoint video 30-Y corresponding to the viewpoint position path 58D included in the path change instruction 113 is reproduced on the user device 12. The video reproduction unit 28 transmits the generated reproduction data 102 to the user device 12. The user device 12 receives the reproduction data 102 and reproduces the received reproduction data 102 on the touch panel display 12A. The path change instruction is an example of a "path change instruction" according to the technology of the present disclosure.

Consequently, the composite video 112 based on the virtual viewpoint video 30-X that is being reproduced on the user device 12 is switched to the virtual viewpoint video 30-Y. At the switching timing, the bird's-eye view image 56 on which a form of the viewpoint position paths 58D related to the virtual viewpoint videos 30-X and 30-Y is superimposed is displayed in the lower right of the touch panel display 12A. The viewpoint position path 58D of the switching video that smoothly switches from the viewpoint position path 58D of the virtual viewpoint video 30-X that is being reproduced on the touch panel display 12A to the viewpoint position path 58D of the virtual viewpoint video 30-Y may be displayed to be superimposed on the bird's-eye view image 56.

The switching video is the virtual viewpoint video 30 generated by the video generation unit 26 on the basis of the viewpoint position path 58D of the virtual viewpoint video 30-X and the viewpoint position path 58D of the virtual viewpoint video 30-Y. In this case, the video reproduction unit 28 generates the reproduction data 102 in which the composite video 112, the switching video, and the virtual viewpoint video 30-Y are reproduced in this order on the user device 12.

According to the configuration shown in FIG. 45, the video reproduction unit 28 generates the reproduction data 102 in which the composite video 112 is reproduced, so that the virtual viewpoint video 30-X that is being reproduced can be switched to another virtual viewpoint video 30-Y. According to the configuration shown in FIG. 46, the user can easily select the virtual viewpoint video 30 intended by the user, compared with a case where the virtual viewpoint video 30 that is being reproduced cannot be switched to another virtual viewpoint video 30. In the example shown in FIG. 45, the arrow image 111 indicating the viewpoint position path 58D is combined with the composite video 112, but the technology of the present disclosure is not limited to this, an arrow image indicating the gaze point path may be combined instead of the viewpoint position path 58D. In this case, the path change instruction is not a change instruction for the viewpoint position path 58D but a change instruction for the gaze point path.

According to the configurations shown in FIGS. 45 and 46, the virtual viewpoint video 30 that is being reproduced on the user device 12 is switched to another virtual viewpoint video 30 that has already been generated, but the technology of the present disclosure is not limited to this. The virtual viewpoint video 30 that is being reproduced on the user device 12 may be switched to the new virtual viewpoint video 30 generated in response to an instruction for the virtual viewpoint video 30 that is being reproduced.

Figure 47:
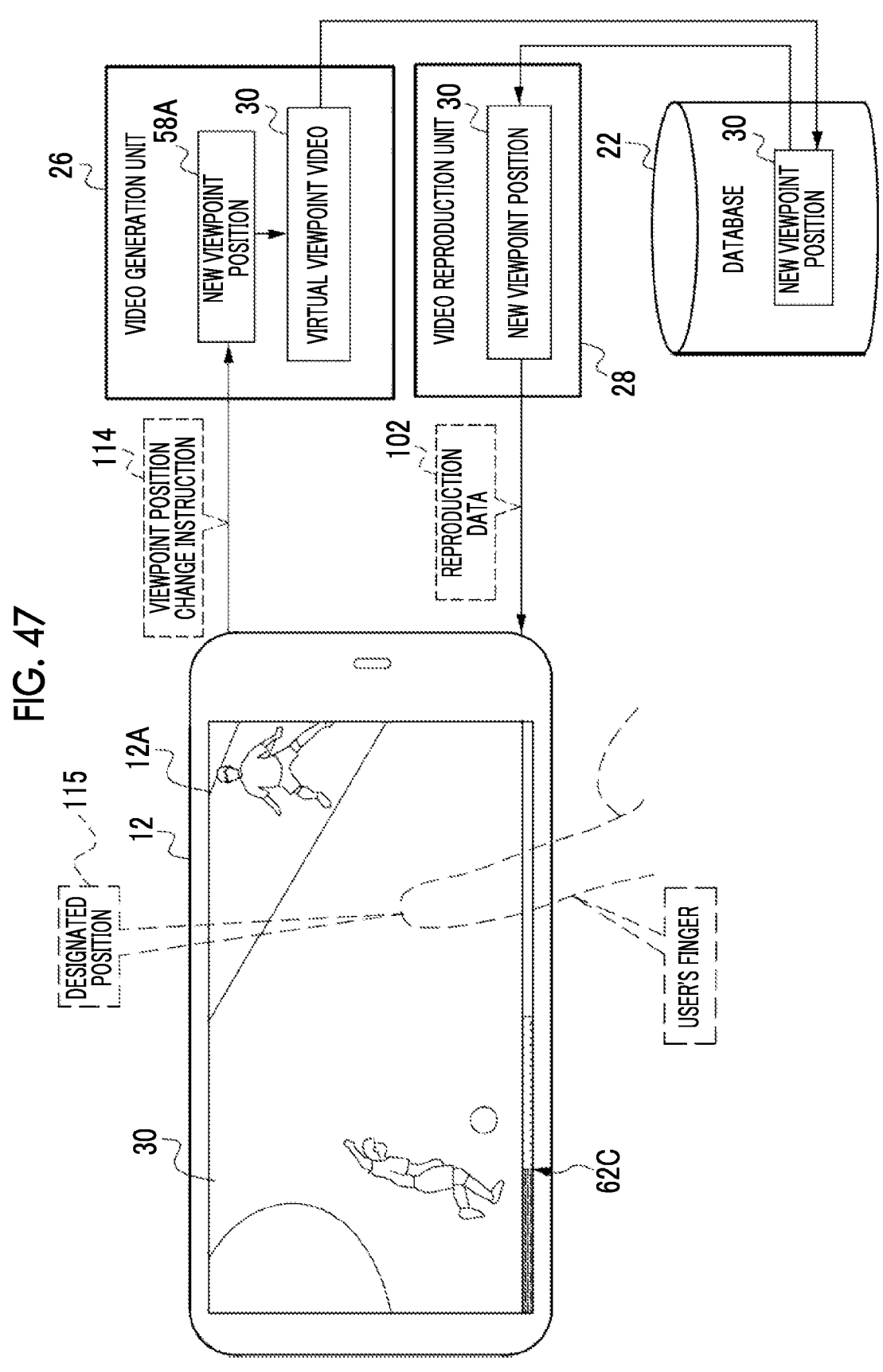
FIG. 47 is a conceptual diagram showing an example of an aspect in which a viewpoint position of a virtual viewpoint video displayed on the user device is changed on the basis of a viewpoint position change instruction.

As shown in FIG. 47 as an example, in a case where the video generation unit 26 receives the viewpoint position change instruction 114 for the viewpoint position 58A of the virtual viewpoint video 30 that is being reproduced on the user device 12 from the user device 12, the new virtual viewpoint video 30 may be generated on the basis of the new viewpoint position 58A derived on the basis of the received viewpoint position change instruction 114. The video reproduction unit 28 may generate the reproduction data 102 in which the new virtual viewpoint video 30 generated by the video generation unit 26 is reproduced on the user device 12, and transmit the generated reproduction data 102 to the user device 12. The viewpoint position change instruction 114 is an example of a "change instruction for viewpoint related information" according to the technology of the present disclosure.

In the example shown in FIG. 47, in a case where the user designates any position (hereinafter, referred to as a "designated position") 115 of the touch panel display 12A with a finger, a stylus pen, or the like during reproduction of the virtual viewpoint video 30, the user device 12 transmits the viewpoint position change instruction 114 to the video generation unit 26. The viewpoint position change instruction 114 includes the game elapsed time 62C corresponding to a timing at which the viewpoint position change instruction 114 is received in the virtual viewpoint video 30 that is being reproduced, and coordinates of the designated position 115 for an image included in the virtual viewpoint video 30 that is being reproduced and having a frame corresponding to the timing at which the viewpoint position change instruction 114 is received.

The video generation unit 26 receives the viewpoint position change instruction 114 from the user device 12. The video generation unit 26 derives a new viewpoint position 58A in the soccer field on the basis of the coordinates of the designated position 115 included in the viewpoint position change instruction 114. The video generation unit 26 uses the captured video 34 corresponding to the game elapsed time 62C included in the viewpoint position change instruction 114 on the basis of the derived new viewpoint position 58A, to generate the new virtual viewpoint video 30 after the game elapsed time 62C. The video generation unit 26 stores the generated virtual viewpoint video 30 in the database 22.

The video reproduction unit 28 reads out the new virtual viewpoint video 30 from the database 22 and generates reproduction data 102 in which the new virtual viewpoint video 30 is reproduced on the user device 12. The video reproduction unit 28 transmits the generated reproduction data 102 to the user device 12. The user device 12 receives the reproduction data 102 and reproduces the received reproduction data 102 on the touch panel display 12A. Therefore, in the user device 12, the virtual viewpoint video 30 that is being reproduced on the touch panel display 12A is switched to the new virtual viewpoint video 30 generated on the basis of the viewpoint position change instruction 114.

According to the configuration shown in FIG. 47, the user can change the viewpoint position 58A of the virtual viewpoint video 30 that is being viewed. In the example shown in FIG. 47, the viewpoint position 58A of the virtual viewpoint video 30 is changed by the user designating any position of the touch panel display 12A during reproduction of the virtual viewpoint video 30, but the technology of the present disclosure is not limited to this. The visual line direction 58B, the angle of view 58C, the gaze point 58E, or the like may be changed.

According to the configuration shown in FIG. 47, the new viewpoint position 58A is derived on the basis of the designated position 115 given to the touch panel display 12A by the user, but the technology of the present disclosure is not limited to this. The new viewpoint position path 58D may be determined on the basis of the viewpoint position path 58D of the virtual viewpoint video 30 that is being reproduced.

Figure 48:
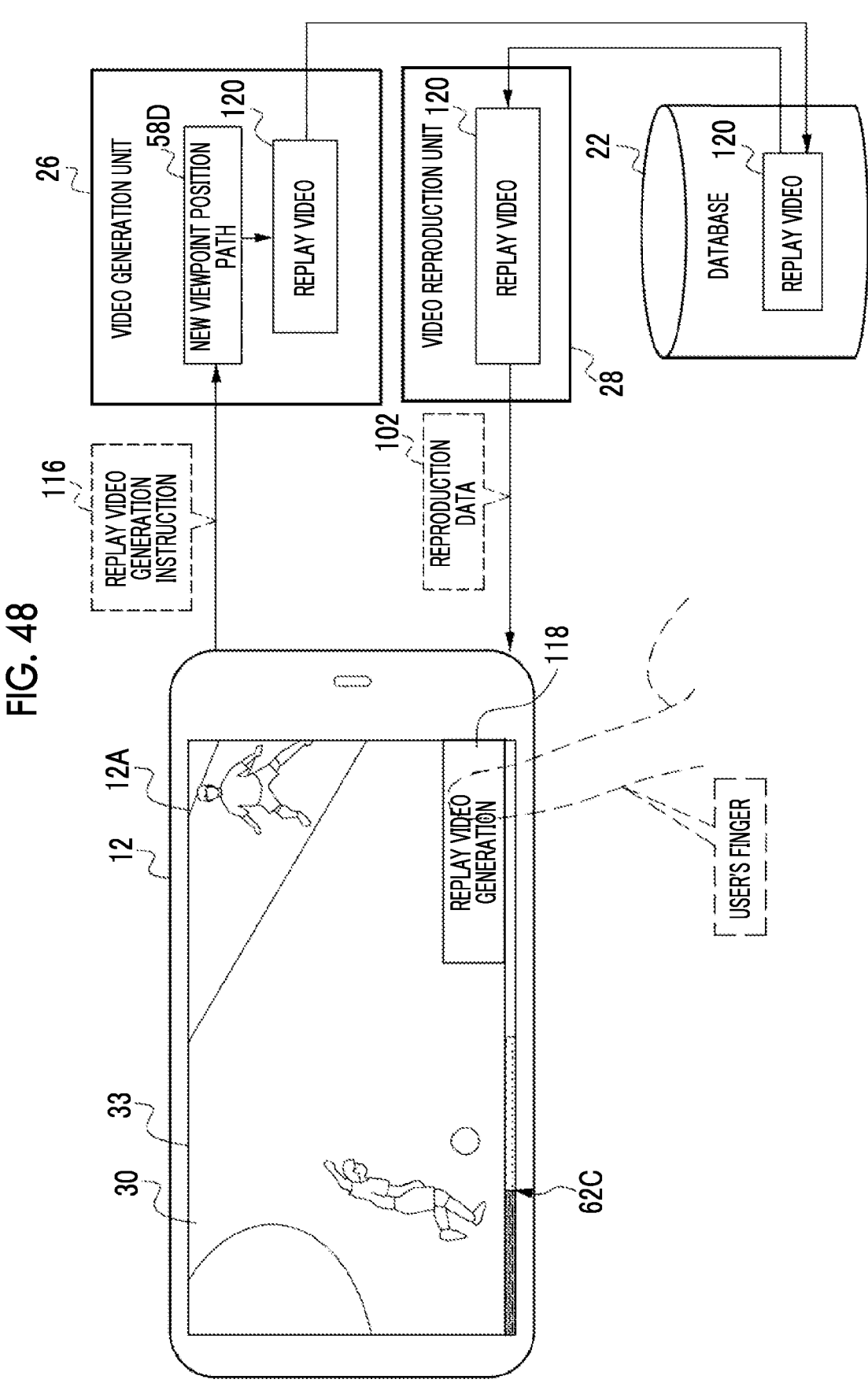
FIG. 48 is a conceptual diagram showing an example of an aspect in which a replay video is reproduced on the basis of a replay video generation instruction.

As shown in FIG. 48 as an example, in a case where the video generation unit 26 receives a replay video generation instruction 116 for the virtual viewpoint video 30 that is being reproduced on the user device 12 from the user device 12, the video generation unit 26 may generate a replay video 120 on the basis of the viewpoint related information 58 based on the viewpoint related information 58 regarding the virtual viewpoint video 30 that is being reproduced. The video reproduction unit 28 may generate the reproduction data 102 in which the replay video 120 generated by the video generation unit 26 is reproduced on the user device 12, and transmit the generated reproduction data 102 to the user device 12. The replay video generation instruction 116 is an example of a "replay image generation instruction" according to the technology of the present disclosure.

In the example shown in FIG. 48, a replay video generation button 118 is provided at the lower right of the video reproduction screen 33 in which the virtual viewpoint video 30 is reproduced on the touch panel display 12A. In a case where the user touches the replay video generation button 118 provided on the video reproduction screen 33 in which the virtual viewpoint video 30 is being reproduced with a finger, a stylus pen, or the like, the user device 12 transmits the replay video generation instruction 116 to the video generation unit 26. The replay video generation instruction 116 includes the game elapsed time 62C corresponding to a timing at which the replay video generation instruction 116 is received in the virtual viewpoint video 30 that is being reproduced, and the viewpoint position path 58D and the gaze point 58E related to the virtual viewpoint video 30 that is being reproduced.

The video generation unit 26 receives the replay video generation instruction 116 from the user device 12. The video generation unit 26 determines the new viewpoint position path 58D different from the viewpoint position path 58D related to the virtual viewpoint video 30 that is being reproduced, on the basis of the viewpoint position path 58D included in the replay video generation instruction 116. The video generation unit 26 generates the replay video 120 that is a new virtual viewpoint video by using the captured video 34 captured between a few seconds to a few tens of seconds before the game elapsed time 62C included in the viewpoint position change instruction 114 and the game elapsed time 62C on the basis of the determined new viewpoint position path 58D and the gaze point 58E identical to the gaze point 58E included in the replay video generation instruction 116. The video generation unit 26 stores the generated replay video 120 in the database 22.

The video reproduction unit 28 reads out the replay video 120 from the database 22 and generates the reproduction data 102 in which the replay video 120 is reproduced on the user device 12. The video reproduction unit 28 transmits the generated reproduction data 102 to the user device 12. The user device 12 receives the reproduction data 102 and reproduces the received reproduction data 102 on the touch panel display 12A. Therefore, in the user device 12, the virtual viewpoint video 30 that is being reproduced on the touch panel display 12A is switched to the replay video 120.

According to the configuration shown in FIG. 48, the user can watch the replay video 120 of the virtual viewpoint video 30 being viewed.

Figure 49:
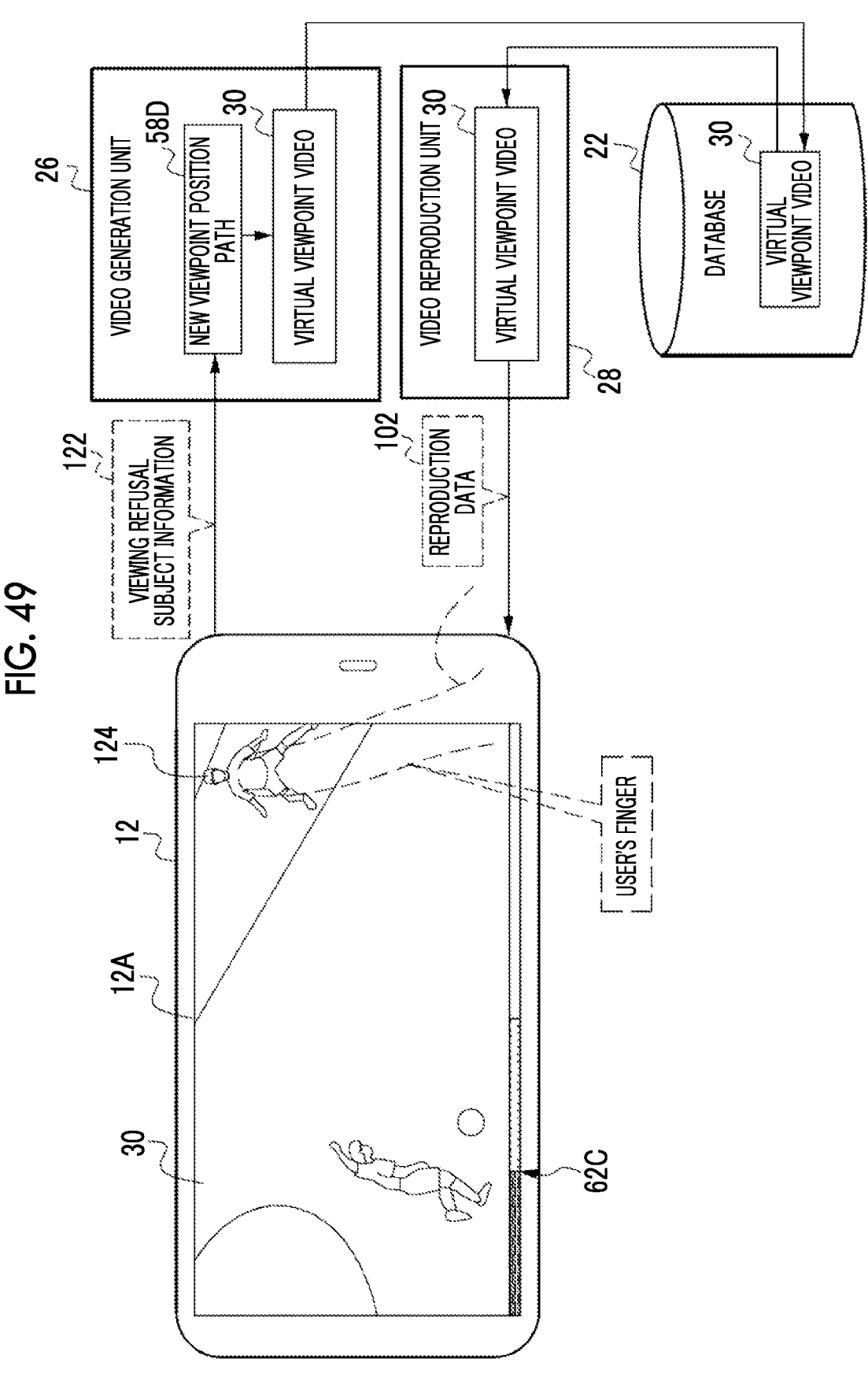
FIG. 49 is a conceptual diagram showing an example of an aspect in which a virtual viewpoint video generated on the basis of a new viewpoint position path corresponding to viewing refusal subject information is reproduced.

As shown in FIG. 49 as an example, in a case where the video generation unit 26 receives, from the user device 12, viewing refusal subject information 122 regarding a subject of which viewing is refused in the virtual viewpoint video 30 that is being reproduced on the user device 12, the new virtual viewpoint video 30 may be generated on the basis of the viewpoint related information 58 based on the viewing refusal subject information 122. The video reproduction unit 28 may generate the reproduction data 102 in which the new virtual viewpoint video 30 generated by the video generation unit 26 is reproduced on the user device 12, and transmit the generated reproduction data 102 to the user device 12. The viewing refusal subject information 122 is an example of "viewing refusal subject information" according to the technology of the present disclosure.

In the example shown in FIG. 49, in a case where the user touches an object image 124 indicating a player who the user does not want to view in the virtual viewpoint video 30 that is being reproduced on the touch panel display 12A with a finger, a stylus pen, or the like, the user device 12 transmits the viewing refusal subject information 122 to the video generation unit 26. The viewing refusal subject information 122 includes the object image 124, the game elapsed time 62C corresponding to a timing at which the viewing refusal subject information 122 is received in the virtual viewpoint video 30 that is being reproduced, and the gaze point 58E regarding the virtual viewpoint video 30 that is being reproduced.

The video generation unit 26 receives the viewing refusal subject information 122 from the user device 12. The video generation unit 26 specifies a player captured in the object image 124 by using a well-known image recognition technology or the like on the basis of the object image 124 included in the viewing refusal subject information 122. The video generation unit 26 determines the viewpoint related information 58 in which the virtual viewpoint video 30 in which the specified player is not captured is generated. In this case, the viewpoint related information 58 to be determined has the gaze point 58E identical to the gaze point 58E included in the viewing refusal subject information 122, and has the viewpoint position path 58D different from that of the virtual viewpoint video 30 that is being reproduced.

The video generation unit 26 generates the virtual viewpoint video 30 by using the captured video 34 captured after the game elapsed time 62C included in the viewing refusal subject information 122 on the basis of the determined viewpoint related information 58. The video generation unit 26 stores the generated virtual viewpoint video 30 in the database 22.

The video reproduction unit 28 reads out the virtual viewpoint video 30 from the database 22 and generates the reproduction data 102 in which the virtual viewpoint video 30 is reproduced on the user device 12. The video reproduction unit 28 transmits the generated reproduction data 102 to the user device 12. The user device 12 receives the reproduction data 102 and reproduces the received reproduction data 102 on the touch panel display 12A.

According to the configuration shown in FIG. 49, the user can view the virtual viewpoint video 30 that does not include a subject that the user does not want to view. In the example shown in FIG. 49, the object image 124 is an image of a player who the user does not want to view, but the technology of the present disclosure is not limited to this, and the object image 124 may be any object image in the soccer field including an advertising sign, a goal, a line, and the like.

Figure 50:
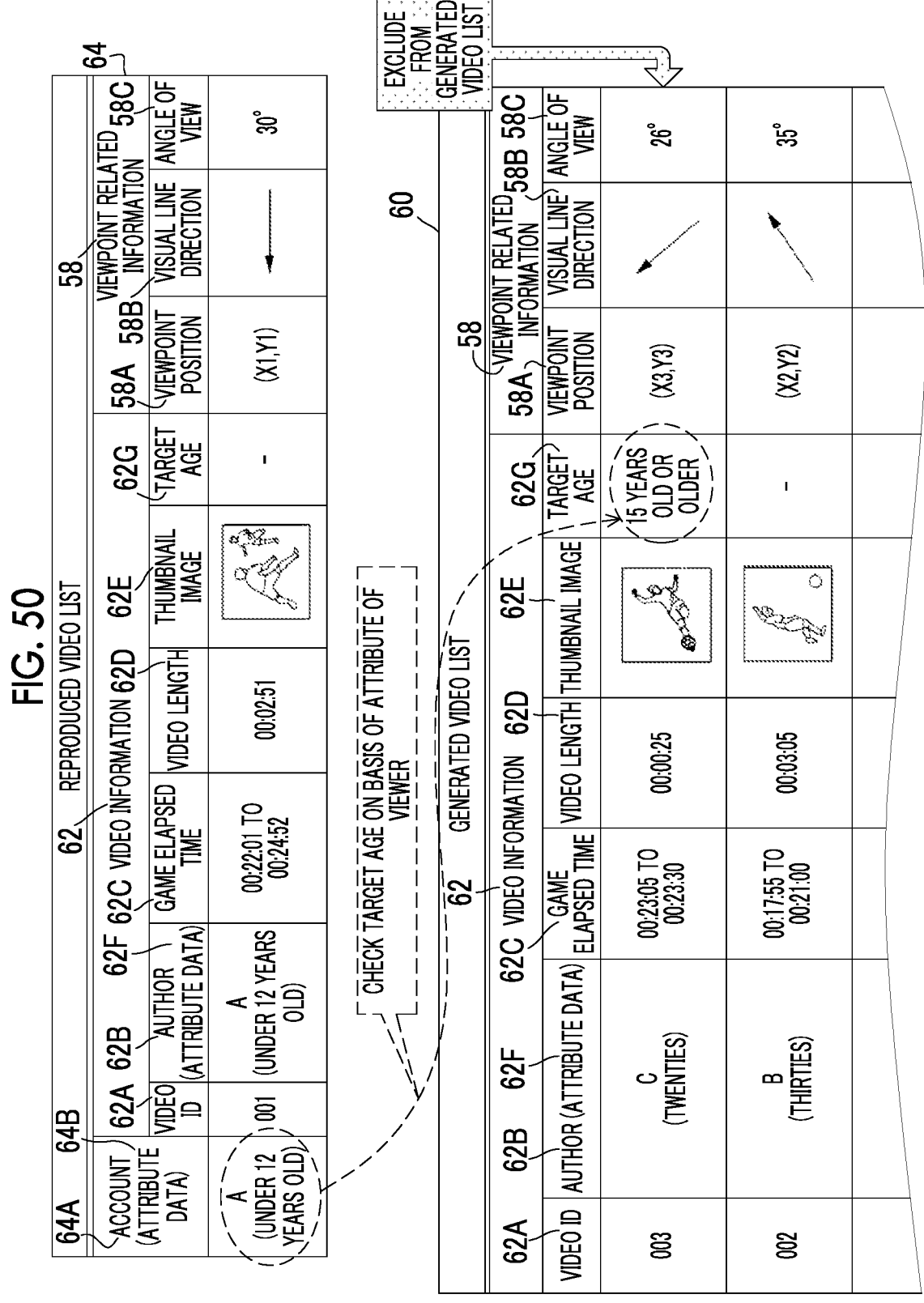
FIG. 50 is a conceptual diagram showing an example of an aspect in which reproduction of a virtual viewpoint video is restricted on the basis of attribute data of a user.

As shown in FIG. 50 as an example, the recommendation data 32 may be data excluding the virtual viewpoint video 30 of which viewing is restricted among the virtual viewpoint videos 30 on the basis of the attribute data 64B registered in association with the account 64A of the user. In the example shown in FIG. 50, the attribute data 64B of "under 12 years old" is registered in association with the account 64A of "A". The video information 62 of the generated video list 60 includes a target age 62G that restricts a user who can view the virtual viewpoint video 30 according to an age of a user.

In a case where the video reproduction request 52 is received from the user device 12 used by the user A, the video reproduction unit 28 excludes, from the recommended video list 66, information regarding the virtual viewpoint video 30 of which viewing by a user under 12 years old is restricted among the virtual viewpoint videos 30 recorded in the generated video list 60 on the basis of the attribute data 64B of "under 12 years old" registered in association with the account 64A of the user A. In the example shown in FIG. 50, in the generated video list 60, the target age 62G of the virtual viewpoint video 30 having the video ID 62A of "003" is "15 years old or older". Therefore, the video reproduction unit 28 performs a process of deleting the virtual viewpoint video 30 having the target age 62G of "15 years old or older" from the generated video list 60, and stores the generated video list 60 after the process in the database 22 as the recommended video list 66.

According to the configuration shown in FIG. 50, the user can easily select the virtual viewpoint video 30 intended by the user, compared with a case where the virtual viewpoint video 30 is not restricted by the attribute data 64B of the user.

Figure 51:
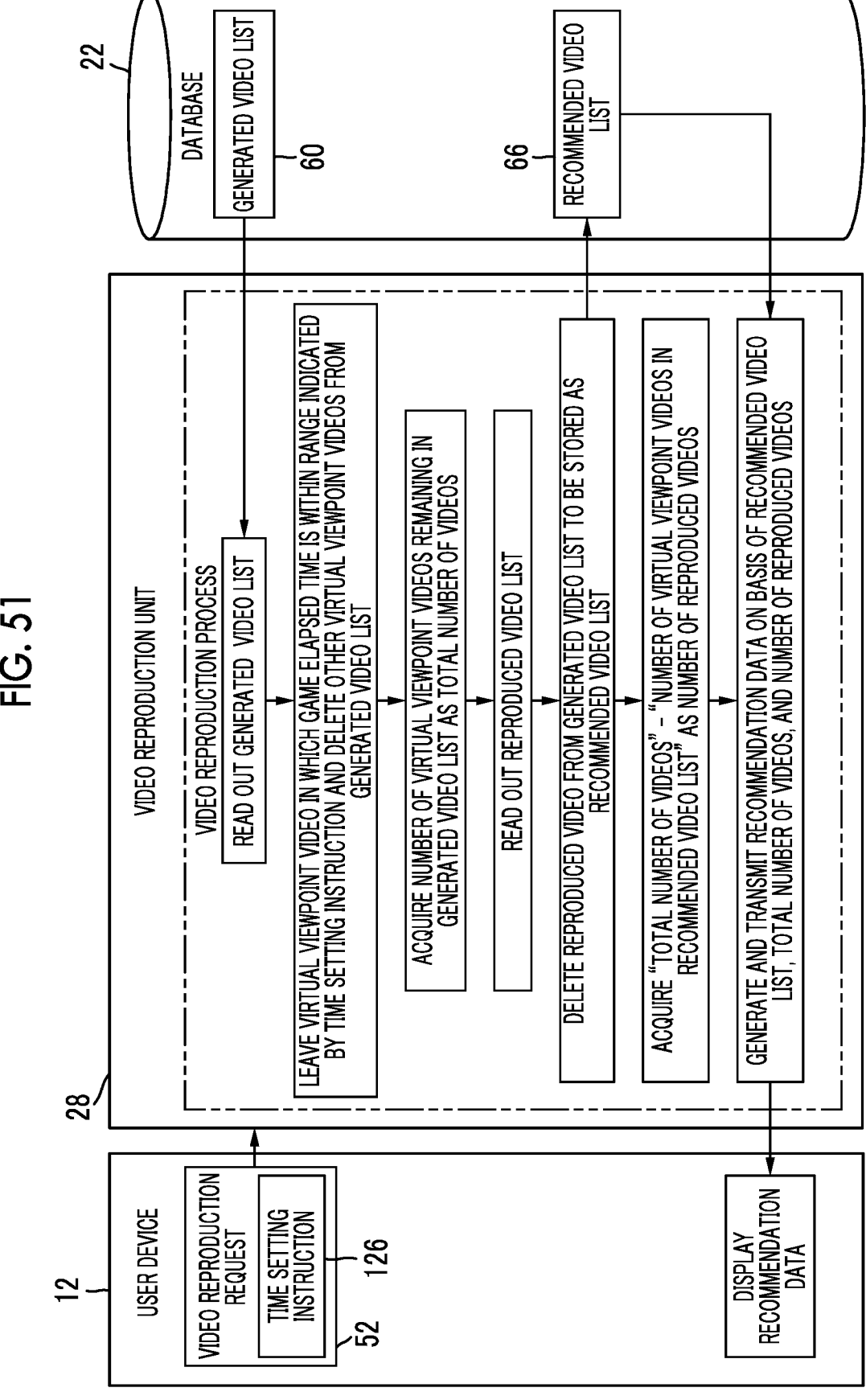
FIG. 51 is a conceptual diagram showing an example of an aspect in which recommendation data is generated on the basis of a time setting instruction.

As shown in FIG. 51 as an example, the video reproduction request 52 transmitted from the user device 12 may include a time setting instruction 126 for the game elapsed time 62C. In a case where the video reproduction request 52 including the time setting instruction 126 is received from the user device 12, the video reproduction unit 28 may generate the recommendation data 32 including information regarding the virtual viewpoint video 30 (hereinafter, also referred to as a "time-limited virtual viewpoint video") in which the game elapsed time 62C is within a range indicated by the time setting instruction 126 among the plurality of virtual viewpoint videos 30. The recommendation data 32 may include the number of time-limited virtual viewpoint videos and the number of virtual viewpoint videos that have already been reproduced on the user device 12 among the time-limited virtual viewpoint videos. The game elapsed time 62C is an example of "third time information" according to the technology of the present disclosure. The time-limited virtual viewpoint video is an example of a "time-limited virtual viewpoint image" according to the technology of the present disclosure.

In a case where the video reproduction request 52 including the time setting instruction 126 is received from the user device 12, the video reproduction unit 28 reads out the generated video list 60 from the database 22. The video reproduction unit 28 leaves a time-limited virtual viewpoint video in which the game elapsed time 62C is within a range indicated by the time setting instruction 126 among the virtual viewpoint videos 30 recorded in the generated video list 60, and deletes other virtual viewpoint videos 30 from the generated video list 60. The video reproduction unit 28 acquires the number of time-limited virtual viewpoint videos remaining in the generated video list 60 as a total number of videos 130 (refer to FIG. 52).

The video reproduction unit 28 reads out the reproduced video list 64 related to the user device 12 that is an output source of the video reproduction request 52 from the database 22. The video reproduction unit 28 deletes the reproduced virtual viewpoint video 30 included in the reproduced video list 64 from the generated video list 60, and stores the generated video list 60 after the deletion as the recommended video list 66 in the database 22. The video reproduction unit 28 acquires a value obtained by subtracting the number of virtual viewpoint videos 30 included in the recommended video list 66 from the total number of videos 130 as the number of reproduced videos 132 (refer to FIG. 52). The video reproduction unit 28 generates the recommendation data 32 on the basis of the recommended video list 66, the total number of videos 130, and the number of reproduced videos 132, and transmits the generated recommendation data 32 to the user device 12.

Figure 52:
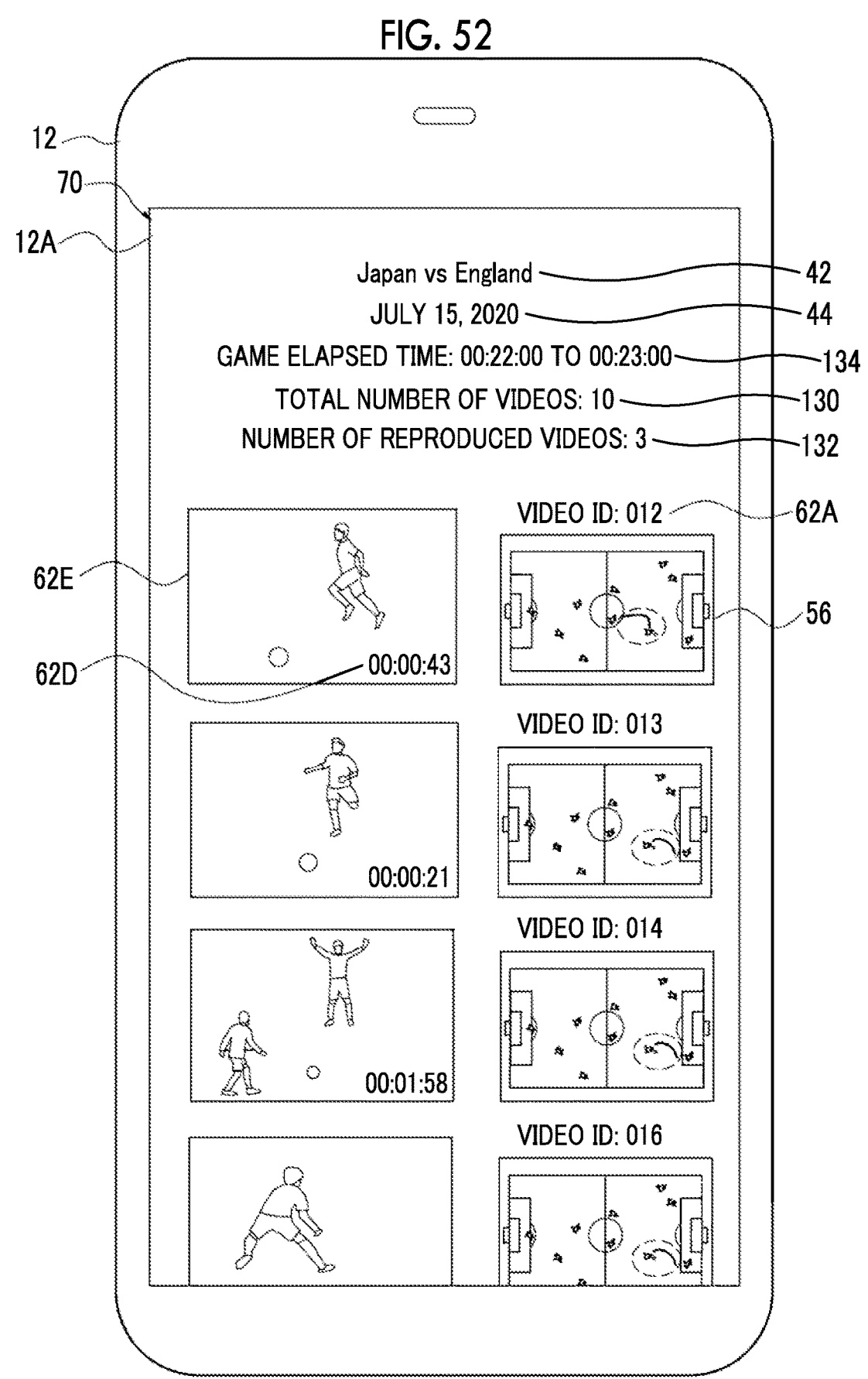
FIG. 52 is a conceptual diagram showing an example of a recommendation screen showing the recommendation data generated on the basis of the time setting instruction.

As shown in FIG. 52 as an example, the user device 12 receives the recommendation data 32 and displays the received recommendation data 32 on the touch panel display 12A as the recommendation screen 70. The recommendation screen 70 includes the time setting information 134 indicating the game elapsed time 62C set by the time setting instruction 126, the total number of videos 130 indicating the number of time-limited virtual viewpoint videos, and the number of reproduced videos 132 among the time-limited virtual viewpoint videos.

According to the configuration shown in FIG. 51, the user can easily select the virtual viewpoint video 30 intended by the user, compared with a case where the time setting instruction 126 is not received. According to the configuration shown in FIG. 52, the user can ascertain the total number of videos 130 and the number of reproduced videos 132.

As shown in FIG. 53 as an example, even in a case where the user stops viewing the virtual viewpoint video 30 that is being reproduced on the user device 12 in the middle, the video reproduction unit 28 may record the virtual viewpoint video 30 of which at least a part has been reproduced on the user device 12 in the reproduced video list 64. Consequently, for example, in a case where the virtual viewpoint video 30 started to be reproduced on the user device 12 is different from the intended one and is thus stopped in the middle, information regarding the virtual viewpoint video 30 stopped in the middle is recorded in the reproduced video list 64. The video reproduction unit 28 refers to the reproduced video list 64 and generates the recommendation data 32 on the basis of the information regarding the virtual viewpoint video 30 of which reproduction is stopped in the middle. In this case, for example, the recommendation data 32 is generated according to a method similar to that of the embodiment on the basis of the information regarding the viewpoint position path 58D to a portion where reproduction of the virtual viewpoint video 30 is stopped in the middle.

According to the configuration shown in FIG. 53, the user can easily select the virtual viewpoint video 30 intended by the user, compared with a case where the reproduced video list 64 includes only the virtual viewpoint video 30 that has been entirely reproduced.

In the example shown in FIG. 53, a form example in which the video reproduction unit 28 determines that in a case where at least a part of the virtual viewpoint video 30 has been reproduced on the user device 12, the virtual viewpoint video 30 has been reproduced has been described, but the technology of the present disclosure is not limited to this. Hereinafter, a form example will be described in which it is determined that the virtual viewpoint video 30 that has been entirely reproduced on the user device 12 is in a reproduced state with reference to FIGS. 54 to 56.

As shown in FIG. 54 as an example, the generated video list 60 includes information regarding five virtual viewpoint videos 30. The five virtual viewpoint videos 30 are videos used for educational purposes, for example, to learn how a fire spreads at a fire site. The video generation unit 26 generates the virtual viewpoint video 30 on the basis of the viewpoint position path 58D created by an administrator of the data processing apparatus 10 by using the captured video 34 obtained by imaging a fire reproduction experiment, and records the video information 62 and the viewpoint related information 58 regarding the generated virtual viewpoint video 30 in the generated video list 60.

In response to a request from the user device 12 accessing the data processing apparatus 10 with each of accounts of viewers A to C, the video reproduction unit 28 transmits the virtual viewpoint video 30 to the user device 12 that is an output source of the request. A reproduction history of the virtual viewpoint video 30 by each user device 12, that is, a viewing history of the virtual viewpoint video 30 by each viewer A, B, or C is recorded in the generated video list 60. The viewer A, the viewer B, and the viewer C are examples of "viewers" according to the technology of the present disclosure. Hereinafter, in a case where it is not necessary to distinguish between the viewer A, the viewer B, and the viewer C, the viewer A, the viewer B, and the viewer C will be collectively referred to as a "viewer".

In the generated video list 60, the viewer data 140 including the viewing data 140A and the number of times of viewing 140B is recorded. The viewer data 140A indicates whether or not each virtual viewpoint video 30 has been viewed by the viewer. The number of times of viewing 140B indicates the number of times each virtual viewpoint video 30 has been viewed by the viewer.

The video reproduction unit 28 can acquire the reproduction history of the virtual viewpoint video 30 to the account associated with the viewer of the virtual viewpoint video 30 as the viewer data 140A. The video reproduction unit 28 can aggregate the number of times each virtual viewpoint video 30 has been reproduced on the user device 12 as the number of times of viewing 140B. The video reproduction unit 28 can output the acquired viewer data 140A and number of times of viewing 140B to an account associated with the administrator of the data processing apparatus 10. The video reproduction unit 28 outputs the viewing data 140 in a table form shown in FIG. 54, for example.

According to the configuration shown in FIG. 54, the administrator of the data processing apparatus 10 can ascertain to which user device 12 the virtual viewpoint video 30 is transmitted in association with the viewpoint related information 58 of the virtual viewpoint video 30.

In the example shown in FIG. 54, the video reproduction unit 28 outputs the viewing data 140 in a table form, but the technology of the present disclosure is not limited to this. The video reproduction unit 28 may output the viewing data 140 in a form of a path image shown in FIG. 55 as an example. In the example shown in FIG. 55, the video reproduction unit 28 generates management data including a three-dimensional image of the fire reproduction experiment, the video ID 62A, the viewpoint position path 58D, and the viewing data 140 regarding each virtual viewpoint video 30. The video reproduction unit 28 transmits the generated management data to a tablet terminal 142 accessing the data processing apparatus 10 with the administrator's account. The tablet terminal 142 receives the management data and displays the received management data on a touch panel display 142A as a management screen 144. The management data is an example of "second data" according to the technology of the present disclosure.

On the management screen 144, a form of the viewpoint position path 58D of each virtual viewpoint video 30 is displayed to be superimposed on the three-dimensional image of the fire reproduction experiment. On the management screen 144, the video ID 62A of the virtual viewpoint video 30 corresponding to each viewpoint position path 58D, the number of times of viewing 140B, and the names of viewers of not viewing each virtual viewpoint video 30 are displayed in association with each viewpoint position path 58D. The form of the viewpoint position path 58D related to the virtual viewpoint video 30 that has been viewed by all the viewers A to C, that is, the form of the viewpoint position path 58D related to the virtual viewpoint video 30 having the number of times of viewing 140B of "three" is displayed on the management screen 144 in a manner distinguishable from the form of the viewpoint position path 58D related to the other virtual viewpoint videos 30.

"The virtual viewpoint video 30 that has been viewed by all the viewers A to C" means that all the viewers A to C have viewed the entire virtual viewpoint video 30, and the viewpoint related to the virtual viewpoint video 30 and means that the viewpoint position path 58D related to the virtual viewpoint video 30 has been viewed from the beginning to the end. In a case where the viewer stops viewing the virtual viewpoint video 30 in the middle of each viewpoint position path 58D, the name of the viewer who stops viewing in the middle and a tag 146 indicating a stop position are displayed in association with the viewpoint position path 58D.

Figure 55:
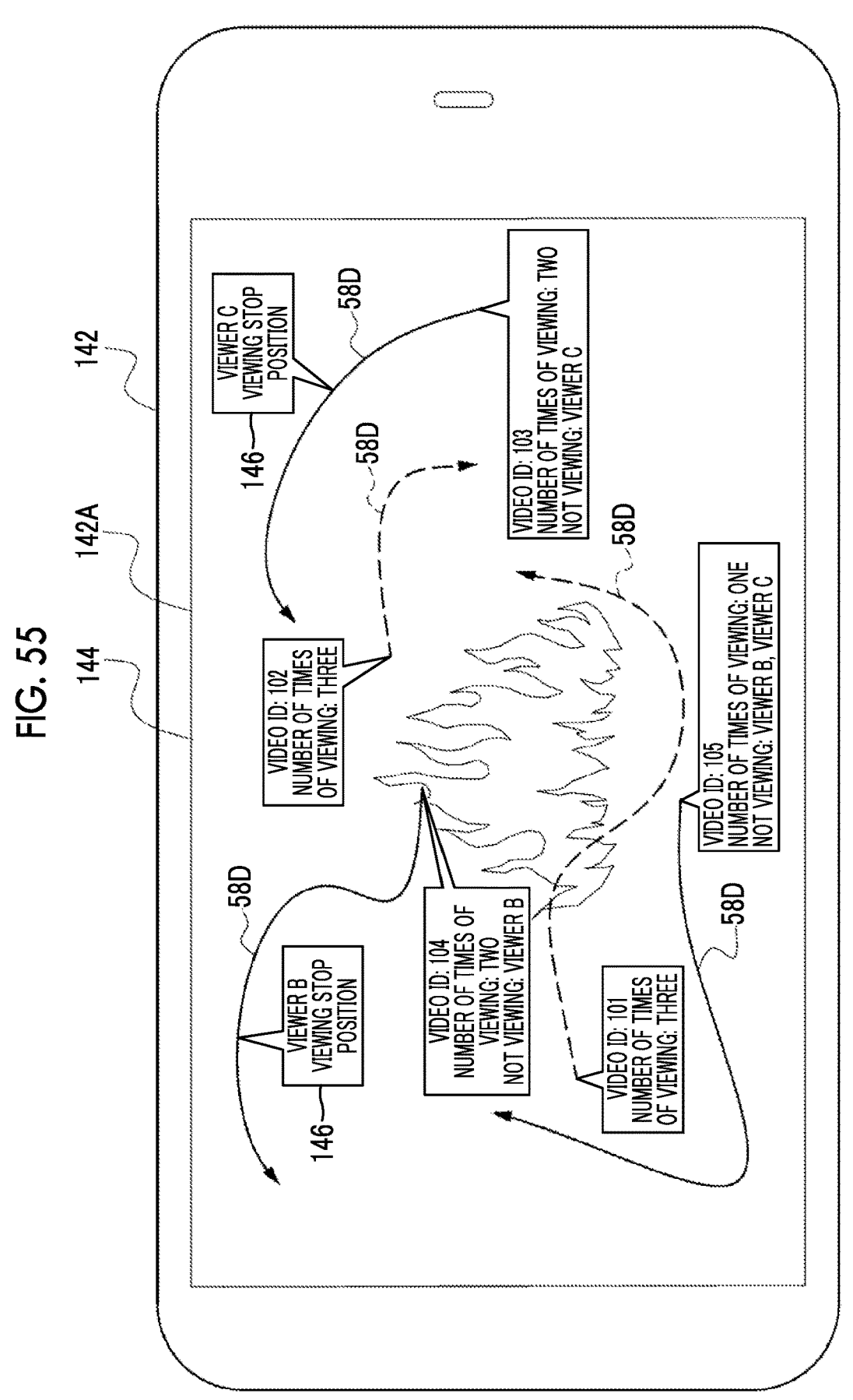
FIG. 55 is a conceptual diagram showing an example of a management screen displayed on a tablet terminal.

According to the configuration shown in FIG. 55, the administrator of the data processing apparatus 10 can ascertain how many times each virtual viewpoint video 30 has been reproduced in association with the viewpoint position path 58D of each virtual viewpoint video 30. In the example shown in FIG. 55, the form of the viewpoint position path 58D is displayed to be superimposed on the three-dimensional image of the fire reproduction experiment. However, the technology of the present disclosure is not limited to this, and the form of the gaze point path may be displayed to be superimposed on the three-dimensional image of the fire reproduction experiment.

Figure 56:
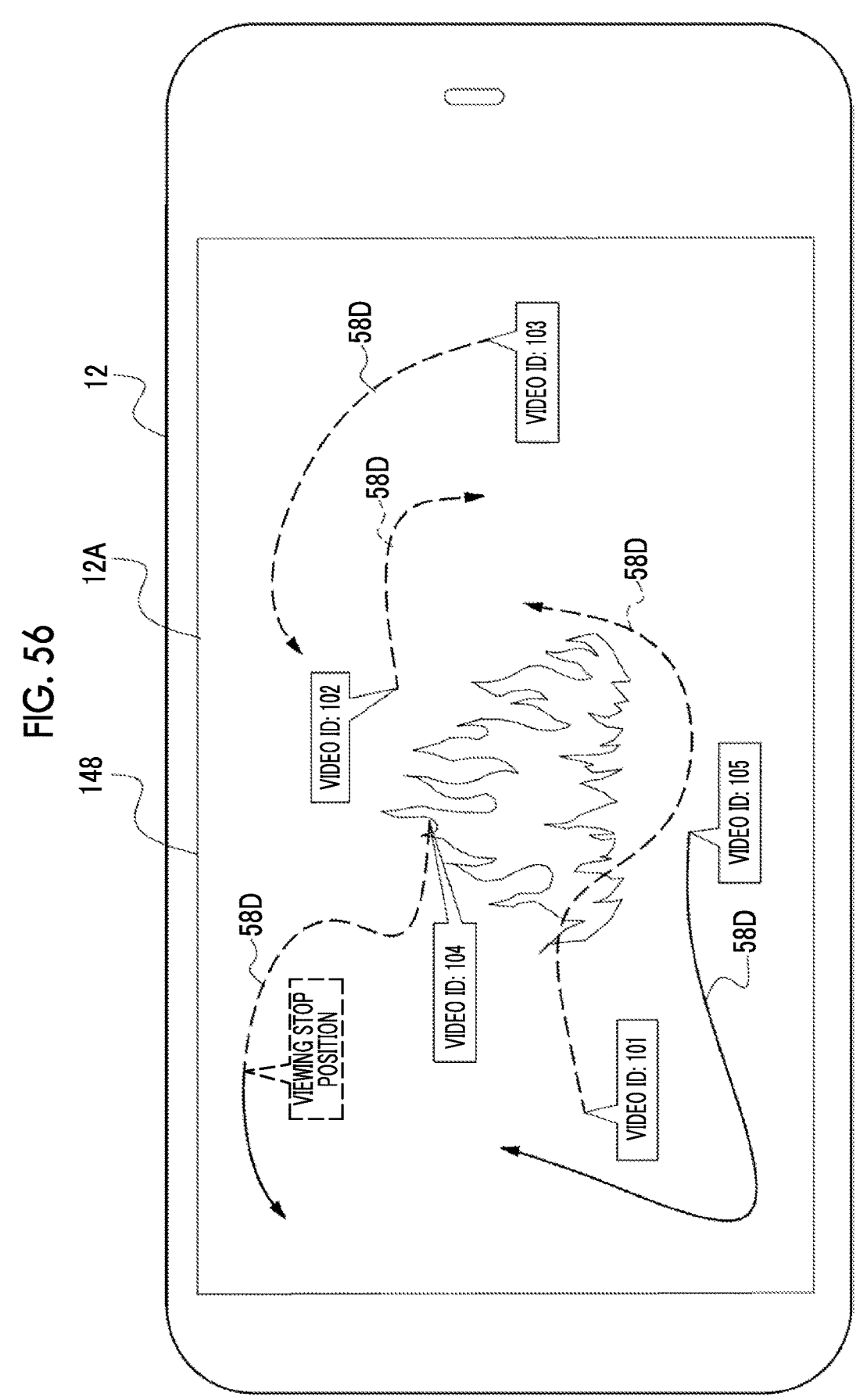
FIG. 56 is a conceptual diagram showing an example of a management screen displayed on a user device of each user.

A display method of a stop position in a case where the viewer stops viewing the virtual viewpoint video 30 in the middle of each viewpoint position path 58D is not limited to the example shown in FIG. 55. As shown in FIG. 56 as an example, the video reproduction unit 28 may generate management data including a path image in which the form of the viewpoint position path 58D is displayed to be superimposed on the three-dimensional image of the fire reproduction experiment for each viewer and transmit the generated management data to the user device 12 used by each viewer. The user device 12 receives the management data and displays the received management data on the touch panel display 12A as a management screen 148.

On the management screen 148, the form of the viewpoint position path 58D is displayed to be superimposed on the three-dimensional image of the fire reproduction experiment. The video ID 62A of the virtual viewpoint video 30 is displayed in association with the viewpoint position path 58D of the virtual viewpoint video 30. In the path image, a portion of the viewpoint position path 58D in which the virtual viewpoint video 30 has been reproduced is displayed in a manner distinguishable from an unreproduced portion.

According to the configuration shown in FIG. 56, in the path image, compared with a case where the reproduced portion and the unreproduced portion of the virtual viewpoint position video 30 in the viewpoint position path 58D are displayed in a similar manner, the viewer can select the virtual viewpoint video 30 with reference to the viewpoint position path 58D in the path image. In the example shown in FIG. 56, the form of the viewpoint position path 58D is displayed to be superimposed on the three-dimensional image of the fire reproduction experiment. However, the technology of the present disclosure is not limited to this, and the form of the gaze point path may be displayed to be superimposed on the three-dimensional image of the fire reproduction experiment.

In the above embodiments, the aspect of generating the virtual viewpoint video 30 by using the captured video 34 obtained by imaging the soccer field or the fire reproduction experiment has been exemplified, but this is only an example, and the virtual viewpoint video 30 may be generated by using the captured video 34 of any place as long as a plurality of physical cameras can be installed, such as a baseball field, a rugby field, a curling field, an athletic field, a swimming pool, a concert hall, an outdoor music hall, and a theater.

In the above embodiments, the aspect in which the virtual viewpoint video 30 is generated and reproduced has been exemplified, but this is only an example, and a virtual viewpoint image that is a still image may be generated and reproduced.

In the above embodiments, the recommendation data 32 is generated on the basis of the untransmitted virtual viewpoint video 30, but it is not necessary to generate the recommendation data 32 on the basis of the untransmitted virtual viewpoint video 30. For example, even if the virtual viewpoint video 30 has already been transmitted to the user device 12, the virtual viewpoint video 30 that has not been reproduced by a user may be recommended to the user. In this case, the data processing apparatus 10 acquires data regarding which virtual viewpoint video 30 has been reproduced from the user device 12 or the account of the user, and generates recommendation data 32 on the basis of the unreproduced virtual viewpoint video 30. Since the user may want to view the reproduced virtual viewpoint video 30 again, the data processing apparatus 10 may generate the recommendation data 32 including the reproduced virtual viewpoint video 30.

In the above embodiments, the computer 14 has been exemplified, but the technology of the present disclosure is not limited to this. For example, instead of the computer 14, a device including an ASIC, an FPGA, and/or a PLD may be applied. Instead of the computer 14, a combination of a hardware configuration and a software configuration may be used.

In the above embodiments, a form example in which the video generation process and the video reproduction process are executed by the CPU 14A of the data processing apparatus 10 has been described, but the technology of the present disclosure is not limited to this. A GPU may be employed instead of the CPU 14A, or a plurality of CPUs may be employed. Various processes may be executed by one processor or a plurality of physically separated processors.

Figure 57:
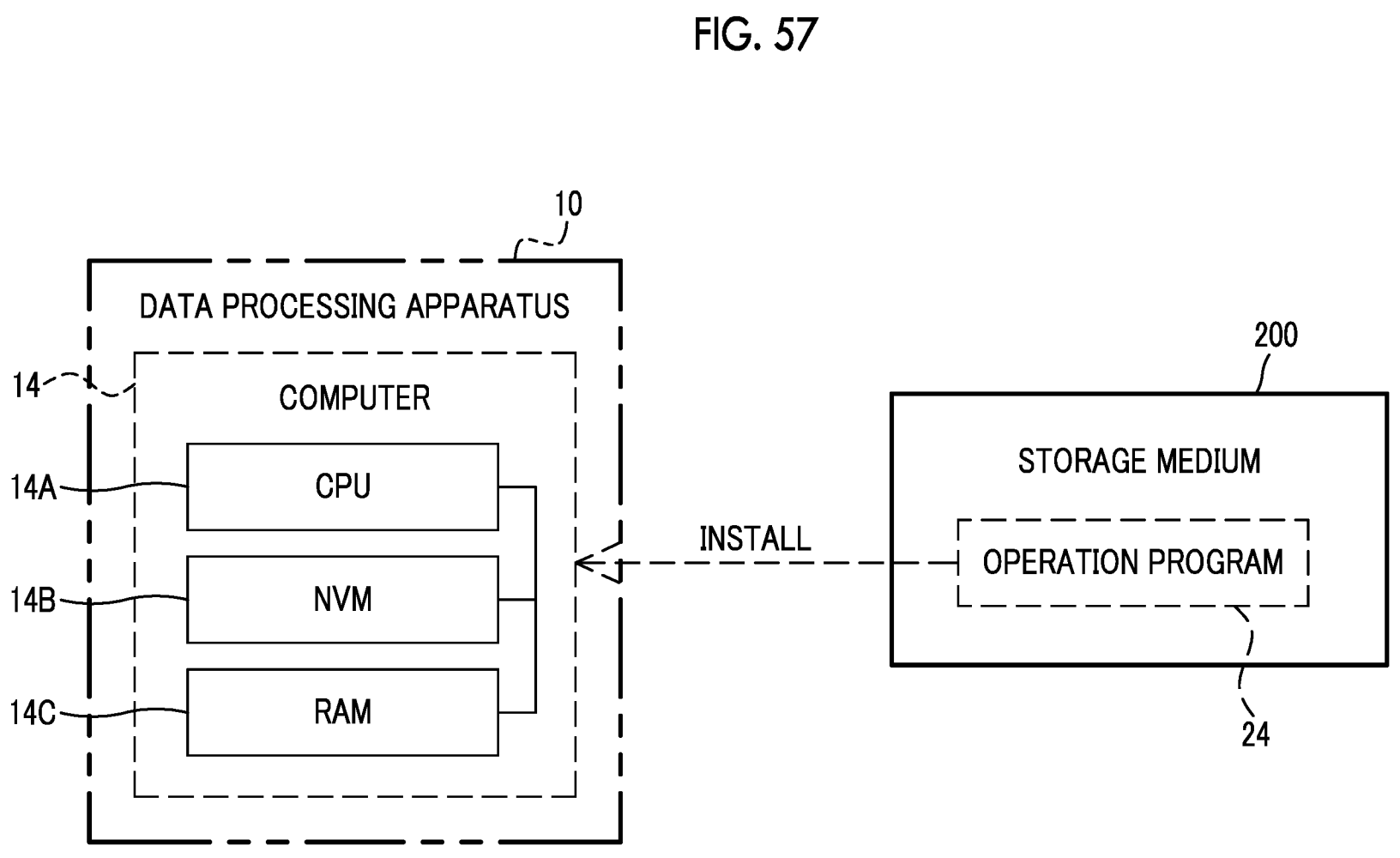

In the above embodiments, the operation program 24 is stored in the NVM 14B, but the technology of the present disclosure is not limited to this, and as shown in FIG. 57 as an example, the operation program 24 may be stored in any portable storage medium 200. The storage medium 200 is a non-transitory storage medium. Examples of the storage medium 200 include an SSD and a USB memory. The operation program 24 stored in the storage medium 200 is installed in the computer 14, and the CPU 14A executes the video generation process and the video reproduction process in accordance with the operation program 24.

The operation program 24 may be stored in a program memory of another computer, a server device, or the like connected to the computer 14 via a communication network (not shown), and the operation program 24 may be downloaded to the data processing apparatus 10 in response to a request from the data processing apparatus 10. In this case, the video generation process and the video reproduction process based on the downloaded operation program 24 are executed by the CPU 14A of the computer 14.

As a hardware resource for executing the video generation process and the video reproduction process, the following various processors may be used. Examples of the processors include, as described above, a CPU that is a general-purpose processor that functions as a hardware resource that executes data processing according to software, that is, a program.

As another processor, for example, a dedicated electric circuit that is a processor such as an FPGA, a PLD, or an ASIC having a circuit configuration specially designed for executing a specific process may be used. A memory is built in or connected to each processor, and each processor executes the data processing by using the memory.

The hardware resource that executes the data processing may be configured with one of these various processors, or a combination of two or more processors of the same type or different types (for example, a combination of a plurality of FPGAs, or a combination of a CPU and an FPGA). The hardware resource that executes the data processing may be one processor.

As an example of configuring a hardware resource with one processor, first, there is a form in which one processor is configured by a combination of one or more CPUs and software, as typified by a computer used for a client or a server, and this processor functions as the hardware resource that executes the data processing. Second, as typified by an SoC, there is a form in which a processor that realizes functions of the entire system including a plurality of hardware resources that execute the data processing with one IC chip is used. As described above, the data processing is realized by using one or more of the above various processors as hardware resources.

As a hardware structure of these various processors, more specifically, an electric circuit in which circuit elements such as semiconductor elements are combined may be used.

The above-described data processing is only an example. Therefore, needless to say, unnecessary steps may be deleted, new steps may be added, or the processing order may be changed within the scope without departing from the spirit.

The content described and exemplified above are detailed descriptions of the portions related to the technology of the present disclosure, and are only an example of the technology of the present disclosure. For example, the above description of the configuration, the function, the operation, and the effect is an example of the configuration, the function, the operation, and the effect of the portions of the technology of the present disclosure. Therefore, needless to say, unnecessary portions may be deleted, new elements may be added, or replacements may be made to the described content and exemplified content shown above within the scope without departing from the spirit of the technology of the present disclosure. In order to avoid complications and facilitate understanding of the portions related to the technology of the present disclosure, in the described content and the exemplified content shown above, description of common technical knowledge or the like that does not require particular description in order to enable the implementation of the technology of the present disclosure is omitted.

In the present specification, "A and/or B" is synonymous with "at least one of A or B". That is, "A and/or B" means only A, only B, or a combination of A and B. In the present specification, in a case where three or more matters are connected and expressed by "and/or", the same concept as "A and/or B" is applied.

All the documents, the patent applications, and the technical standards disclosed in the present specification are incorporated by reference in the present specification to the same extent as in a case where the individual documents, patent applications, and technical standards are specifically and individually stated to be incorporated by reference.

The following appendixes will be disclosed with respect to the above embodiments.

APPENDIX 1

A data processing method of transmitting a plurality of virtual viewpoint images generated on the basis of a captured image to a device, the data processing method including:

acquiring first data regarding a first virtual viewpoint image that is a virtual viewpoint image at least a part of which has been transmitted to the device among the plurality of virtual viewpoint images; and transmitting, to the device, second data regarding a second virtual viewpoint image that has not been transmitted to the device among the plurality of virtual viewpoint images on the basis of the acquired first data.

APPENDIX 2

A program for causing a computer to execute data processing of transmitting a plurality of virtual viewpoint images generated on the basis of a captured image to a device, in which the data processing includes acquiring first data regarding a first virtual viewpoint image that is a virtual viewpoint image at least a part of which has been transmitted to the device among the plurality of virtual viewpoint images; and transmitting, to the device, second data regarding a second virtual viewpoint image that has not been transmitted to the device among the plurality of virtual viewpoint images on the basis of the acquired first data.

What is claimed is:

1. A data processing apparatus comprising:
a processor; and
a memory built in or connected to the processor,
the processor is configured to:

receive, from a user device, a video generation request and virtual viewpoint related information associated with the video generation request, generate a first virtual view point image based on the viewpoint related information which is stored in a generated video list, transmit the first virtual view point image to the user device and add the virtual viewpoint related information to a reproduced video list which is associated with the user device, acquire first data which includes the viewpoint related information regarding a reproduction history or registration data of the first virtual viewpoint image in response to receiving a video reproduction request from the user device, read out the generated video list regarding the first virtual view point image, calculate a view point position difference between a viewpoint position of a second virtual view point image in the generated video list and a viewpoint position of the first virtual view point image, adjust a position of the second virtual view point image in an order of the generated video list, store the generated video list of which the position of the second virtual viewpoint image has been adjusted as a recommended video list, perform control for transmitting second data comprising the recommended video list which includes the second virtual viewpoint image to the user device.

2. The data processing apparatus according to claim 1, wherein the second virtual viewpoint image is different from the first virtual viewpoint image.

3. The data processing apparatus according to claim 2, wherein the viewpoint related information includes a viewpoint of the first virtual viewpoint image.

4. The data processing apparatus according to claim 3, wherein the viewpoint related information includes at least one of a viewpoint position, a visual line direction, an angle of view, a gaze point, a viewpoint position path indicating a displacement of the viewpoint position over time, or a gaze point path indicating a displacement of the gaze point over time.

5. The data processing apparatus according to claim 4, wherein the first data includes first time information regarding an imaging time of the captured image used for generating the first virtual viewpoint image.

6. The data processing apparatus according to claim 5, wherein the second data includes at least one of a reduced image of the first virtual viewpoint image or the viewpoint related information.

7. The data processing apparatus according to claim 6, wherein the second data is data in which at least one of the reduced image or the viewpoint related information is displayed on the user device in descending order of a similarity regarding the viewpoint related information with the viewpoint related information included in the first data and in ascending order of a similarity regarding the first time information with the first time information included in the first data.

8. The data processing apparatus according to claim 6, wherein the second data is data in which at least one of the reduced image or the viewpoint related information is displayed on the user device in ascending order of a similarity regarding the viewpoint related information with the viewpoint related information included in the first data and in descending order of a similarity regarding the first time information with the first time information included in the first data.

9. The data processing apparatus according to claim 7, wherein the processor is configured to acquire the similarity regarding the viewpoint related information on the basis of a difference in the viewpoint position path or the gaze point path between positions of the viewpoint related information included in the first data and the viewpoint related information included in the second data.

10. The data processing apparatus according to claim 7, wherein the processor is configured to acquire the similarity regarding the viewpoint related information on the basis of a difference in a tag attached to the viewpoint position path or the gaze point path.

11. The data processing apparatus according to claim 6, wherein the second data is data in which at least one of the reduced image or the viewpoint related information is displayed on the user device in an order determined on the basis of a similarity between an attribute of a viewer who has viewed the first virtual viewpoint image by using the user device and an attribute of an author of the second virtual viewpoint image.

12. The data processing apparatus according to claim 6, wherein the second data is data in which at least one of the reduced image or the viewpoint related information is displayed on the user device in an order determined on the basis of a difference between the reproduction history of the first virtual viewpoint image by a viewer who has viewed the first virtual viewpoint image by using the user device and the reproduction history of the first virtual viewpoint image by another viewer.

13. The data processing apparatus according to claim 6, wherein the second data is data in which at least one of the reduced image or the viewpoint related information is displayed on the user device in an order determined on the basis of a reproduction tendency extracted from the reproduction history of the first virtual viewpoint image by a viewer who has viewed the first virtual viewpoint image by using the user device.

14. The data processing apparatus according to claim 6, wherein the second data is data in which at least one of the reduced image or the viewpoint related information is displayed on the user device in an order determined on the basis of a comment added to each of a plurality of the second virtual viewpoint images.

15. The data processing apparatus according to claim 14, wherein the comment is a comment added to a viewpoint position path indicating a displacement of a viewpoint position included in the second data over time or a gaze point path indicating a displacement of a gaze point included in the second data over time, and the second data is data in which an image in which the comment is added to a form of the viewpoint position path or a form of the gaze point path is displayed on the user device.

16. The data processing apparatus according to claim 6, wherein the second data is data in which at least one of the reduced image or the viewpoint related information is displayed on the user device in an order determined on the basis of a first evaluation given to each of a plurality of the second virtual viewpoint images.

17. The data processing apparatus according to claim 6, wherein the second data is data in which at least one of the reduced image or the viewpoint related information is displayed on the user device in an order determined according to a preference of a viewer estimated on the basis of a second evaluation for the first virtual viewpoint image.

18. The data processing apparatus according to claim 6, wherein, in a case where a new virtual viewpoint image is added, the second data is data in which at least one of the reduced image or the viewpoint related information tion regarding the new virtual viewpoint image is displayed on the user device on the basis of the first data.

19. The data processing apparatus according to claim 6, wherein the first virtual viewpoint image is a video, and the second data is data in which at least one of the reduced image or the viewpoint related information is displayed on the user device in an order determined on the basis of a length of a viewpoint position path indicating a displacement of a viewpoint position included in the first data over time or a length of a gaze point path indicating a displacement of a gaze point included in the first data over time with respect to a time from start to end of reproduction of the first virtual viewpoint image.

20. The data processing apparatus according to claim 6, wherein the first virtual viewpoint image is a video, and the second data is data in which at least one of the reduced image or the viewpoint related information is displayed on the user device in an order determined on the basis of a ratio between second time information regarding an imaging time of the captured image used for generating the second virtual viewpoint image and a time from start to end of reproduction of the second virtual viewpoint image.

21. The data processing apparatus according to claim 6, wherein the second data is data in which at least one of the reduced image or the viewpoint related information is displayed on the user device in an order determined on the basis of a data capacity of each of a plurality of the second virtual viewpoint images.

22. The data processing apparatus according to claim 6, wherein the second data is data in which at least one of the reduced image or the viewpoint related information is displayed on the user device in an order determined on the basis of a parameter related to image quality of each of a plurality of the second virtual viewpoint images.

23. The data processing apparatus according to claim 6, wherein the second data is data in which at least one of the reduced image or the viewpoint related information is displayed on the user device in an order determined on the basis of sound data added to the second virtual viewpoint image.

24. The data processing apparatus according to claim 2, wherein the second data is data in which a plurality of the second virtual viewpoint images, which are sequentially reproduced on the user device on a condition in which the processor receives a reproduction instruction for giving an instruction for reproduction of the second virtual viewpoint images, are reproduced on the user device.

25. The data processing apparatus according to claim 24, wherein the second data is data in which, each time reproduction of each of the plurality of second virtual viewpoint images is ended, a first image different from the first virtual viewpoint image and the second virtual viewpoint image is reproduced on the user device.

26. The data processing apparatus according to claim 2, wherein the second data is data in which a second image that is a condition for reproducing the second virtual viewpoint image is reproduced on the user device.

27. The data processing apparatus according to claim 26, wherein the second data is data in which a third image that is a condition for reproducing the second virtual viewpoint image is reproduced on the user device on the basis of image information regarding details of the second image transmitted to the user device.

28. The data processing apparatus according to claim 2, wherein the second data is data in which a composite image in which a second virtual viewpoint image selected in accordance with a given instruction among a plurality of the second virtual viewpoint images is combined with a viewpoint position path indicating a displacement of a viewpoint position over time or a gaze point path indicating a displacement of a gaze point over time related to another second virtual viewpoint image is reproduced on the user device.

29. The data processing apparatus according to claim 28, wherein, in a case where a path change instruction for the viewpoint position path or the gaze point path is received, the second data is data in which reproduction of the composite image is stopped and the second virtual viewpoint image corresponding to the viewpoint position path or the gaze point path included in the path change instruction is reproduced on the user device.

30. The data processing apparatus according to claim 2, wherein, in a case where a change instruction for viewpoint related information related to a viewpoint of the second virtual viewpoint image that is being reproduced on the user device is received, the second data is data in which a virtual viewpoint image generated on the basis of new viewpoint related information derived on the basis of the change instruction is reproduced on the user device.

31. The data processing apparatus according to claim 2, wherein, in a case where a replay image generation instruction for the second virtual viewpoint image that is being reproduced on the user device is received, the second data is data in which a virtual viewpoint image generated on the basis of new viewpoint related information generated on the basis of viewpoint related information related to a viewpoint of the second virtual viewpoint image is reproduced on the user device.

32. The data processing apparatus according to claim 2, wherein, in a case where viewing refusal subject information regarding a subject of which viewing is refused is received, the second data is data in which a virtual viewpoint image generated on the basis of viewpoint related information generated on the basis of the viewing refusal subject information is reproduced on the user device.

33. The data processing apparatus according to claim 2, wherein the second virtual viewpoint image is a video including images of a plurality of frames, and in a case where a digest image display instruction for a reduced image of the second virtual viewpoint image is received, the reduced image being included in the second data, the second data is data in which a digest image generated by extracting the images of the plurality of frames in which viewpoint positions differ at a predetermined interval from the second virtual viewpoint image is reproduced on the user device.

34. The data processing apparatus according to claim 2, wherein the processor is configured to perform control for transmitting, to the user device, a path image in which a form of a viewpoint position path indicating a displacement of a viewpoint position of the first virtual viewpoint image over time, or a form of a gaze point path indicating a displacement of a gaze point of the first virtual viewpoint image over time is displayed in association with the second data, and the path image is an image in which the form of the viewpoint position path or the form of the gaze point path is shown in a manner distinguishable from the second data.

35. The data processing apparatus according to claim 2, wherein the second data includes a reduced image of the second virtual viewpoint image and a form of a viewpoint position path indicating a displacement of a viewpoint position of the second virtual viewpoint image over time, or a form of a gaze point path indicating a displacement of a gaze point of the second virtual viewpoint image over time, and the second data includes first position information for specifying a position of the reduced image on the viewpoint position path or the gaze point path.

36. The data processing apparatus according to claim 2, wherein the second data regarding the second virtual viewpoint image includes second position information that is disposed in a time series in a horizontal direction and is disposed in a vertical direction according to a similarity of viewpoint related information of the second virtual viewpoint image for viewpoint related information of the first virtual viewpoint image.

37. The data processing apparatus according to claim 2, wherein the registration data includes attribute data indicating an attribute of a viewer who has viewed the first virtual viewpoint image and preference data indicating a preference of the viewer.

38. The data processing apparatus according to claim 37, wherein the second data is data excluding data regarding a virtual viewpoint image that is a viewing restriction target from the virtual viewpoint image on the basis of the attribute data.

39. The data processing apparatus according to claim 2, wherein, in a case where a time setting instruction for third time information regarding an imaging time of the captured image used for generating the virtual viewpoint image is received, the second data is data regarding a second virtual viewpoint image in which the third time information is within a range indicated by the time setting instruction among a plurality of the second virtual viewpoint images.

40. The data processing apparatus according to claim 39, wherein, in a case where the time setting instruction is received, the second data includes the number of time-limited virtual viewpoint images in which the third time information is within the range indicated by the time setting instruction among the virtual viewpoint images, and the number of images included in the second virtual viewpoint image among the time-limited virtual viewpoint images.

41. The data processing apparatus according to claim 1, wherein the processor is configured to acquire the reproduction history of the first virtual viewpoint image to an account associated with a viewer of the first virtual viewpoint image, and output the reproduction history in association with viewpoint related information related to a viewpoint of the first virtual viewpoint image.

42. The data processing apparatus according to claim 1, wherein the processor is configured to aggregate the number of times each virtual viewpoint image has been reproduced, and output an aggregation result in association with viewpoint related information related to a viewpoint of the first virtual viewpoint image.

43. The data processing apparatus according to claim 1, wherein the processor is configured to perform control for transmitting, to the user device, a path image in which a form of a viewpoint position path indicating a displacement of a viewpoint position of the first virtual viewpoint image over time, or a form of a gaze point path indicating a displacement of a gaze point of the first virtual viewpoint image over time is displayed in association with the second data, and the path image is an image in which, of the viewpoint position path or the gaze point path, a portion in which the virtual viewpoint image has been reproduced and a portion in which the first virtual viewpoint image has not been reproduced are shown in a distinguishable manner.

44. The data processing apparatus according to claim 1, wherein the first virtual viewpoint image includes a virtual viewpoint image in which at least a part of the virtual viewpoint images has been reproduced on the user device.

45. A data processing apparatus comprising:

a processor; and a memory built in or connected to the processor, the processor is configured to:

receive, from a user device, a video generation request and virtual viewpoint related information associated with the video generation request, generate a first virtual view point image based on the viewpoint related information which is stored in a generated video list, transmit the first virtual view point image to the user device and add the virtual viewpoint related information to a reproduced video list which is associated with the user device, acquire first data which includes the viewpoint related information of the first virtual viewpoint image that has been transmitted to the user device among a plurality of virtual viewpoint images in response to receiving a video reproduction request from the user device, read out the generated video list regarding the first virtual view point image, calculate a view point position difference between a viewpoint position of a second virtual view point image in the generated video list and a viewpoint position of the first virtual view point image, adjust a position of the second virtual view point image in an order of the generated video list, store the generated video list of which the position of the second virtual viewpoint image has been adjusted as a recommended video list, perform control for transmitting, to the user device, the second data comprising the recommended video list which includes the second virtual viewpoint image that has not been transmitted to the user device among the plurality of virtual viewpoint images on the basis of the acquired first data.

46. A data processing method used by a data processing apparatus, the data processing method comprising:

receiving, from a user device, a video generation request and virtual viewpoint related information associated with the video generation request;

generating a first virtual view point image based on the viewpoint related information which is stored in a generated video list;

transmitting the first virtual view point image to the user device and add the virtual viewpoint related information to a reproduced video list which is associated with the user device;

acquiring first data which includes the viewpoint related information regarding a reproduction history or registration data of the first virtual viewpoint image in response to receiving a video reproduction request from the user device;

reading out the generated video list regarding the first virtual view point image;

calculating a view point position difference between a viewpoint position of a second virtual view point image in the generated video list and a viewpoint position of the first virtual view point image;

adjusting a position of the second virtual view point image in an order of the generated video list;

storing the generated video list of which the position of the second virtual viewpoint image has been adjusted as a recommended video list; and performing control for transmitting second data comprising the recommended video list which includes the second virtual viewpoint image to the user device.

47. A non-transitory computer-readable storage medium storing a program for executable by a processor of a data processing apparatus to perform functions including:

receiving, from a user device, a video generation request and virtual viewpoint related information associated with the video generation request;

generating a first virtual view point image based on the viewpoint related information which is stored in a generated video list;

transmitting the first virtual view point image to the user device and add the virtual viewpoint related information to a reproduced video list which is associated with the user device;

acquiring first data which includes the viewpoint related information regarding a reproduction history or registration data of the first virtual viewpoint image in response to receiving a video reproduction request from the user device;

reading out the generated video list regarding the first virtual view point image;

calculating a view point position difference between a viewpoint position of a second virtual view point image in the generated video list and a viewpoint position of the first virtual view point image;

adjusting a position of the second virtual view point image in an order of the generated video list;

storing the generated video list of which the position of the second virtual viewpoint image has been adjusted as a recommended video list; and performing control for transmitting second data comprising the recommended video list which includes the second virtual viewpoint image to the user device.

* * * * *